(12) United States Patent
Asano

(10) Patent No.: US 8,477,202 B2
(45) Date of Patent: Jul. 2, 2013

(54) PHOTOGRAPHING APPARATUS AND COMMUNICATION ESTABLISHING METHOD AND PROGRAM

(75) Inventor: Taiga Asano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 12/861,075

(22) Filed: Aug. 23, 2010

(65) Prior Publication Data

US 2011/0050926 A1     Mar. 3, 2011

(30) Foreign Application Priority Data

Aug. 31, 2009   (JP) ................................. 2009-200620

(51) Int. Cl.
    *H04N 5/232*     (2006.01)
(52) U.S. Cl.
    USPC .................. 348/211.2; 348/211.1; 348/211.3; 348/211.4; 348/211.5; 348/211.6
(58) Field of Classification Search
    None
    See application file for complete search history.

(56) References Cited

U.S. PATENT DOCUMENTS

| | | | | |
|---|---|---|---|---|
| 7,478,755 | B2 * | 1/2009 | Sekiguchi | 235/462.24 |
| 2002/0167595 | A1 * | 11/2002 | Patel et al. | 348/211.3 |
| 2007/0017996 | A1 * | 1/2007 | Xia et al. | 235/462.41 |
| 2007/0239877 | A1 * | 10/2007 | Uchida | 709/228 |
| 2009/0237720 | A1 | 9/2009 | Asano | |

FOREIGN PATENT DOCUMENTS

| | | | |
|---|---|---|---|
| JP | 2004-178187 A | * | 6/2004 |
| JP | 2007-142681 | | 6/2007 |
| JP | 2007-156812 | | 6/2007 |
| JP | 2008-236159 | | 10/2008 |
| JP | 2008-269486 A | * | 11/2008 |
| JP | 2009-260936 | | 11/2009 |

OTHER PUBLICATIONS

English translations of JP 2004-178187A and 2008-269486A.*

* cited by examiner

*Primary Examiner* — Lin Ye
*Assistant Examiner* — John H Morehead, III
(74) *Attorney, Agent, or Firm* — IPUSA, PLLC

(57) ABSTRACT

In a photographing apparatus, an encoding part creates a code image from authentication information of the photographing apparatus. A photographing part takes a photograph of a connection code image displayed on a display part of another apparatus. A decoding part decodes the connection code image contained in the photograph taken by the photographing part to decode encoded connection information containing communication setup information, which has been encoded according to the authentication information of the photographing apparatus. A restoration part restores the communication setup information from the encoded connection information by using the authentication information of the photographing apparatus. A radio communication part communicates with the another apparatus by using the communication setup information restored by the restoration part.

7 Claims, 56 Drawing Sheets

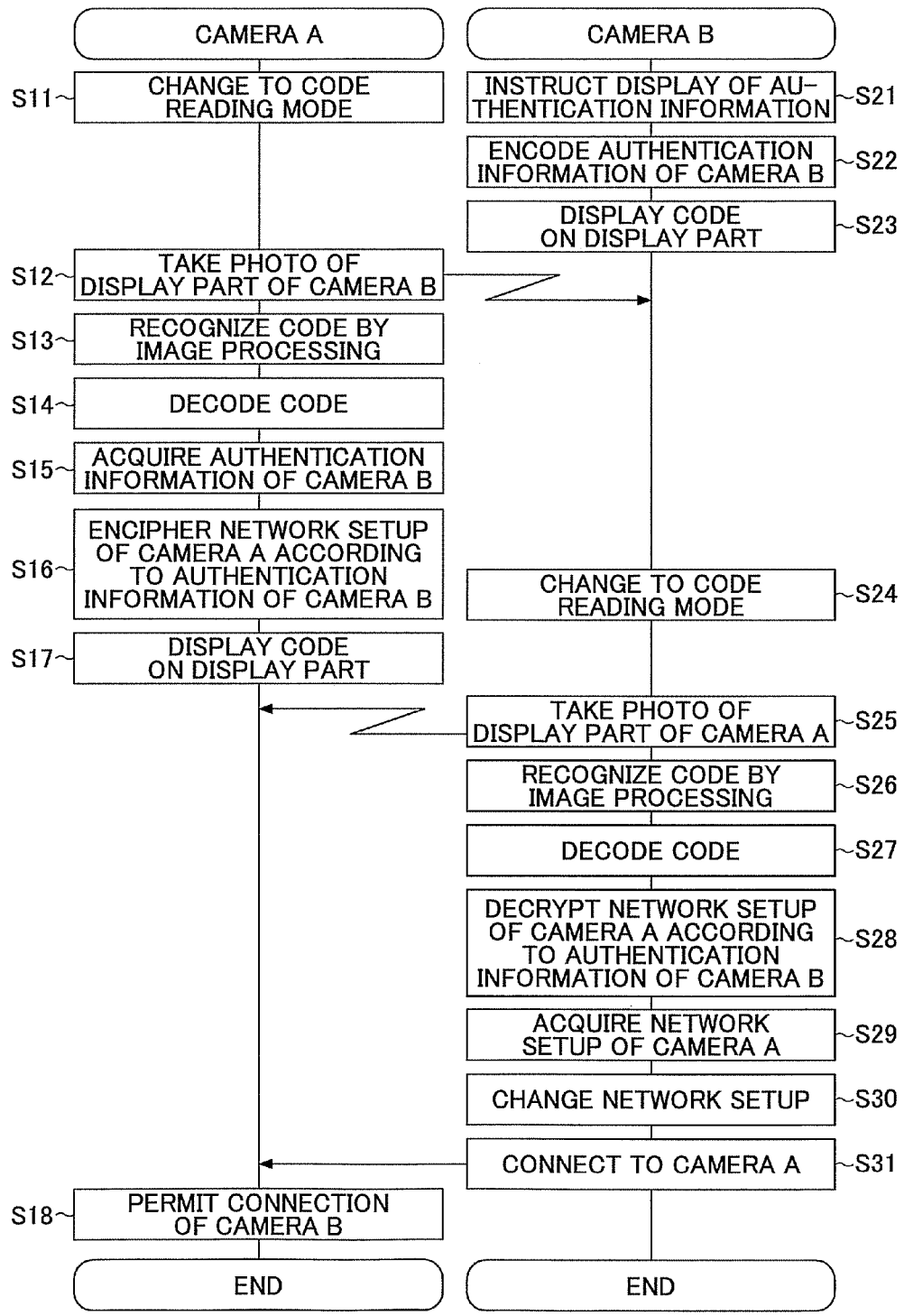

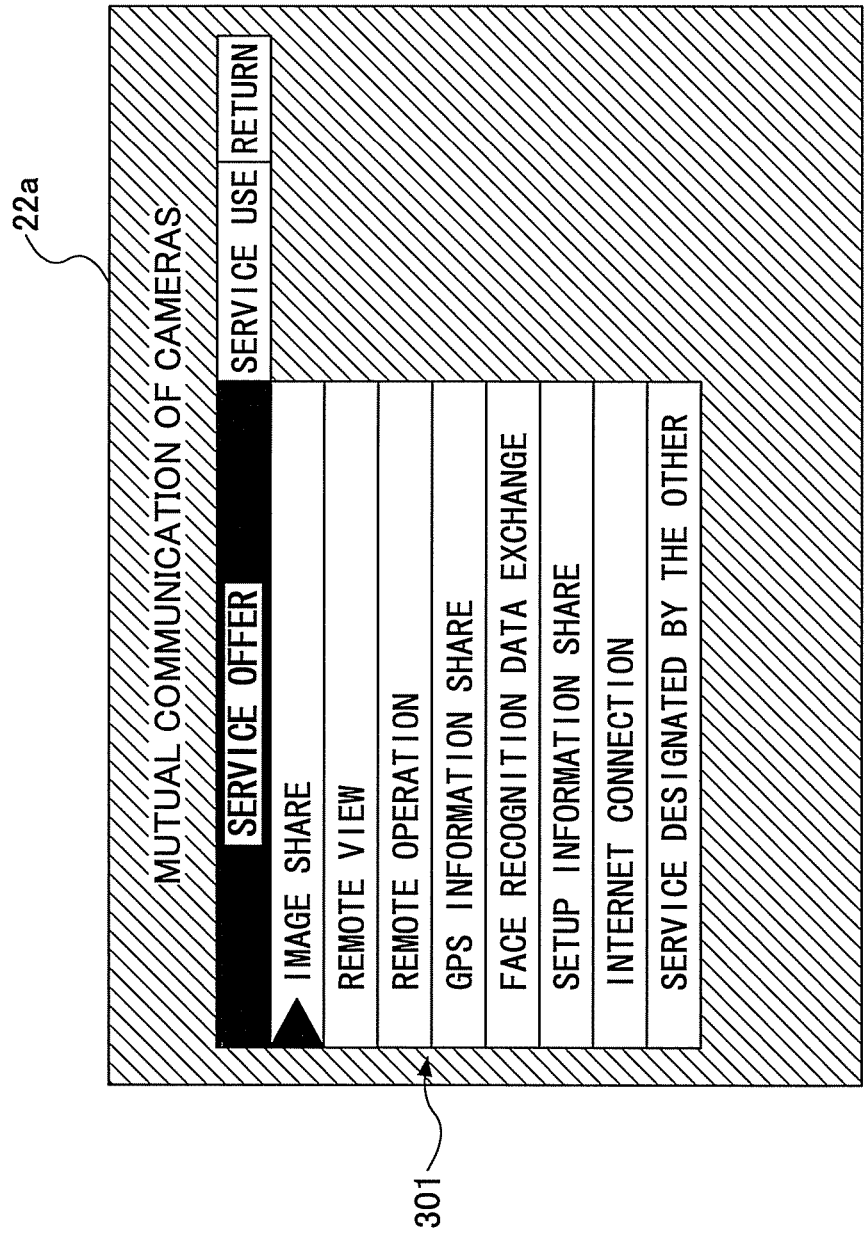

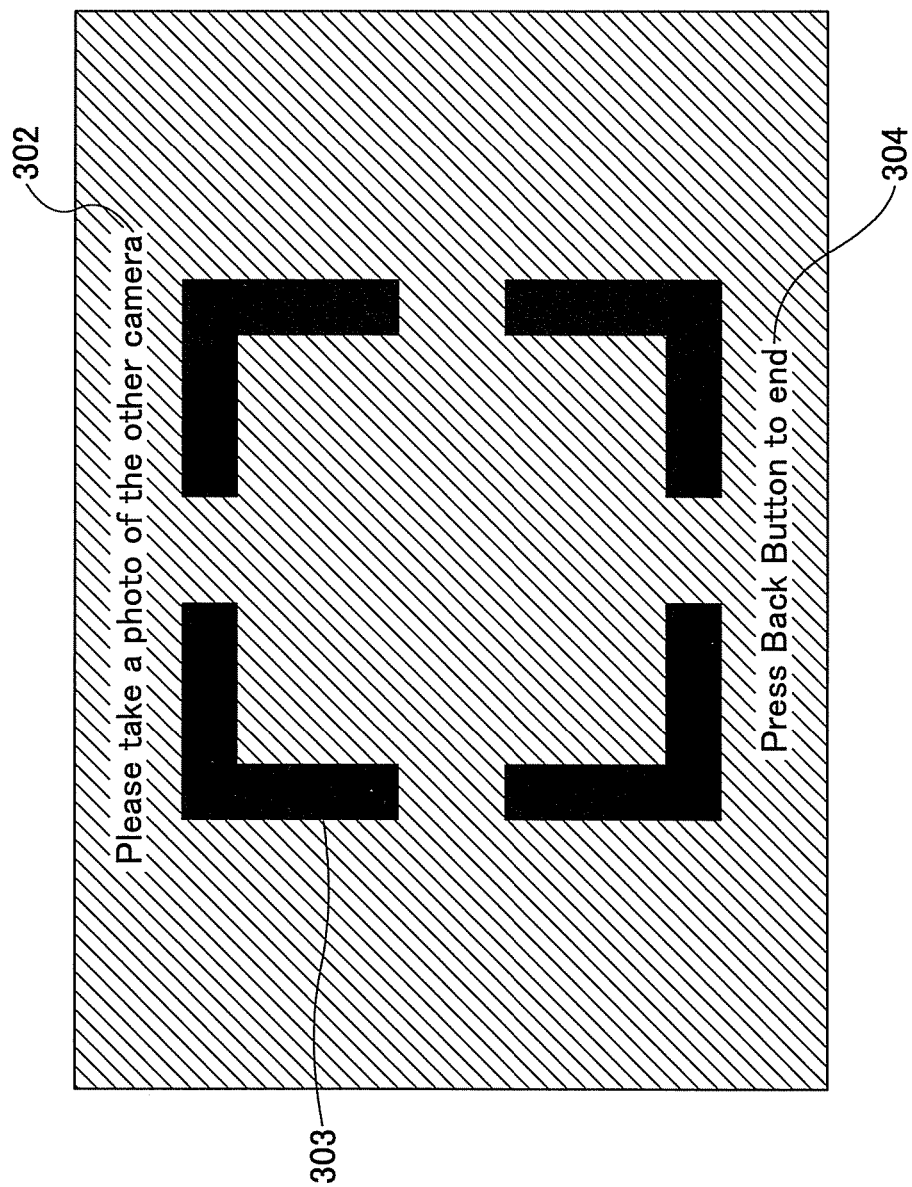

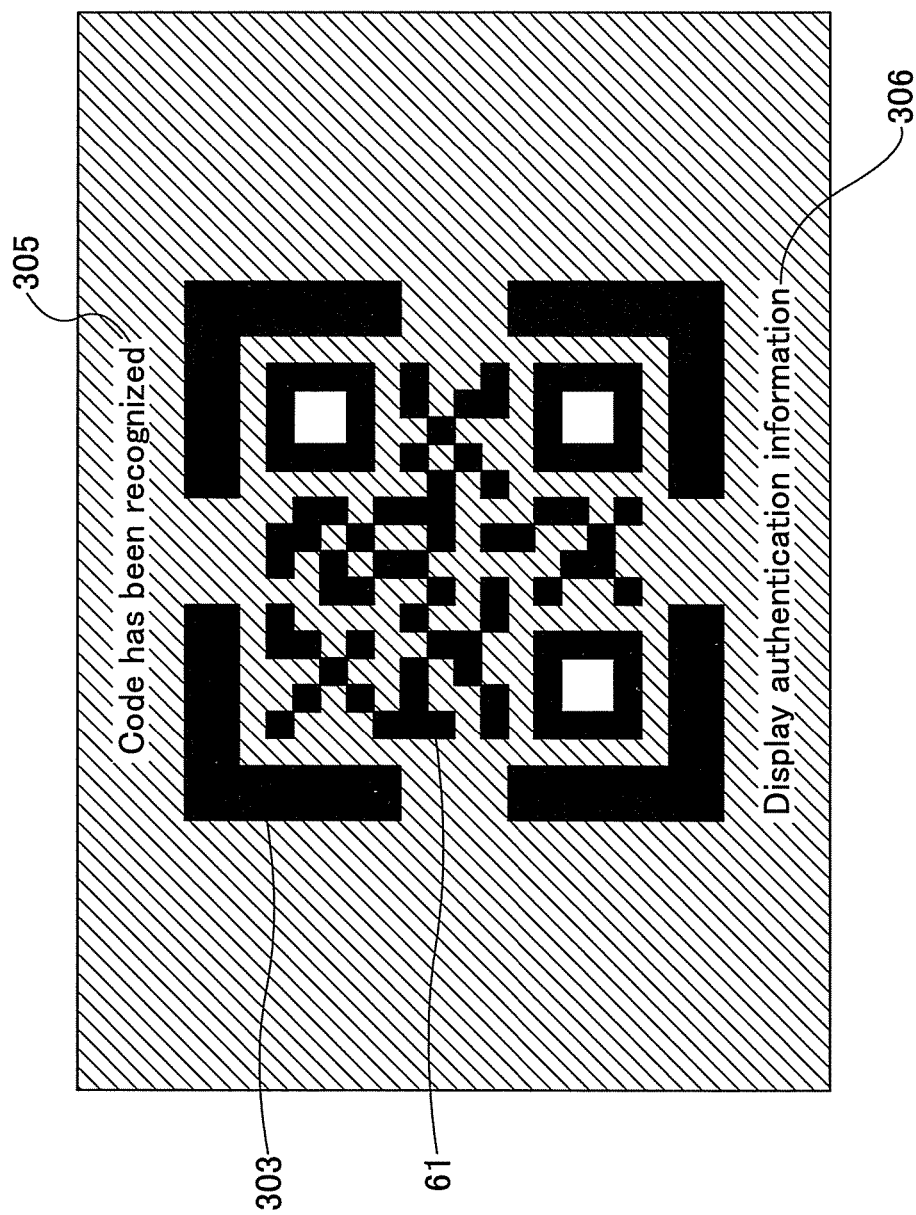

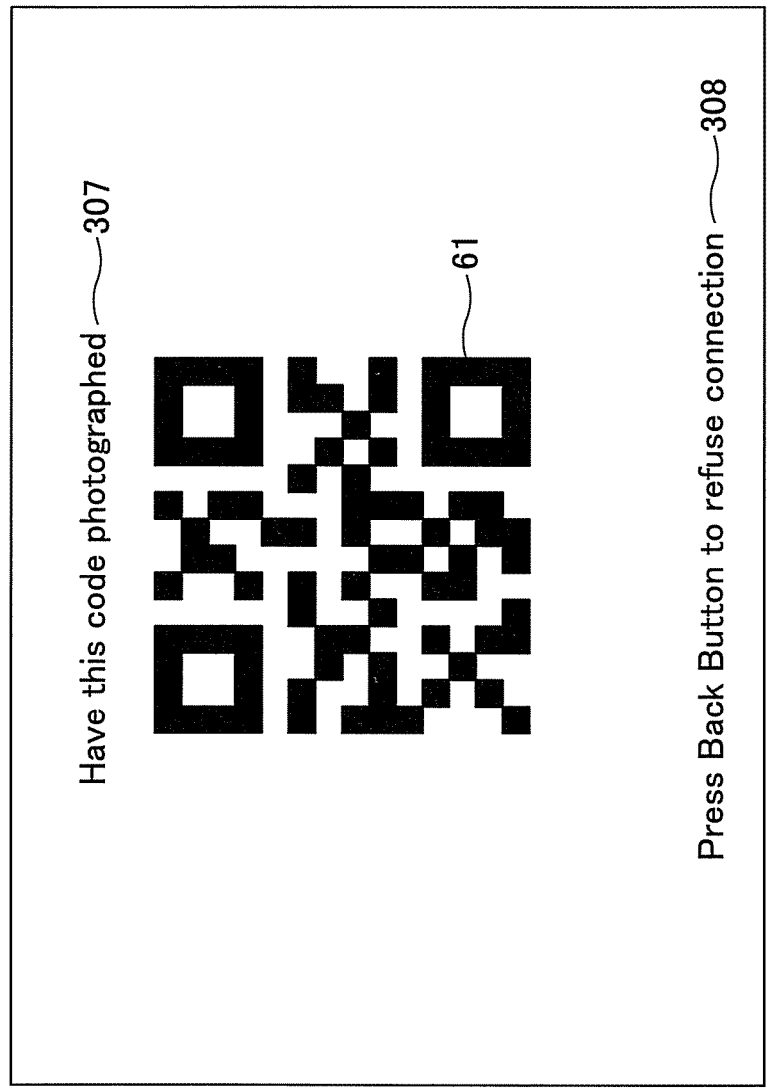

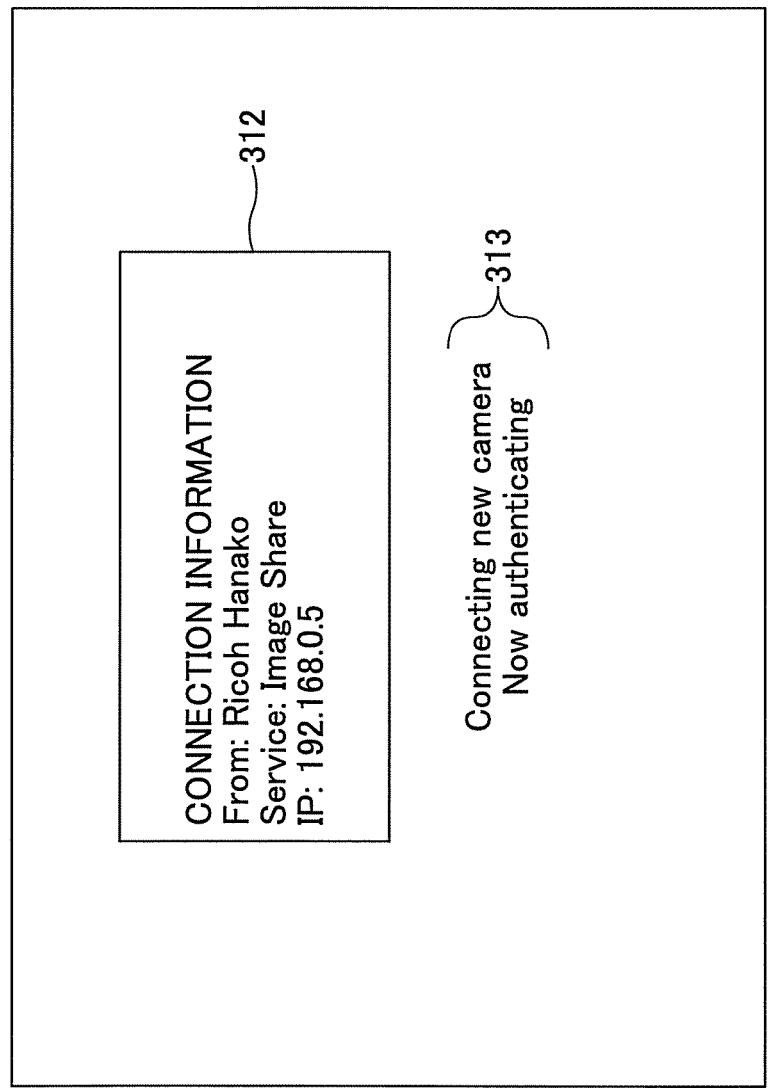

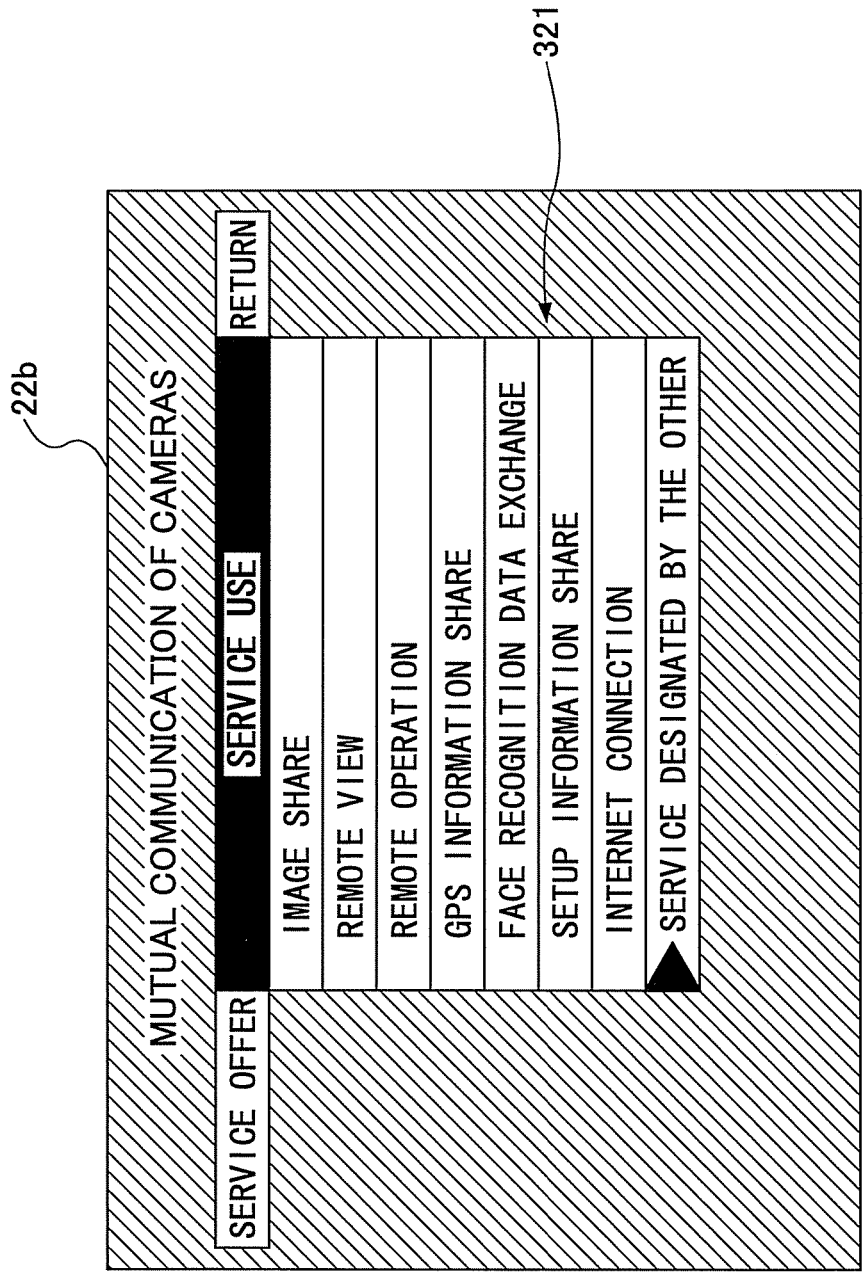

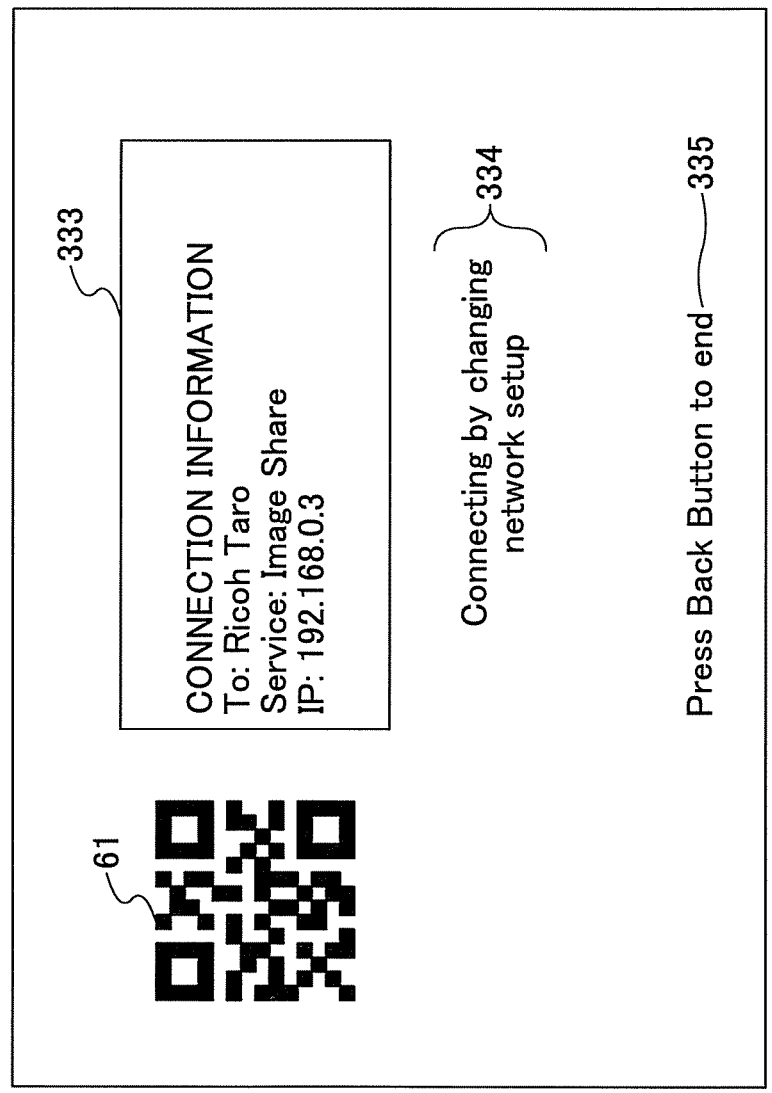

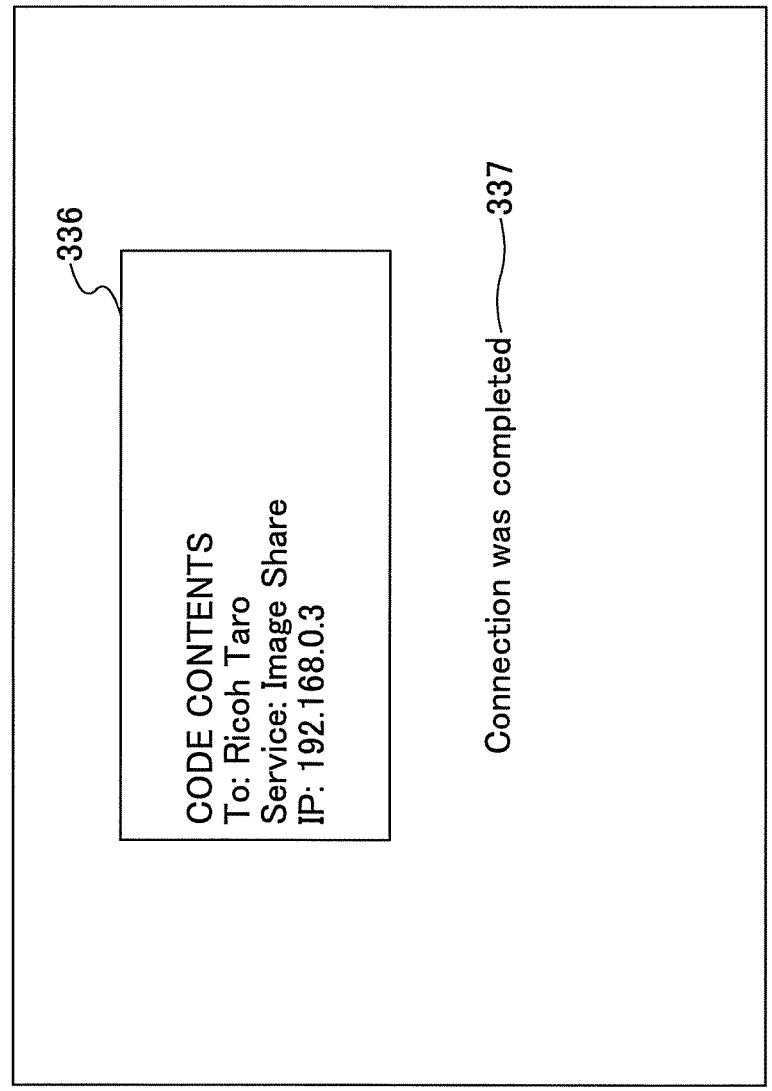

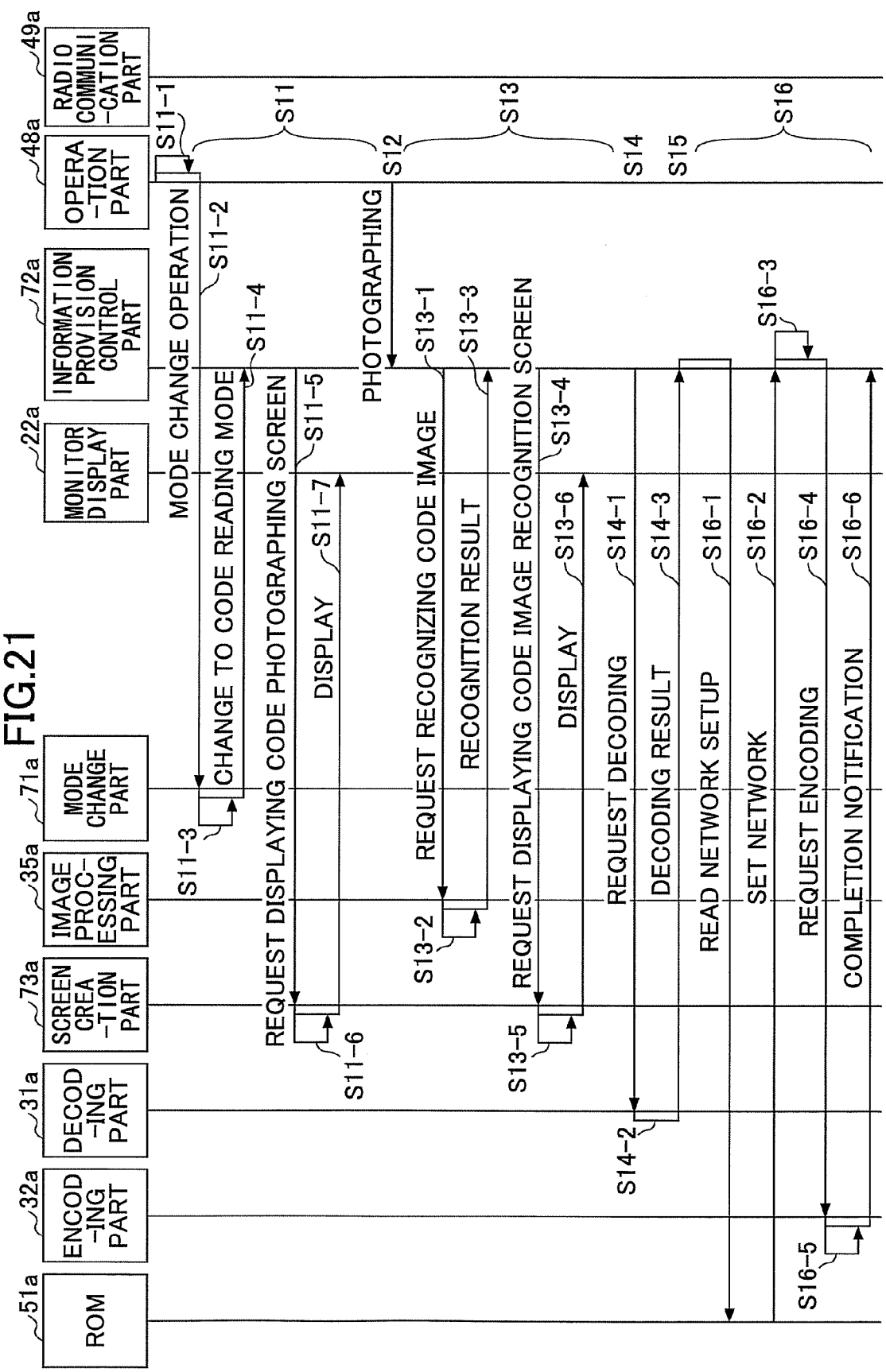

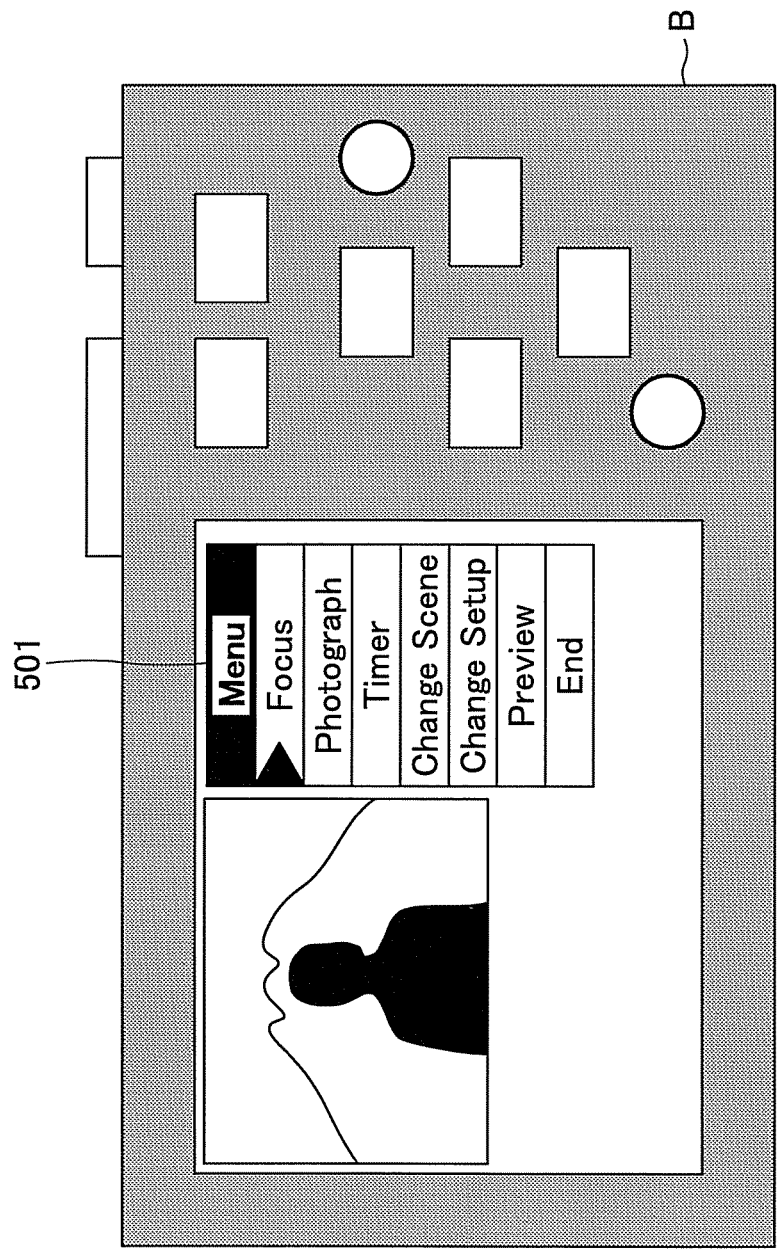

PHOTOGRAPHING APPARATUS AND COMMUNICATION ESTABLISHING METHOD AND PROGRAM

BACKGROUND OF THE INVENTION

1. Field of the Invention

The present invention relates to a photographing apparatus such as a digital camera and, more particularly, to a photographing apparatus that is radio-communicable with other photographing apparatuses.

2. Description of the Related Art

Digital cameras have become widely used in recent years, and a method of using a digital camera has become diversified. For example, some digital cameras are provided with a radio LAN function, which enables radio communication between digital cameras to exchange data of images taken by the digital cameras of each other. Japanese Laid-Open Patent Application No. 2007-142681 suggests a technique to send an IP address or a MAC address to a remote apparatus. Disclosed in this patent document is a communication method in which a digital camera stores an image of an encoded IP address or MAC address of the digital camera and another digital camera takes an image of the displayed encoded IP address or MAC address on a monitor and decodes the thus-taken image in order to enable the other digital camera to communicate with the digital camera by using the IP address or the MAC address of the digital camera.

However, the communication method disclosed in the above-mentioned patent document has a problem in that it is difficult to maintain secrecy. That is, because a code image displayed on a monitor of own digital camera (hereinafter, "own apparatus") cannot be prevented from being taken by a third digital camera which is different from the other digital camera (hereinafter, other apparatus) to be communicated with the own apparatus, it is possible that the third digital camera receives image data from the own apparatus.

Because the own apparatus allows the other apparatus to take a photo of the code image in order to transfer the code data containing an IP address or a MAC address of the own apparatus, it is considered to send the code data to the other apparatus using, for example, infrared communication. The infrared communication does not require an IP address or a MAC address to initiate communication. Thus, if the own apparatus initially sends the code data to the other apparatus, thereafter, the own apparatus (digital camera A) and the other apparatus (digital camera B) can exchange image data according to a high-speed wireless LAN or the like.

However, in order for the own apparatus and the other apparatus to make infrared communication, it is necessary to mount an infrared communication device to each of the own apparatus and the other apparatus, which increases a manufacturing cost of the own apparatus and the other apparatus. Additionally, it is difficult to make communication if the light emitting and receiving elements of the own apparatus and the other apparatus do not face each other because infrared rays have relatively high directivity. It is not easy for users of the own apparatus and the other apparatus to hold the own apparatus and the other apparatus by hand to cause the light emitting and receiving elements of the own apparatus and the other apparatus to face each other because the light emitting and receiving elements of the own apparatus and the other apparatus are relatively small in size. Thus, it is preferable to place the own apparatus and the other apparatus on a flat surface such as a desk top. In such a case, however, the light emitting and receiving elements of the infrared communication devices of the own apparatus and other apparatus do not always face each other in the state where the own apparatus and the other apparatus are placed on a flat surface.

If the directivity of infrared rays is weakened or infrared rays are strengthened in order to reduce influences of the directivity of infrared rays, there is a risk that a third digital camera, which is different from the other apparatus, can make infrared communication with the own apparatus. Therefore, in consideration of manufacturing cost, convenience of use and maintenance of secrecy, transferring code data according to photographing of a code image is more suitable than transferring code data according to infrared communication.

SUMMARY OF THE INVENTION

It is a general object of the present invention to provide a photographing apparatus and a communication establishing method in which the above-mentioned problems are eliminated.

A more specific object of the present invention is to provide a photographing apparatus and a communication establishing method, which can improve maintenance of secrecy when exchanging information according to photographing of a code image.

In order to achieve the object, there is provided according to one aspect of the present invention a photographing apparatus comprising: an operation part configured to receive an operation; an encoding part configured to create a code image from authentication information of the photographing apparatus; a display part configured to display at least one of an image of a photographing subject, an operation menu and the code image; a photographing part configured to take a photograph of a connection code image displayed on a display part of another apparatus different from the photographing apparatus; a decoding part configured to decode the connection code image contained in the photograph taken by the photographing part to decode encoded connection information containing communication setup information, which is used in establishing a radio communication and has been encoded according to the authentication information of the photographing apparatus; a restoration part configured to restore the communication setup information from the encoded connection information, which has been decoded by the decoding part, by using the authentication information of the photographing apparatus; and a radio communication part configured to communicate with the another apparatus by using the communication setup information restored by the restoration part.

Additionally, there is provided a communication establishing method to establish a communication between a first photographing apparatus and a second photographing apparatus, the communication establishing method comprising: a first encoding part of the first photographing apparatus creating a first code image containing first authentication information; displaying the first code image on a first display part of the first photographing apparatus; taking a photograph of the first code image displayed on the first display part by a second photographing part of the second photographing apparatus; decoding the first authentication information from the first code image by a second decoding part of the second photographing apparatus; creating, by a second encoding part of the second photographing apparatus, encoded connection information by encoding communication setup information used for radio communication according to the first authentication information; displaying a second code image on a second display part of the second photographing apparatus, the second code image containing the encoded connection information; photographing the second code image displayed on the second display part by a first photographing part of the first photographing apparatus; decoding the encoded connection information from the second code image by a first decoding part of the first photographing apparatus; restoring the communication setup information from the encoded connection information by using the first authentication information by a restoration part of the second photographing apparatus; and causing a first radio communication part of the first photographing apparatus to communicate with the second photographing apparatus by using the communication setup information, which is restored by the restoration part.

Further, there is provided a computer readable program for causing a photographing apparatus to perform a communication establishing method, the photographing apparatus including: an operating part configured to receive an operation; a display part configured to display at least one of an image of a photographing subject, an operation menu and a code image; a photographing part configured to take a photograph of a connection code image displayed on a display part of another apparatus different from the photographing apparatus; and a radio communication part configured to communicate with the another apparatus, the communication establishing method comprising: creating the code image from authentication information by encoding; decoding encoded connection information from the connection code image photographed by the photographing part, the encoded connection information containing communication setup information, which is encoded according to the authentication information of the photographing apparatus and used for a radio communication; restoring the communication setup information from the encoded connection information decoded by the decoding part by using the authentication information of the photographing apparatus; and causing the photographing apparatus to communicate with the another apparatus by setting the restored communication setup information to the radio communication part.

According to the above-mentioned invention, communication between the photographing apparatus (own apparatus) and another apparatus cannot be established until another apparatus acquires authentication information of the own apparatus necessary for the code image for connection and the own apparatus takes the code image for connection displayed on the display part of another apparatus. Therefore, improved confidentiality is provided to the photographing apparatus.

Other objects, features and advantages of the present invention will become more apparent from the following detailed description when read in conjunction with the accompanying drawings.

BRIEF DESCRIPTION OF THE DRAWINGS

FIG. 18 is a flowchart of a process procedure of the cameras A and the camera B;

FIG. 19A is an illustration of a service offer menu screen;

FIG. 19B is an illustration of a code photographing screen;

FIG. 19C is an illustration of a code image recognition screen;

FIG. 19D is an illustration of a second code display screen;

FIG. 19F is an illustration of a connection completion screen;

FIG. 20A is an illustration of a service use menu screen;

FIG. 20F is an illustration of a connecting screen;

FIG. 20G is an illustration of a second connection completion screen;

FIG. 21 is a flowchart of a process from step S11 through step S16 performed in the camera A;

FIG. 45 is an illustration of the monitor display part of the camera B in a remote control operation.

DETAILED DESCRIPTION OF THE PREFERRED EMBODIMENTS

A description will be given below, with reference to the drawings, of embodiments of the present invention.

Figure 1:
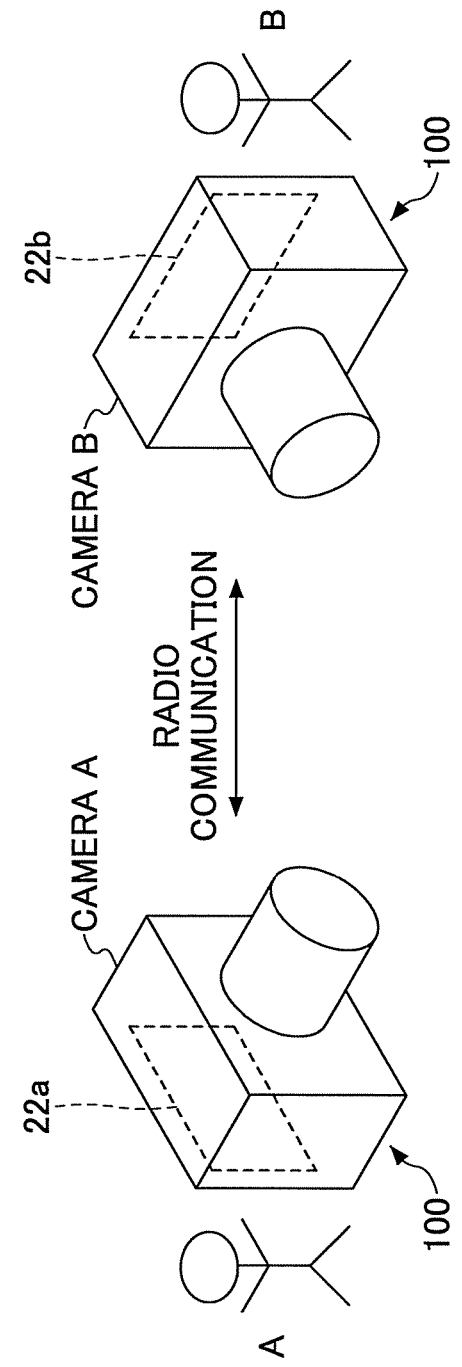
FIG. 1 is an illustration of a camera system provided with two digital cameras.

FIG. 1 is an illustration of a camera system provided with two cameras. Each of the digital cameras 100 displays a code image of arbitrary information on a monitor display part 22. The code image displayed by one of the digital cameras 100 is image-taken by the other of the digital cameras 100 so that the other of the digital cameras 100 decodes the code image to acquire the arbitrary information represented by the code image.

Hereinafter, one of the two digital cameras 100 is referred to as a camera A, and the other of the digital cameras 100 is referred to as a camera B. Similarly, a suffix "a" represents a function of the camera A, and a suffix "b" represents a function of the camera B. Although it is assumed that a user B of the camera B desires to communicate with the camera A in the following description, a user A of the camera A may desire to communicate with the camera B. That is, in the embodiment mentioned below, the communication establishing method is the same even if the operation of the camera A and the operation of the camera B are switched. It should be noted that the user A of the camera A and the user B of the camera B can be the same person.

Moreover, at least one of the camera A and the camera B may be referred to by any designation other than a digital camera if it has a digital camera function. That is, for example, the camera A or the camera B may be a cellular phone, a personal digital assistant (PDF), a PHS, a smart phone, an audio player, a personal computer, a digital book, etc., which incorporates a digital camera function therein.

A description is given below of an example of a procedure of the communication establishing method according to the present embodiment.

1. The camera B displays a code image of authentication information B on the monitor display part 22b of the camera B.

2. The camera A takes a photo of the code image (photo 1).

3. The camera A decodes the code image to acquire the authentication information B.

4. The camera A enciphers communication setup information using the authentication information B.

5. The camera A displays a code image of the encoded communication setup information on the monitor display part 22a of the camera A.

6. The camera B takes a photo of the code image (photo 2).

7. The camera B decodes the code image to acquire the enciphered communication setup information.

8. The camera B restores the communication setup information, which has been enciphered using the authentication information B.

9. The camera B performs a communication setup according to the communication setup information to connect to the camera A.

Therefore, in the communication establishing method according to the present embodiment, two photos must be taken before the cameras A and B initiate communication between one another. If a third camera takes a photo of the code image without permission when taking the photo 1, the third camera cannot establish communication with the camera A because the code image does not contain the communication setup information. Additionally, if a third camera takes a photo of the code image without permission when taking the photo 2, the third camera cannot establish communication with the camera A because the encoded communication setup information cannot be decoded by the code image alone.

Thus, according to the present embodiment, the third camera cannot establish communication with the camera A without taking a photo of both the monitor display parts 22a and 22b of the cameras A and B, thereby remarkably improving confidentiality. Because a range in which the camera A or B can take a photo of the code image appropriately is generally narrower than a radio-communicable range, the security can be improved easily. Additionally, an increase in a manufacturing cost of the cameras A and B can be improved easily because there is no need to add any special hardware in taking a photo of the code image. Further, because taking a photo of a code displayed on a monitor has become popular in a cellular phone field, encoding or decoding cost can be reduced easily.

(Hardware Structure)

Figure 2:
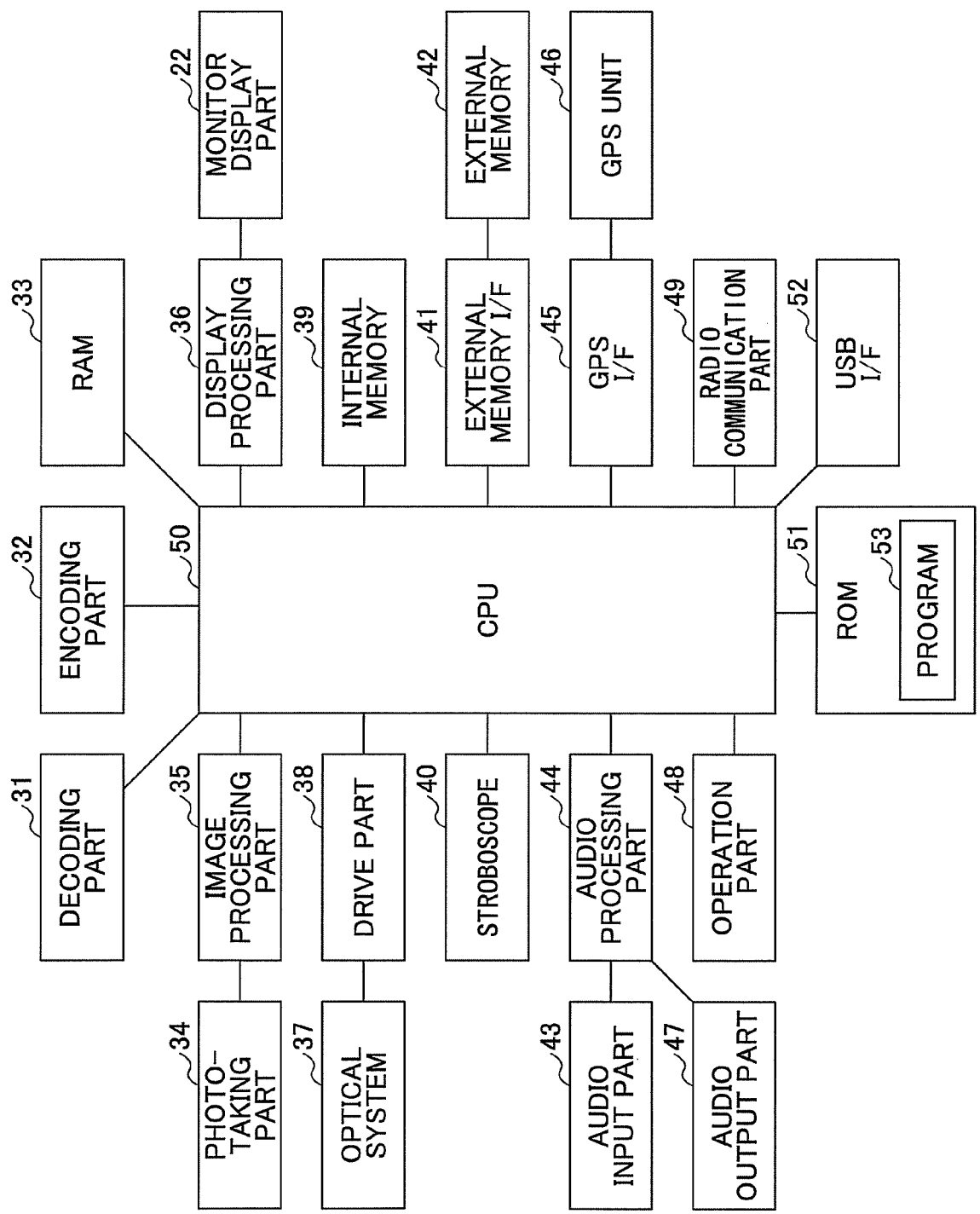
FIG. 2 is a block diagram of one of the digital cameras illustrated in FIG. 1.

FIG. 2 is a block diagram of the camera A and the camera B. The camera A and the camera B are controlled by a central processing unit (CPU) 50. A photographing part 34, an image processing part 35, an optical system 37, a drive part 38, a stroboscope 40, an operation part 48, a display processing part 36, and the monitor display part 22 are blocks common to a generally used digital camera.

The optical system 37 includes a zoom lens, a focal lens, an iris diaphragm, a mechanical shutter, etc. The drive parts 38 include a zoom motor, a focal motor, an iris diaphragm motor, a mechanical shutter motor, etc., which drive each part of the optical system 37

A light passed through the optical system 37 forms an image on the photographing part 34 through color filter. The photographing part 34 is a photoelectric conversion element such as, for example, a CCD or a CMOS in which a photoelectric conversion element is provided for each color R, G, B. The image processing part 35 samples an analog image signal in synchronization with a VD·HD signal supplied by a timing generator. The image processing part 35 includes a CDS, which performs correlation double sampling, an AGC, which carries out a gain adjustment automatically, and an A/D conversion part, etc., in order to convert analog image data into digital image data. In addition, the image processing part 35 applies a noise reduction process, a gain adjustment, etc. to the image data. Additionally, in the present embodiment, the image processing part 35 recognizes (detects) a code image from a photographic subject image.

The stroboscope includes a strobe LED and a strobe drive part for causing the strobe LED to emit a light. The strobe LED emits a light in cooperation with an operation of the photographing part 34. The operation part 48 is equipped with various kinds of switches as illustrated in FIG. 3.

Figure 3:
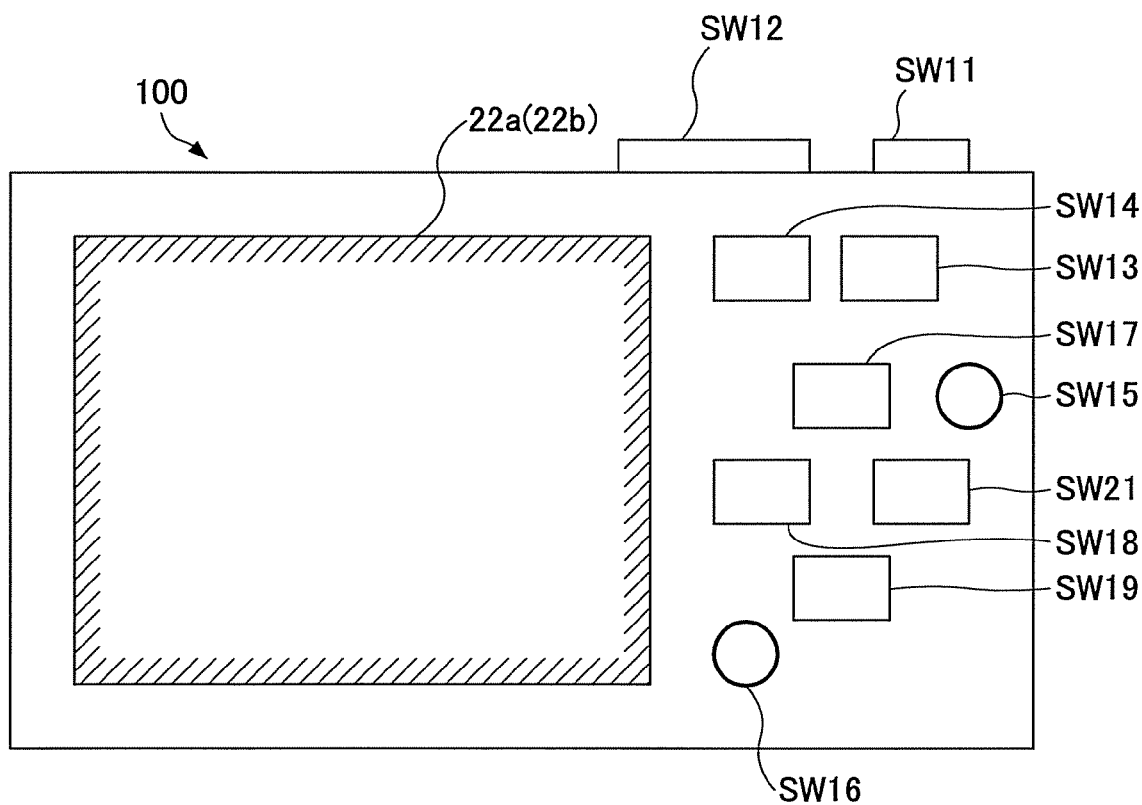
FIG. 3 is a rear view of one of the digital cameras illustrated in FIG. 1.

FIG. 3 is a rear view of the digital camera according to the present embodiment. As illustrated in FIG. 3, the operation part 48 includes a release switch SW11, a mode dial switch SW12, a wide angle zoom switch SW14, a telephotographic zoom switch SW13, a self-timer setup/cancel switch SW16, a menu switch SW15, an upper movement/stroboscope setup switch SW17, a right movement switch SW21, a downward movement/macro setup switch SW19, and a photo check switch SW18. In addition, a quick access switch, a main power switch, a display switch, etc., may be provided.

The monitor display part 22a or 22b is used for monitoring a photographic subject while taking a photo, displaying a photo after taking the photo, displaying an image stored in an internal memory 39, and displaying a remaining power stored in a battery cell. The display processing part 36 is a LCD driver, which drives the monitor display part 22a or 22b. The monitor display part 22a or 22b may be equipped with a touch panel. A code image 61 is displayed on the monitor display part 22a or 22b.

An audio input part 43 is a so-called microphone, which converts a voice into an audio signal and amplifies the input audio signal by an amplifier. An audio processing part 44 converts the analog audio signal into a digital audio signal, and supplies the digital audio signal to the CPU 50. An audio output part 47 converts the digital audio data stored in a RAM 33 or the like into an analog audio signal, and causes a speaker to output a sound by amplifying the analog audio signal by an amplifier and supplying the amplified analog audio signal to the speaker.

A random access memory (RAM) 33 is a work memory, which temporarily stores a program 53 and data when the CPU executes the program 53. RAM 33 includes, for example, a static dynamic random access memory (SDRAM). The RAM 33 serves as a frame memory to store a plurality of sets of image data that include RAW-RGB image data, YUV image data, and JPEG image data. The RAW-RGB image data is generated by converting the image data created by taking a photo (image data) subjected to a white balance correction process and a gamma correction process. The YUV image data is generated by converting the image data into intensity data and color difference data. JPEG image data is generated by compressing the image data according to JPEG.

An external memory 42 is a non-volatile memory such as, for example, an SD card, a multimedia card, etc. The external memory 42 is detachably attached to an external memory interface (I/F) 41. A program executed by the digital camera to perform a communication establishing method mentioned later may be stored in the external memory 42. The digital camera reads the communication establishing program stored in the external memory 42 and temporarily stores the communication establishing program in the RAM 33 so that the CPU 50 can execute the communication establishing program to perform the communication establishing method. Other programs may be stored in the external memory 42 and read by the digital camera so that the digital camera performs various operations.

A USB interface (I/F) 52 is used to connect a USB cable to connect other devices or connect a USB memory. A read only memory (ROM) 51 stores the program 53, various parameters, communication setup information, photographing condition information, authentication information, etc.

A radio communication part 49 is a short distance radio communication unit such as, for example, a radio LAN specified by IEEE802.11. Alternatively, the radio communication part 49 may be a Bluetooth (trademark) a ZigBee (trademark), a wireless USB or the like. Additionally, the radio communication part 49 may use a WiMAX (trademark), which uses a radio communication network of cellular phones. Further, the radio communication part 49 may use communication according to a plurality of different communication standards.

A GPS unit 46 is detachably connected to the CPU 50 via a GPS interface (I/F) 45. The GPS unit 46 acquires present position information (coordinates data). The CPU 50 can store image data by relating to position information.

Figure 4A:
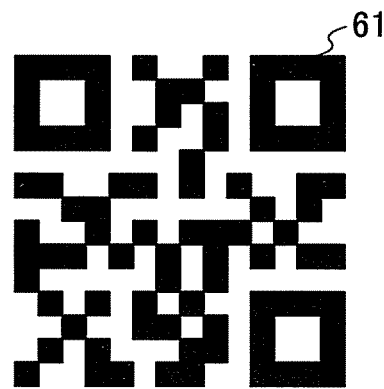
FIG. 4A is an illustration of an example of a code image.

An encoding part 32 converts digital data such as photographing condition information or communication setup information into a code image according to a predetermined operation rule. FIG. 4A is an illustration of an example of the code image 61. Although the code image 61 illustrated in FIG. 4A is a QR code (registered trademark), a two-dimensional code, a one-dimensional code (bar code) or a color code may be used.

The code image 61 contains digital data indicating "ISO800:FLASH PROHIBITED" as photographing condition information and "http://192.168.0.1/IMAGES/0001.jpg" as communication setup information.

Figure 4B:
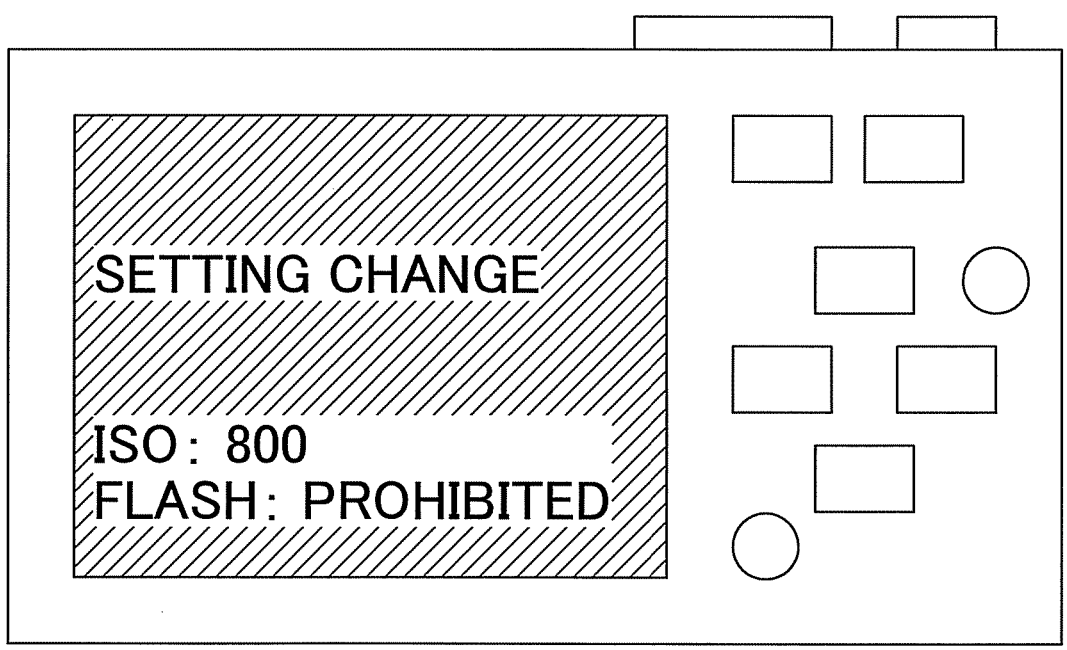
FIG. 4B is an illustration of a monitor display part displaying an example of a photographing condition.

In addition, characters, signs and numbers, which are not a code image, may be displayed on the monitor display part 22a or 22b. FIG. 4B is an illustration of a monitor display part displaying an example of a photographing condition. In the example illustrated in FIG. 4B, "SETTING CHANGE", "ISO:800" and "FLASH:PROHIBITED" are indicated by characters. The other of the camera A and the camera B takes a photo of the characters, and converts the image data into digital data using character recognition.

A decoding part 31 decodes the code image 61 such as illustrated in FIG. 4A according to a predetermined operation rule in order to convert the code image 61 into the original digital data such as communication setup information, photographing condition information and setup information mentioned later.

Before giving a description of a communication establishing method according to the present embodiment, a description will be given below of a conventional photographing method of the code image 61. When the user B of the camera B desires to communicate with camera A, the camera A converts the communication setup information into the code image 61 in order to provide the communication setup information from the camera A to the camera B.

As a general condition, it is considered that the user A of the camera A is requested by the user B of the camera B to display the code image 61. Although the camera A can display the communication setup information stored in the ROM 51 on the monitor display part 22a as digital data without change, in this case, the user B visually recognizes the display monitor part 22a and manually sets the communication setup information to the camera B. However, it is possible that the user B sets incorrect information by mistake. Thus, it is desirable to input the communication setup information to the camera B by taking a photo of the code image 61 by the camera B.

Figure 5:
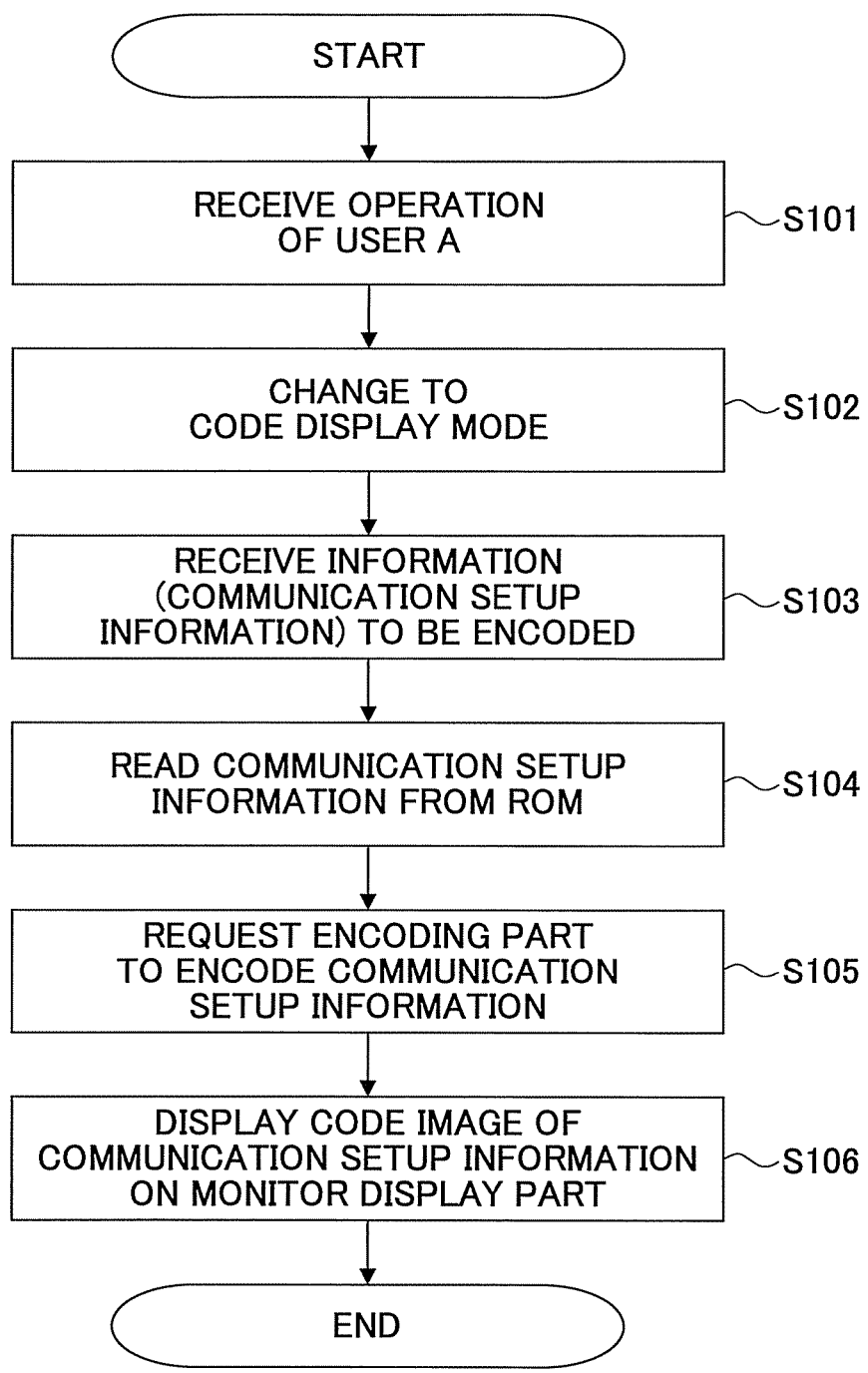
FIG. 5 is a flowchart of a procedure of converting communication setup information to a code image by a camera.

FIG. 5 is a flowchart of a procedure of converting the communication setup information to the code image 61 by the camera A. Hereinafter, it is described that the CPU 50 performs a process, but actually the process is performed by the CPU 50 executing the program 53.

Upon reception of the request of the user B the user A operates the operation part 48 of the camera A (for example, the mode dial switch SW12) to switch the operation mode of the camera A to a "code display mode". The CPU 50 of the camera A receives this operation (S101). The operation mode may include a photographing mode, a reproduction mode (image display mode), a code reading mode, etc. The CPU 50 of the camera A activates a code display application to set the code display mode.

The CPU 50 of the camera A changes the operation mode of the camera A into the "code display mode" (S102). When the operation mode is changed, for example, from the photographing mode into the code display mode, a photographic subject image, which has been displayed on the monitor display part 22a, disappears, and, instead, a message to guide the user A is displayed on the monitor display part 22a. For example, the CPU 50 of the camera A displays on the monitor display part 22a the message "select information to encode" and a list of information which is to be encoded. The information which is to be encoded includes, for example, the communication setup information, the photographing condition information, the setting information, etc.

When the user A operates the operation part 48 to select the communication setup information as information to be encoded, the CPU 50 of the camera A receives the selected information (S103). The CPU 50 of the camera A reads the communication setup information from the ROM 51 or the RAM 33 (S104).

The CPU 50 of the camera A sends the read communication setup information to the encoding part 32 and requests encoding of the communication setup information (S105). Thereby, the encoding part 32 creates the code image 61, and sends the created code image 61 to the CPU 50.

The CPU 50 of the camera A sends the code image 61 of the communication setup information to the monitor display part 22a and requests display of the code image 61. The monitor display part 22a displays the code image 61 (S106).

Figure 6:
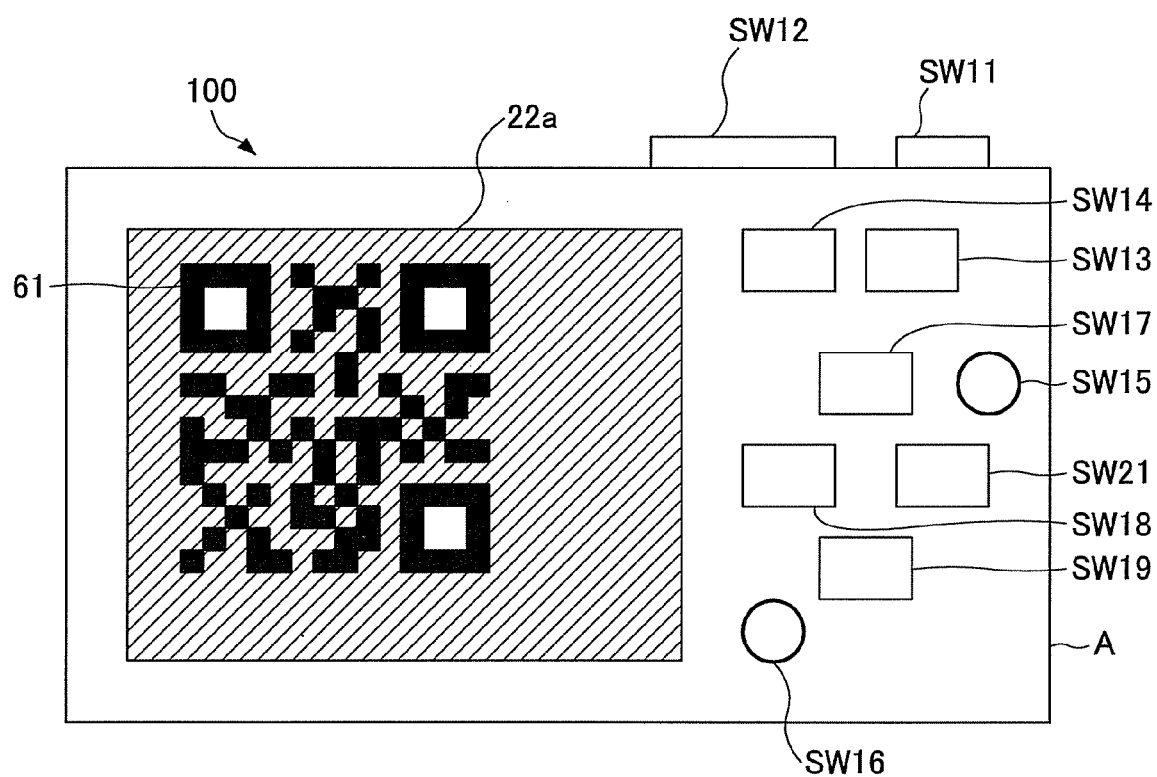
FIG. 6 is an illustration of an example of the code image displayed on a monitor display part.

FIG. 6 is an illustration of an example of the code image 61 displayed on the monitor display part 22a of the camera A. For example, the communication setup information "http://192.168.0.1/IMAGES/" is encoded in the code image 61. Alternatively, a password such as, for example, "XXYYZZ" may be included in the code image 61.

A description will be given below of a procedure of decoding the code image 61 by the camera B, the code image 61 being acquired by the camera B by taking a photo of the code image 61 displayed on the monitor display part 22a of the camera A. There are a method of taking a still picture of the code image 61 and a method of taking a moving picture of the code image 61 by activating a corresponding application.

Figure 7:
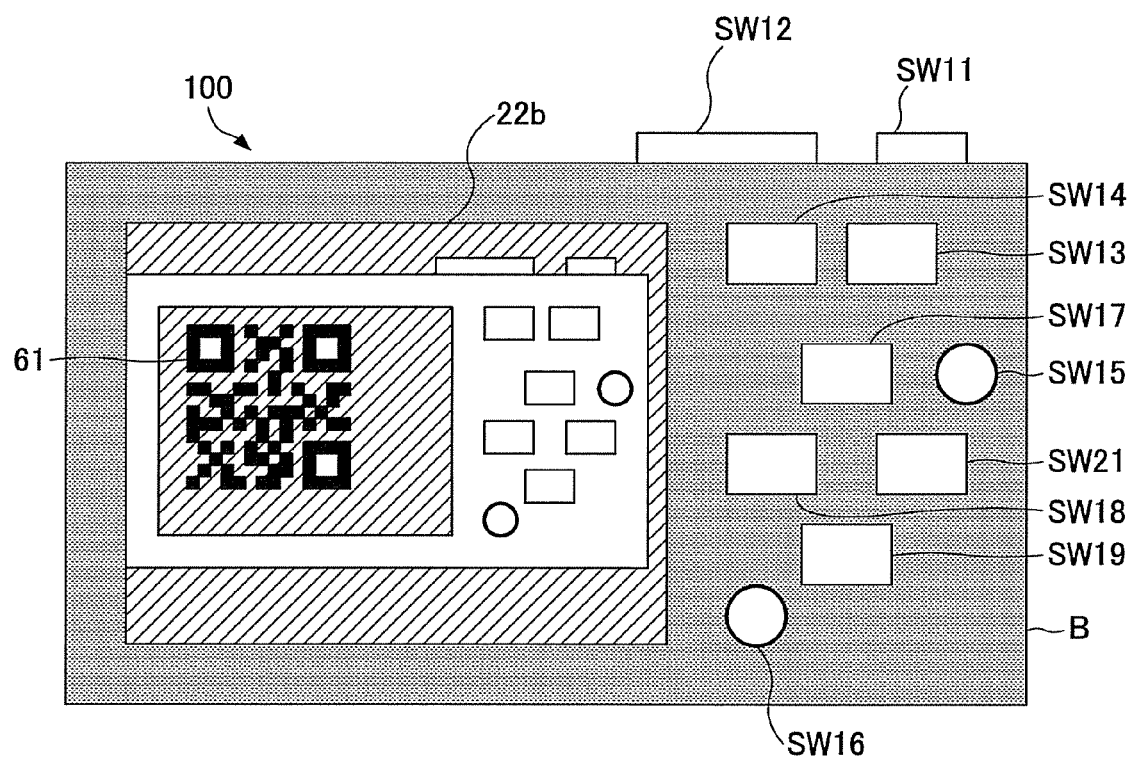
FIG. 7 is an illustration of an example of a still picture of the code image.

FIG. 7 is an illustration of an example of the still picture of the code image 61 taken by the camera B. The user A exhibits the monitor display part 22a to the user B when the code image 61 is displayed on the camera A as illustrated in FIG. 6. Thus, an entire back side of the camera A is displayed on the monitor display part 22b of the camera B. Then, the CPU 50 of the camera B requests the decoding part 31 of the camera B to decode the code image 61. Thus, the decoding part 31 of the camera B acquires the original communication setup information "http://192.168.0.1/IMAGES/". The CPU 50 of the camera B sets the communication setup information to the radio communication part 49.

Figure 8:
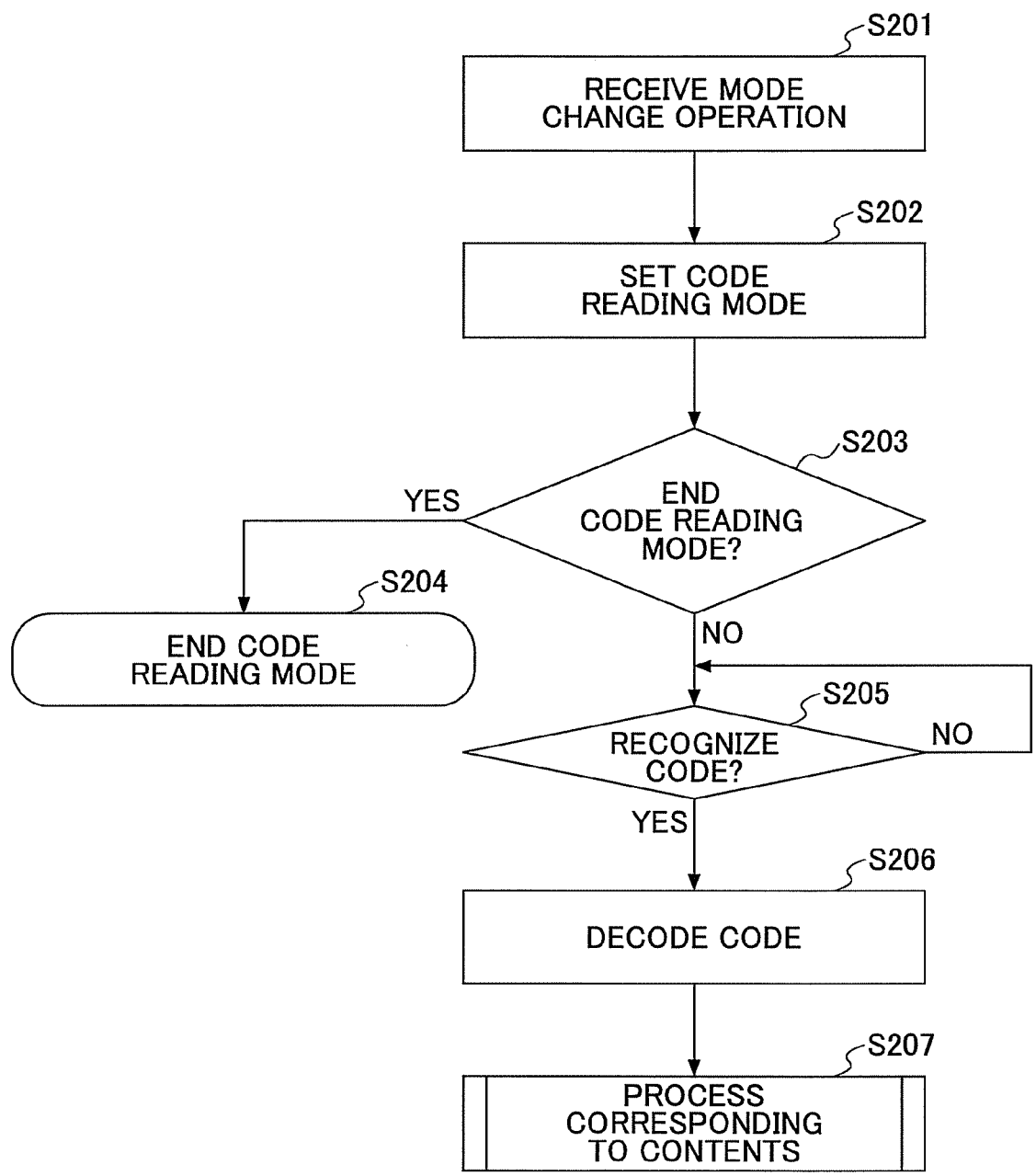
FIG. 8 is a flowchart of a procedure of decoding the code image displayed on the monitor display part by using a moving picture of the code image taken by the camera.

FIG. 8 is a flowchart of a procedure of decoding the code image 61 displayed on the monitor display part 22a of the camera A by using a moving picture of the code image 61 taken by the camera B.

The user B operates the operation part 48 of the camera B to change the operation mode of the camera B to the "code reading mode". The CPU 50 of the camera B receives the operation (S201). The CPU 50 of the camera B changes the operation mode of the camera B to the "code reading mode" (S202). The CPU 50 of the camera B activates a code reading application, which is to be activated when the code reading mode is set. The code reading application is stored in the ROM 51.

Figure 9:
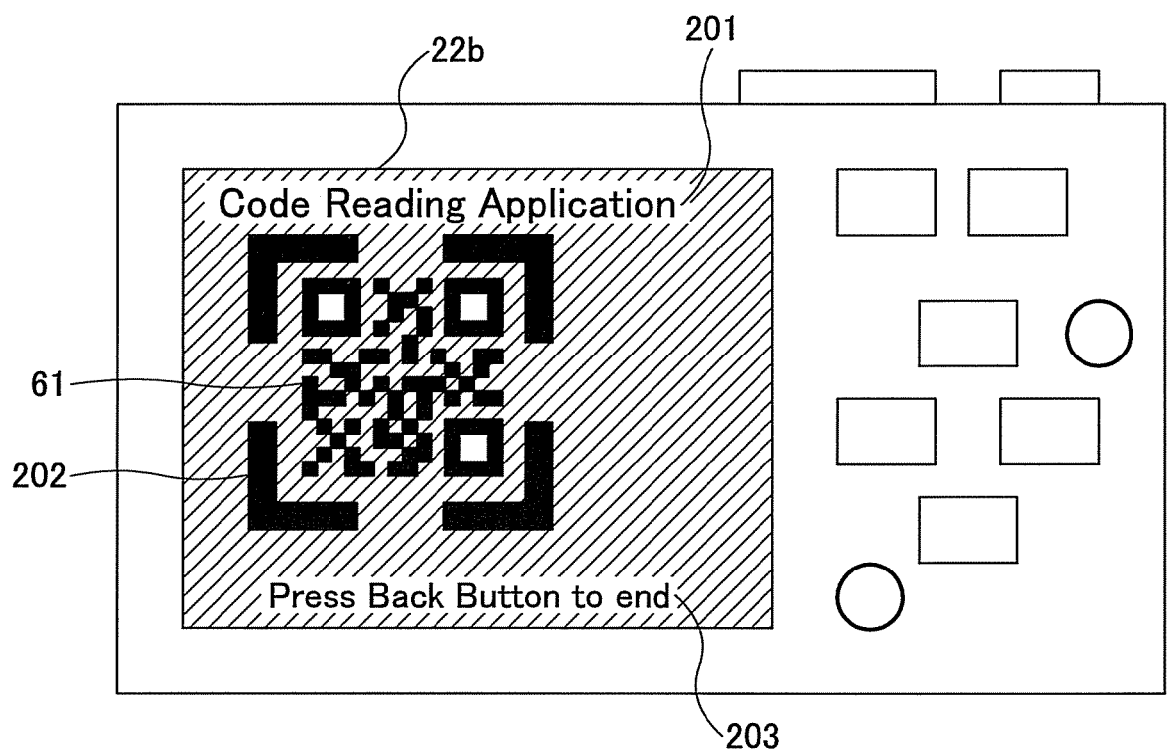
FIG. 9 is an illustration of the monitor display part of the camera when a code reading application is activated.

FIG. 9 is an illustration of a monitor display part 22b of the camera B when a code reading application is activated. A message "Code Reading Application", a cursor 202, and a message 203 "End by Back Button" are displayed on the monitor display part 22b. The user B adjusts the position of the camera B and zooming so that the code image 61 is located within the cursor 202. The code reading mode is a mode to take a photo of a photographic subject (code image 61) similar to the photographing mode. Thus, the photographic subject is displayed on the monitor display part 22b even if the operation mode is changed from the photographing mode to the code reading mode.

When the code reading application is activated, the CPU 50 of the camera B may automatically change to a macro mode and control the optical system 37 so that a focus is set to a short distance within 1 m.

Returning to FIG. 8, the CPU 50 of the camera B determines whether the user causes the code reading mode to end (S203). If the user B operates the operation part 48 to change to, for example, the photographing mode (YES of S203), the CPU 50 of the camera B ends the code reading mode (S204). When the "Back Button" is pressed and an instruction to end the code reading mode is supplied, the CPU 50 of the camera B ends the code reading mode and returns the operation mode to the immediately preceding operation mode.

On the other hand, if the user B does not operate the operation part 48 to change the operation mode to the photographing mode (NO of S203), the CPU 50 of the camera B is notified by the image processing part 35 as to whether a photo of the code image 61 is taken.

Then, the image processing part 35 determines whether the code image 61 can be recognized from the photographic subject (S205). If the code image 61 is recognized, the decoding part 31 decodes the code image 61 and sends the result of decoding to the CPU 50 of the camera B (S206).

Figure 10:
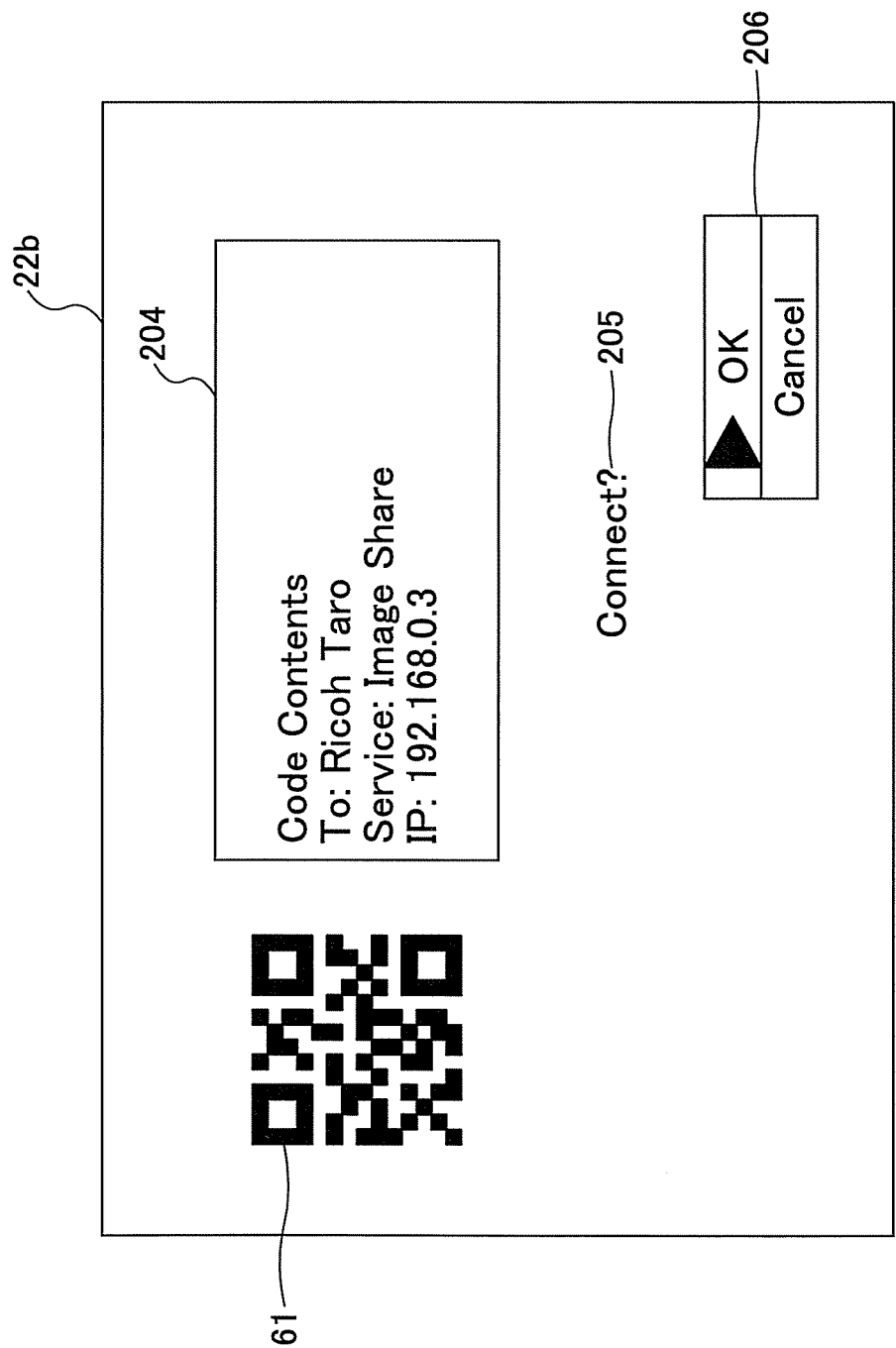
FIG. 10 is an illustration of the monitor display part displaying an example of a decoding result.

The CPU 50 of the camera B displays the decoding result 204 on the monitor display part 22b of the camera B. FIG. 10 illustrates the monitor display part 22b displaying an example of the decoding result 204. The decoding result 204 illustrated in FIG. 10 includes "Code Contents, To: Ricoh Taro, Service: image share, IP: 192.168.0.3". The decoding result 204 contains the communication setup information.

The CPU 50 of the camera B performs a process corresponding to the contents of the code upon checking with the user B if necessary (S207). For example, the camera B acquires the IP address "192.168.0.3" of the camera A and connects to the camera A. Alternatively, the camera A requests a connection, and a display screen for requesting permission of a display of authentication information for permitting the connection is displayed. If the user B gives permission, a process corresponding to the contents of the display is performed.

For example, in FIG. 10, the encoding result 204 describes that connecting with the camera A given the name "Ricoh Taro" by an application given a designation "Image Share". Additionally, a message 205 "connect?" is displayed to confirm whether the setting can be changed. If the user B selects "OK" by operating the operation part 48, the CPU 50 of the camera B sets the communication setup information to the radio communication part 49 so that the camera B can communicate with the camera A. On the other hand, if the user B selects "Cancel" by operating the operation part 48, the CPU 50 of the camera B does not set the communication setup information to the radio communication part 49.

As mentioned above, the camera B does not take a still picture and the key frame images of the video image acquired by the photographing part 34 are sequentially transferred to the image processing part 35. Thereby, the image processing part 35 can monitor the code image 61 and recognize the code image 61 in real time.

A description will be given below of a variation of the procedure of decoding the code image 61 by taking by the camera B a photo of the code image 61 displayed on the monitor display part 22a of the camera A.

Figure 11:
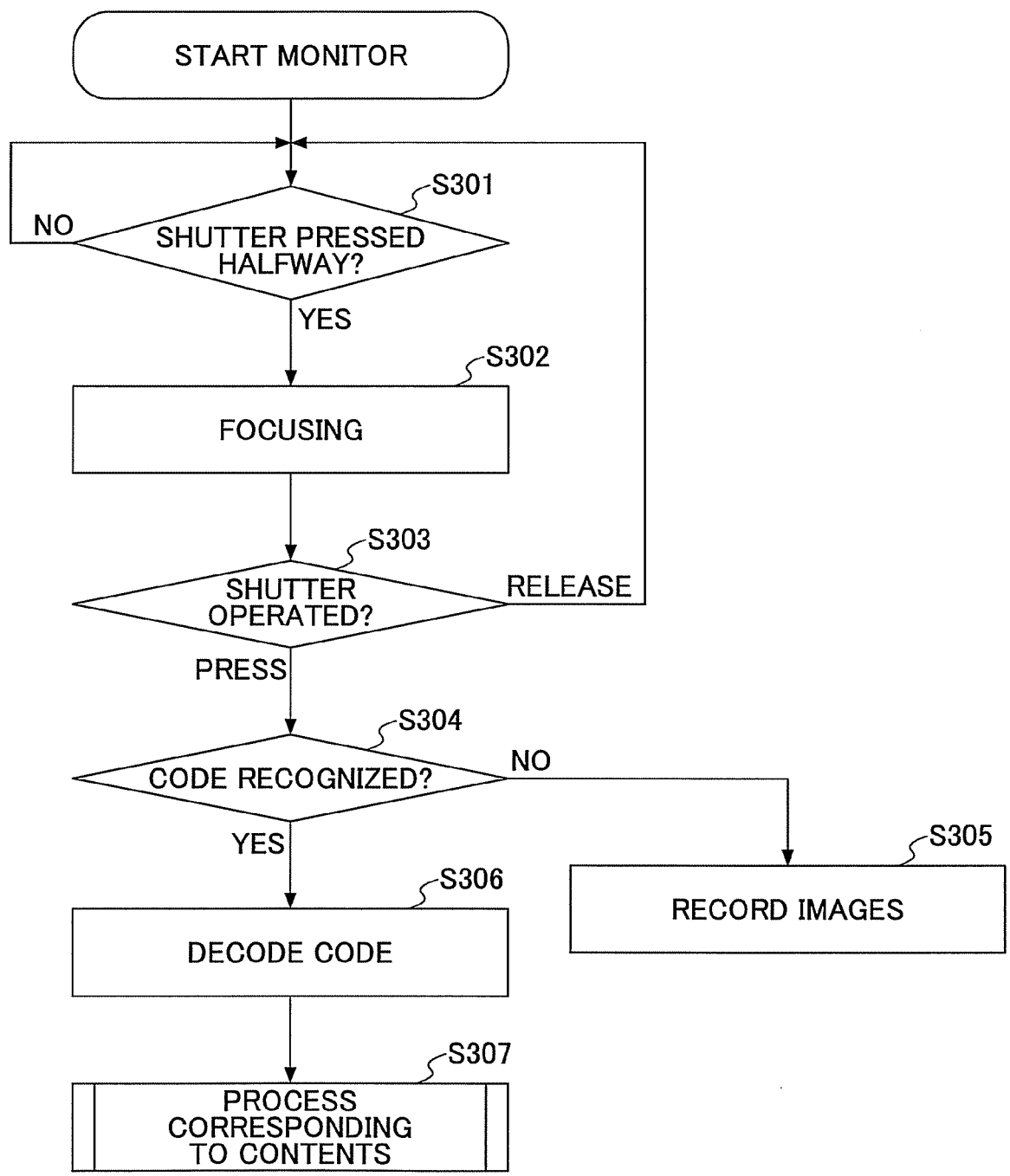
FIG. 11 is a flowchart of a procedure of decoding the code image.

FIG. 11 is a flowchart of a procedure of decoding the code image 61 by the camera B. In the procedure of FIG. 11, the camera B does not activate the code reading application to set the code reading mode, but recognizes the code image 61 in a state where a still picture is taken.

The user B half-presses the release switch SW11 (shutter button) in a state where the monitor display part 22a of the camera A is located within a photo range. When the camera B detects the half-press of the release switch SW11 (YES of S301), the camera B focuses on the photographic subject (S302).

If an auto-focus function is used, the CPU 50 of the camera B sends key frames to the image processing part 35. The image processing part 35 performs recognition of the code image 61. During this process, the CPU 50 of the camera B monitors whether the release switch SW11 is fully pressed (S303). Until the release switch SW11 is fully pressed (NO of S303), the CPU 50 of the camera B repeats the process from step S301 to step S303 to focus on the photographic subject.

If the release switch SW11 is fully pressed (YES of S303), the CPU 50 of the camera B determines whether the image processing part 35 recognized the code image 61. If the image processing part 35 did not recognize the code image 61 (NO of S304), the CPU 50 of the camera B takes a still picture of the photographic subject (S305) because it means that the code image 61 does not exist in the image of the photographic subject.

If the image processing part 35 recognized the code image 61 (YES of S304), the decoding part 31 decodes the code image 61 (S306). Because the decoding result such as illustrated in FIG. 10 is obtained, the CPU 50 of the camera B performs a process corresponding to the contents of the code upon checking with the user B similar to the case of FIG. 5 (S307).

A description will be given below of another variation of the procedure of decoding the code image 61 by taking by the camera B a photo of the code image 61 displayed on the monitor display part 22a of the camera A.

Figure 12:
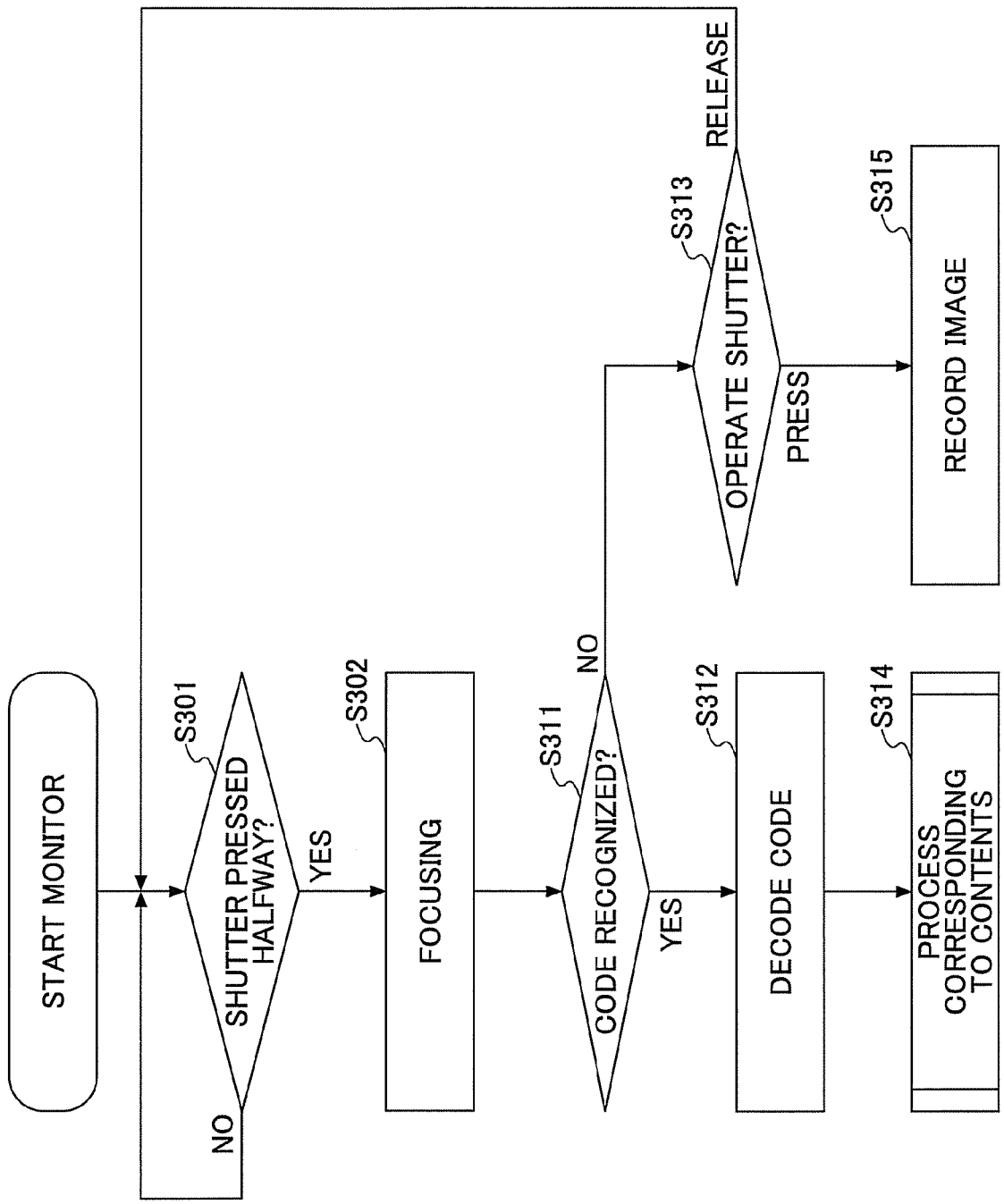
FIG. 12 is a flowchart of another procedure of decoding the code image.

FIG. 12 is a flowchart of a procedure of decoding the code image 61 by the camera B. In the procedure of FIG. 12, similar to the procedure of FIG. 11, the camera B does not activate a code reading application. In FIG. 12, steps the same as the steps in FIG. 11 are given the same step numbers, and description thereof will be omitted.

In the procedure of FIG. 12, the image processing part 35 performs a recognizing operation of the code image 61 without fully pressing the release switch SW11 by the user (S311). If the image processing part 35 recognized the code image 61 (YES of S311), the decoding part 31 decodes the code image 61, and the CPU 50 of the camera B performs a process corresponding to the contents of the code (S314). That is, the code image can be recognized without fully pressing the release switch SW11 by the user B.

On the other hand, if the image processing part 35 does not recognize the code image 61 (NO of S311), the CPU 50 of the camera B determines whether the release switch SW11 is fully pressed (S313). If the release switch SW11 is fully pressed (YES of S313), the CPU 50 of the camera B takes a photo of the photographic subject as a still picture as it is (S315).

A description will be given below of a system operation of the cameras A and B.

The camera A may request the setup information, which the camera A desires to acquire from the camera B, using the code image 61. As a procedure, first, the camera A displays the code image 61 indicating setup information, which the camera A desires to acquire from the camera B, on the monitor display 22a of the camera A. The camera B, which took a photo of the monitor display part 22a of the camera A, which is displaying the code image 61, initiates communication with the camera A by using the radio communication unit. Then, the camera B sends the requested setup information to the camera A. Here, a description is given using an example in which the camera A requests the camera B to send white balance setup information, which the user B sets to the camera B.

Figure 13:
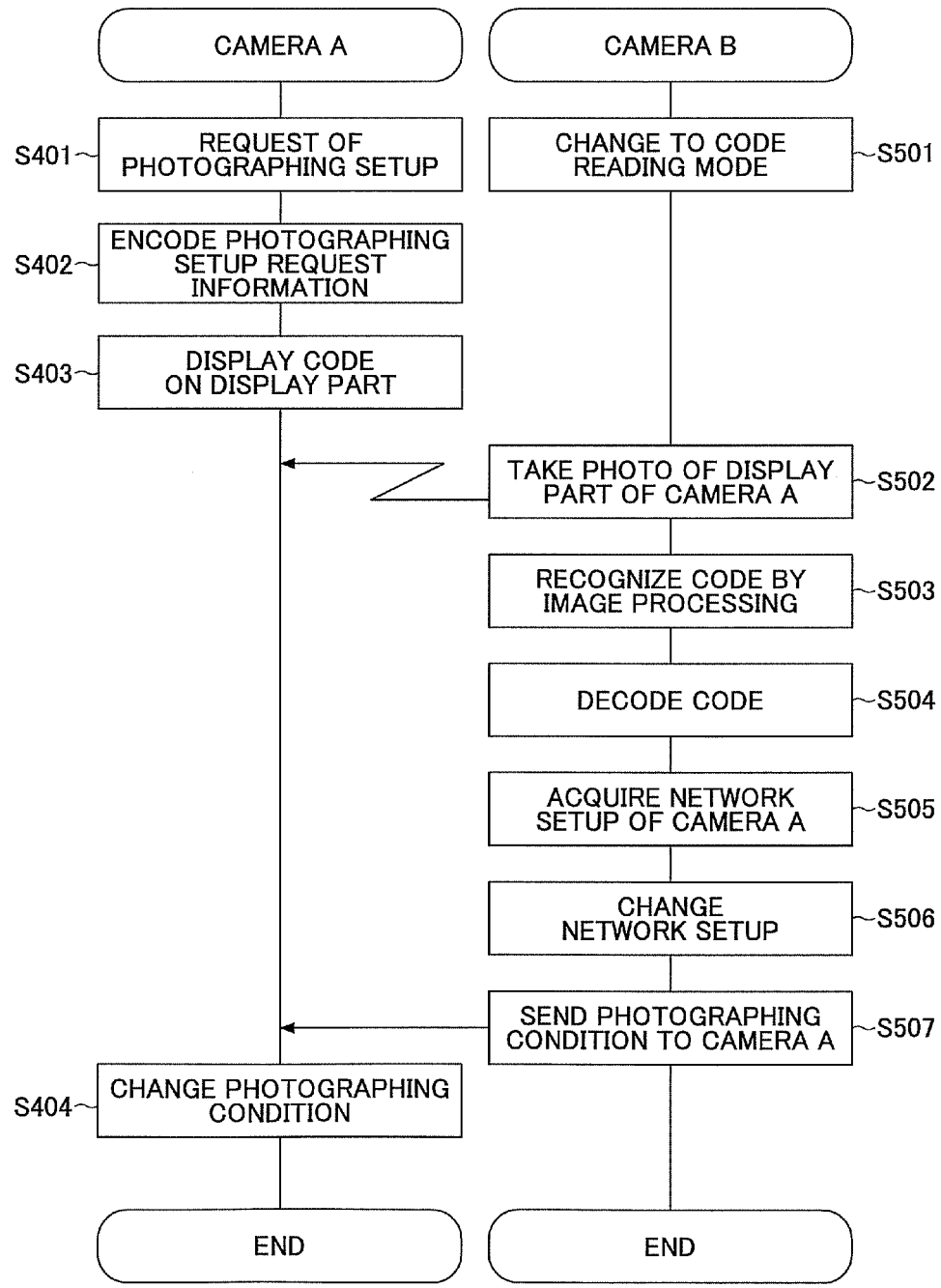
FIG. 13 is a flowchart of a procedure of requesting setup information, which a camera A desires to acquire from the camera B.

FIG. 13 is a flowchart of a procedure of requesting setup information, which the camera A desires to acquire from the camera B.

The user A operates the operation part 48 of the camera A to cause the camera A to display the code image, which requests photography conditions, on the monitor display part 22a (S401).

Figure 14A:
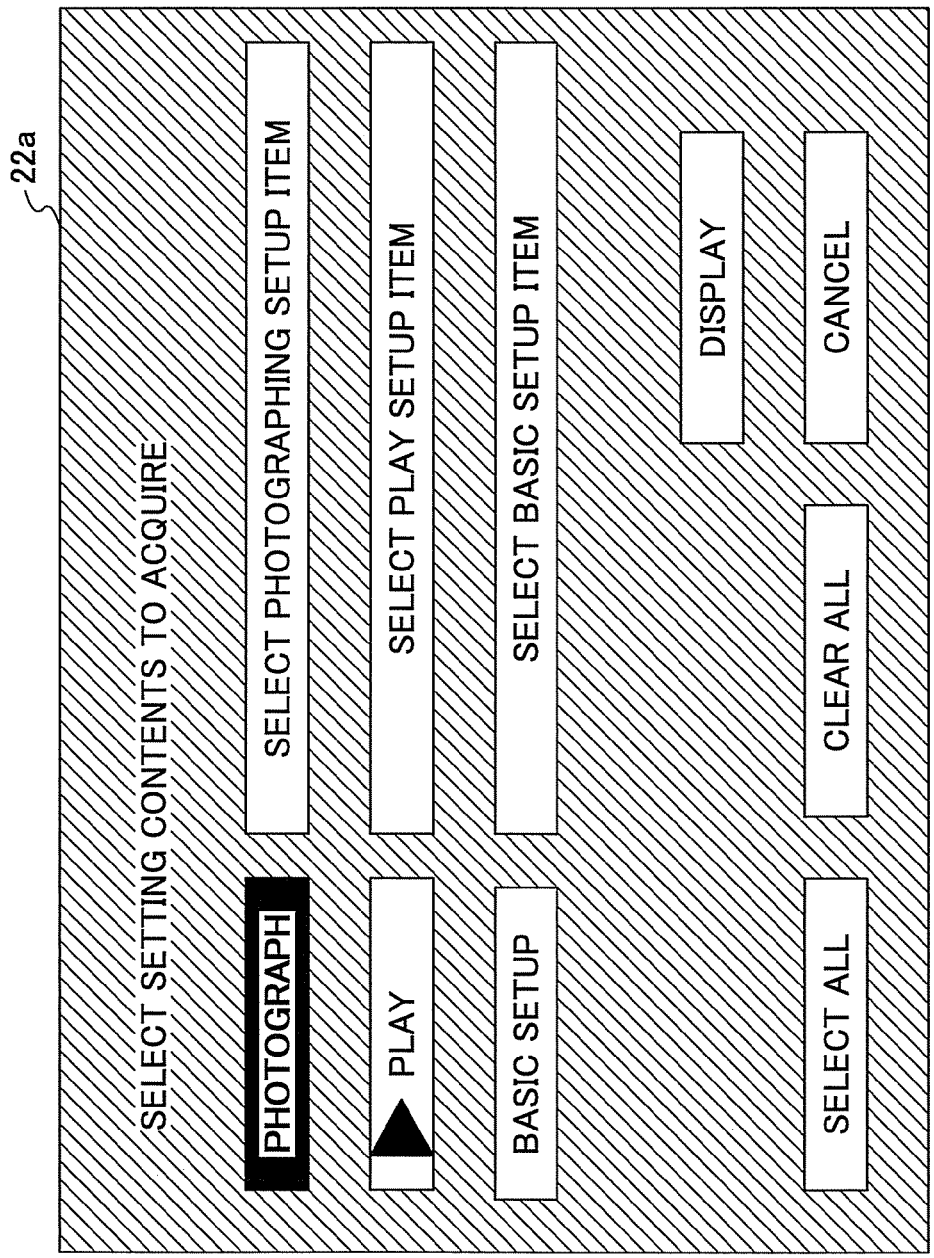
FIGS. 14A and 14B are illustrations of setting screens for selecting setting contents displayed on a monitor display part of the camera A.
Figure 14B:
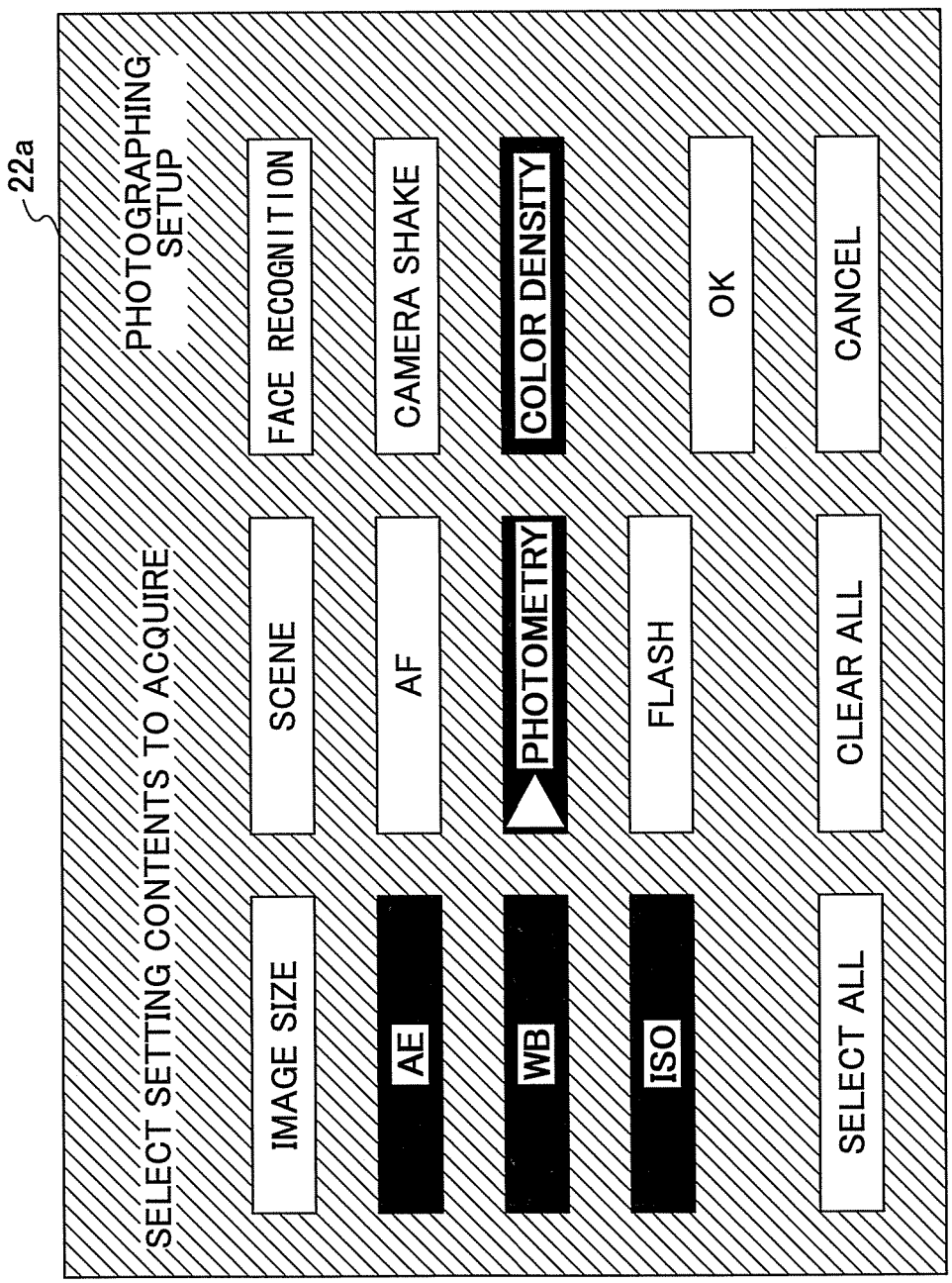

FIGS. 14A and 14B are illustrations of setting screens for selecting setting contents displayed on the monitor display part 22a of the camera A. For example, the user A selects the setup of a white balance. That is, the user A desires to acquire the photography condition of the white balance from the camera B.

The CPU 50 of the camera A requests the encoding part 32 to encode the setup information requesting the white balance and information regarding communication setup thereof (S402). The information regarding communication setup includes, for example, radio LAN setup information (IEEE802.11b, infrastructure mode, SSID of radio LAN access point: WLANAP01, WEP key:X8Y6Z5ABC, IP address 192.168.0.1). The CPU 50 of the camera A displays a code image on the monitor display part 22a (S403).

The user B operates the operation part 48 to change the operation mode to the "code reading mode". The CPU 50 of the camera B changes the operation mode to the code reading mode (S501).

The user B presses the release switch SW11 of the camera B. Thereby, the CPU 50 of the camera B takes a photo of the code image 61 displayed on the monitor display part 22a of the camera A (S502). As for a method of taking a photo, any of the above-mentioned three methods can be used.

The image processing part 35 recognizes the code image 61 from the photographic subject image (S503). When the code image 61 is recognized, the decoding part 31 decodes the code image 61 (S504).

The CPU 50 of the camera B acquires from the decoding results the request of white balance made by the camera A and the above-mentioned communication setup for communicating with the camera A (S505). The CPU 50 of the camera B sets the acquired communication setup of a radio LAN to the radio communication part 49 in order to perform radio LAN communication with the camera A (S506).

The CPU 50 of the camera B makes connection to the IP address of the camera A through the radio LAN communication in order to send the white balance photographic condition to the camera A (S507). Upon receipt of the white balance photographic condition, the CPU 50 of the camera A changes the setup of the white balance (S404). Thereby, the setup regarding the white balance setting value, which is customarily set in the camera B, is set to the camera A.

It should be noted that photographing conditions other than the white balance may be exchanged. Additionally, not only the photographing condition but also a replay setup, a basic setup or a combination of those may be exchangeable in a similar fashion. Because the requesting side (camera A) can notify the providing side (camera B) of the setup information which the request side (camera A) desires, an operation load of the providing side is reduced, which provides an effect of improving convenience.

As an example of the information regarding the communication setup of the radio LAN, a security such as WPA and WPA2 other than WEP may be used. The radio LAN may use an ad-hoc wireless communication in which equipment communicate with each other without routing an access point.

Moreover, the radio communication unit may not use a radio LAN communication but instead a Bluetooth communication so that BD-ADDR, which is a physical address of Bluetooth, and a PIN code for authentication are encoded as the radio communication setup.

Moreover, if the camera B cannot communicate with the camera A according to the radio LAN communication in step S507, the camera B may display the fact on the monitor display part 22b of the camera B. At this time, the camera B displays the code image 61, in which the communication setup of the radio LAN of the camera B is encoded, on the monitor display part 22b so that the camera A can acquire the communication setup of the radio LAN of the camera B. When the camera A takes a photo of the monitor display part 22b of the camera B, the camera A can connect to the camera B.

A description will be given of encoding of a password in the code image 61.

It is convenient for the cameras A and B if a communication connection can be established between the cameras A and B by merely taking a photo of the code image 61 by the camera A or B. One of the cameras A and B may temporarily connect to the other of the cameras A and B, and there is a case where the connection continuing for a long time must be avoided. Moreover, because there is a case where the code image 61 for communication setup is fixed to the camera A or B, it is inconvenient for the user of the camera A or B if the code image 61 leaks and an unauthorized third camera tries to connect to the camera A or B. Thus, the communication between the cameras A and B may be time limited by using a temporary password.

A description will be given below of a camera system 200 in which the communication between the cameras A and B is limited by using a temporary password.

Figure 15:
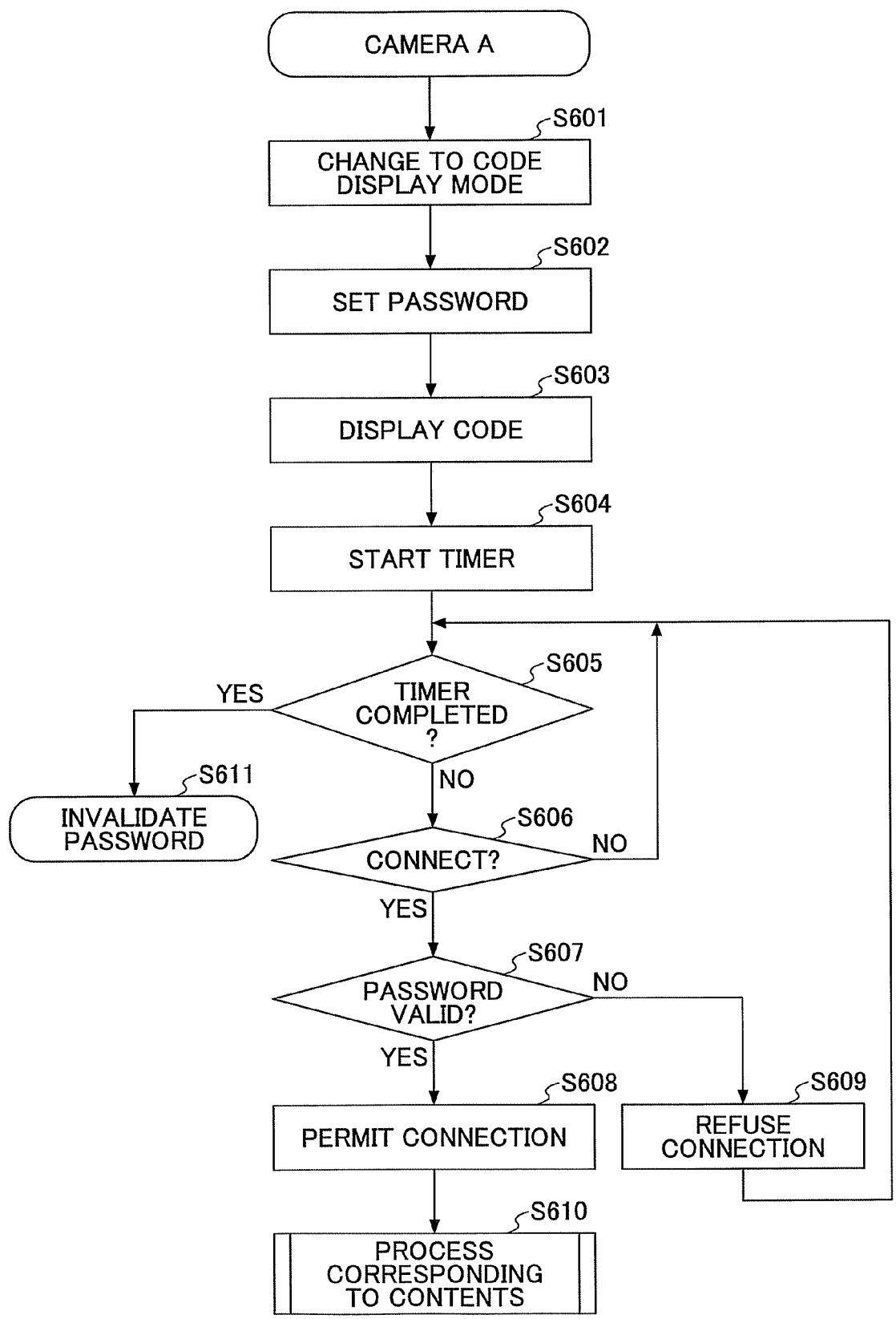
FIG. 15 is a flowchart of a procedure of converting a temporary password into the code image.

FIG. 15 is a flowchart of a procedure of converting a temporary password into the code image 61 by the camera A. The user A changes the operation mode of the camera into the "code display mode" by operating the operation part 48 of the camera A (S601). When the code display mode is set, the CPU 50 of the camera A creates a password and sets a time limit to the password (S602). The camera A stores the combination of the password and the time limit in a memory such as the RAM 33.

The CPU 50 of the camera A provides password information to the code when displaying the code image 61, which permits connection of the camera B (S603). When the CPU 50 of the camera A displays the code image 61 on the monitor display part 22a, the CPU 50 of the camera A starts counting of the time limit (S604) The limit lime is, for example, about 10 minutes. If the user B takes a photo of the code image 61 by using the camera B, the decoding part of the camera B decodes the code image 61 and acquires the password. The camera B can connect to the camera A within the time limit.

The password becomes invalid after the time limit has passed. The CPU 50 of the camera A determines whether the time limit has passed (S605). If the time limit has passed (YES of S605), the CPU 50 of the camera A invalidates the password encoded into the code image 61 (S611).

If the time limit has not passed (NO of S605), the CPU 50 of the camera A monitors whether or not a connection request is made from the camera B (S606). If there is a connection request (YES of S606), the CPU 50 of the camera A determines whether the password is a currently valid password (S607). If it is a valid password (YES of S607), the CPU 50 of the camera A permits the connection of the camera B (S608). On the other hand, if it is an invalid password (NO of S607), the CPU 50 of the camera A refuses the connection of the camera B (S609).

A description will be given of a system operation of the cameras A and B.

Figure 16:
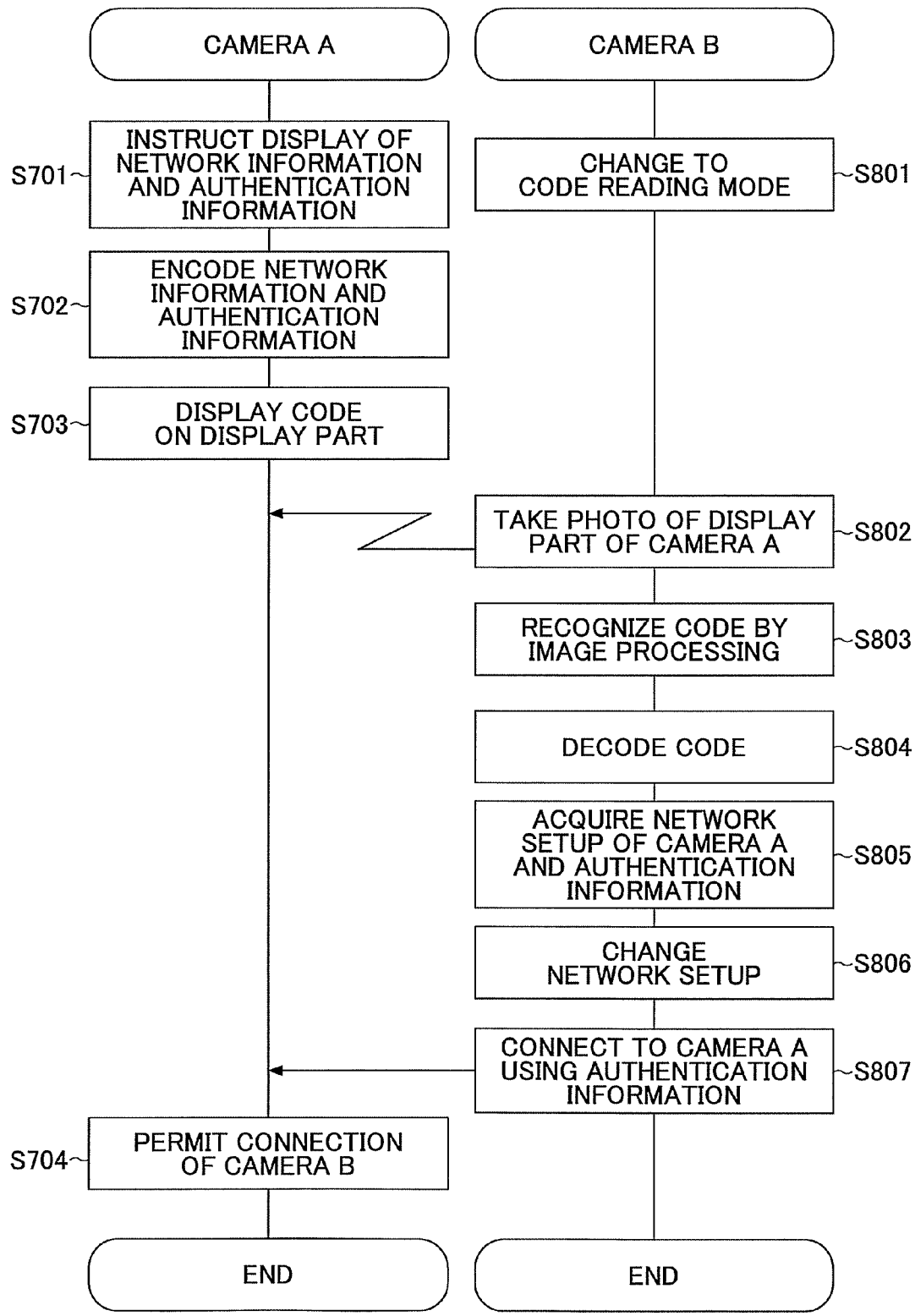
FIG. 16 is a flowchart of a procedure of a system operation of the camera A and the camera B when there is a time limit to a password.

FIG. 16 is a flowchart of a procedure of a system operation of the camera A and the camera B when there is a time limit to a password.

The CPU 50 of the camera requests the encoding part 32 to encode its own IP address and a password necessary for establishing a communication (S701). The encoding part 32 encodes its own IP address and the password into the code image 61 (S702). The CPU 50 of the camera A displays the code image 61 on the monitor display part 22a (S703).

The mode of the camera B is changed to the code reading mode by an operation of the user B (S801). When the user B takes a photo of the code image 61 of the camera A by using the camera B (S802), the image processing part 35 of the camera B recognizes the code image 61 (S803). Then, the CPU 50 of the camera B requests the decoding part 31 to decode the code image 61, and the decoding part 31 decodes the code image 61 (S804). Thereby, the CPU 50 of the camera B acquires the IP address of the camera and the password (S805). The CPU 50 of the camera B sets the IP address of the camera A to the radio communication part 49 (S806), and establishes a connection to the camera A using the password (S807). During a period where the password is valid, the camera B is permitted to be connected to the camera A, and the camera B can connect to the camera A.

A description is given below of a communication establishing method according to the present embodiment using a photo of the code image 61.

Figure 17:
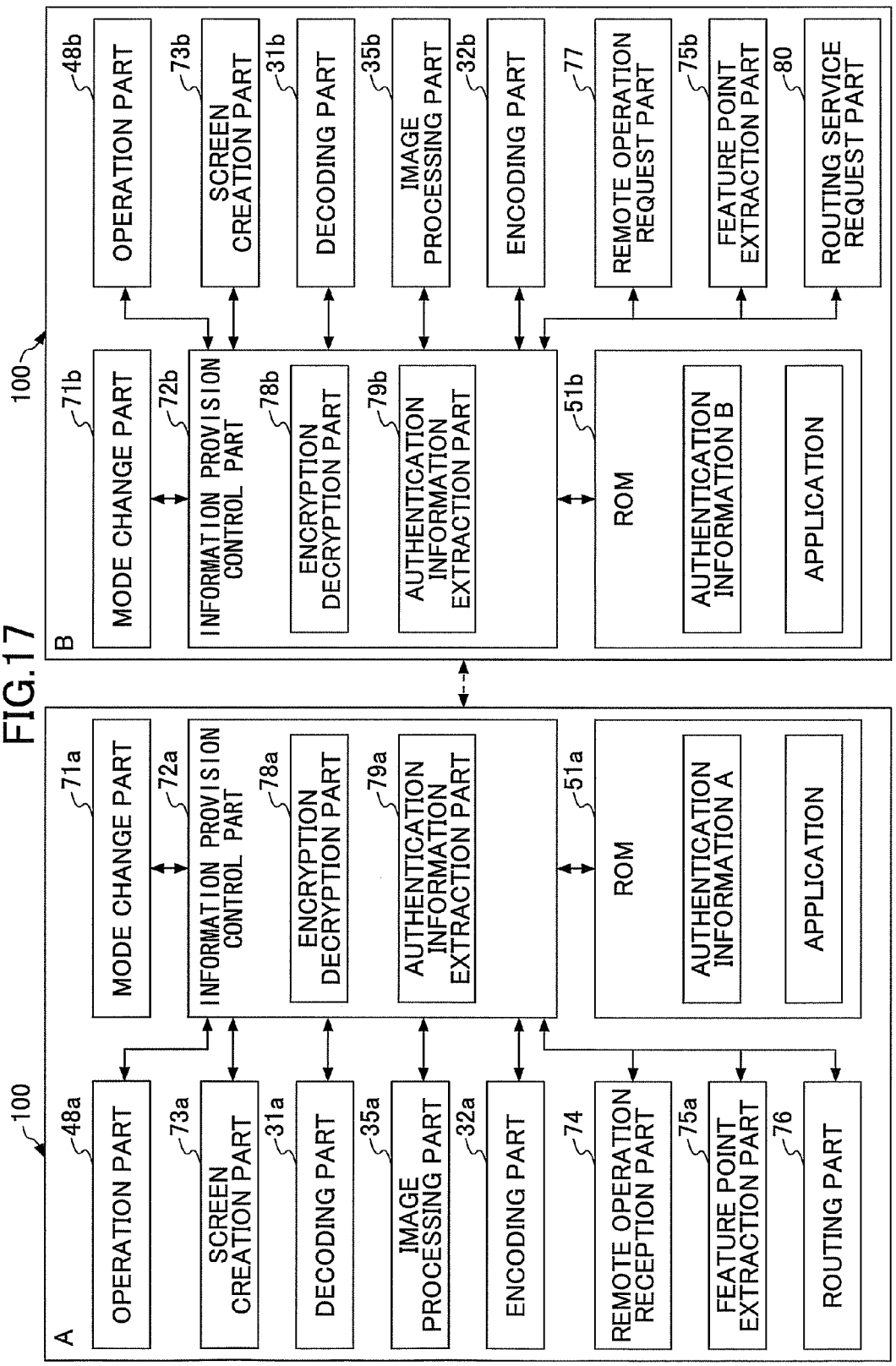
FIG. 17 is a functional block diagram of the camera A and the camera B.

FIG. 17 is a functional block diagram of the camera A and the camera B. In FIG. 17, parts that are the same as the parts illustrated in FIG. 2 are given the same reference numerals with suffixes, and descriptions thereof will be omitted. In the following explanation, the camera A is a side to permit connection of the camera B and the camera B is a side to request connection to camera A, but the roles of the camera A and camera B can be switched.

The camera A and the camera B are controlled by information provision control parts 72a and 72b, respectively. Operation parts 48a and 48b, mode change parts 71a and 71b, screen creating parts 73a and 73b, encoding parts 32a and 32b, decoding parts 31a and 31b, image processing parts 35a and 35b, and ROMs 51a and 51b are connected to the information provision control parts 71a and 71b, respectively. The camera A includes a remote operation reception part 74, a feature point extracting part 75a and a routing part 76. The camera B includes a remote operation request part 77, a feature point extracting part 75b and a routing service request part 80.

At least one of the functional blocks is achieved by the CPU 50 executing the program 53 or a hardware circuit such as an ASIC. The suffix "a" indicates the block of the camera A, and the suffix "b"" indicates the block of the camera B.

The mode change parts 71a and 71b receive operations of the operation parts 48a and 48b by the users A and B, respectively, in order to change the operation mode of the camera A or the camera B. For example, the mode change part 71a changes the operation mode of the camera A into the code reading mode, and the mode change part 71b changes the operation mode of the camera B into the code display mode.

Screen creation parts 73a and 73b display messages to guide operations of the users A and B, operation results, operation menus, etc., on the monitor display parts 22a and 22b, respectively. The screens created by the screen creation parts 73a and 73b are determined for each operation mode. The screen creation parts 73a and 73b create screens in response to instructions from the information provision control parts 72a and 72b, respectively. Upon receipt of the operations by the users A and B, the information provision control parts 72a and 72b instruct the screens to be created. The information provision control parts 72a and 72b also instruct the screens to be created to the screen creation parts 73a and 73b in response to setup information received from the other of the cameras A and B.

The information provision control parts 71a and 71b include encryption-decryption parts 78a and 78b and authentication information extraction parts 79a and 79b, respectively. The encryption-decryption parts 78a and 78b encipher communication setup information by using the authentication information, and restore the communication setup information by decrypting the enciphered communication setup information. Thus, each of the encryption-decryption parts 78a and 78b serves as a restoration part to restore the communication setup information. The authentication information extraction part 79a extracts authentication information B of the camera B from the result of decoding the code image 61. The authentication information extraction part 79b extracts the authentication information A of the camera A from the result of decoding the code image 61.

A remote operation reception part 74 is activated when the camera A provides a remote control service to the camera B. A remote operation request part 77 is activated when the camera B uses the remote control service. When the camera B is operated, the remote operation request part 77 sends an operation command to the camera A. The remote operation reception part 74 receives the operation command, and operates the camera A in response to the operation command.

The routing part 76 and the routing service request part 80 are used mainly when the camera A has a connection function to the Internet and the camera B does not have. The routing service request part 80 transmits an IP packet to the camera B through radio communication. The routing part sends the IP packet to a server of the Internet. Accordingly, the camera B is connectable to the Internet.

The ROM 51a stores the authentication information A and various kinds of applications. The ROM 51b stores the authentication information B and various kinds of applications. The authentication information A is information peculiar to the camera A, and is identification information transferred to the camera B beforehand when the camera A authenticates the camera B. The authentication information B is information peculiar to the camera B, and is identification information transferred to the camera A beforehand when the camera B authenticates the camera A. In addition, the ROMs 51a and 51b store parameters (communication setup information) necessary for radio communication.

FIG. 18 is a flowchart of a process procedure of the cameras A and B. As mentioned above, the user B of the camera B requests connection to the camera A. FIGS. 19A through 19F illustrate a series of screens displayed on the monitor display part 22a of the camera A. FIGS. 20A through 20G illustrate a series of screens displayed on the monitor display part 22b of the camera B.

First, the user B operates the operation part 48 of the camera B so that the operation mode of the camera B is changed into the code display mode. FIG. 20A illustrates an example of a service use menu screen to designate the operation mode of the camera B. When the user B selects one of the menu items 321 on the screen illustrated in FIG. 20A, the operation mode is changed into the code display mode. It is assumed that the user B selects the item of "Designated Service" in the "Service Offer".

The mode change part 71b receives an operation of the user B, and changes the operation mode of the camera B to the code display mode (S21). The mode change part 71b notifies the change in the mode to the information provision control part 72b. In response to the change to the code display mode, the information provision control part 72b reads the authentication information B from the ROM 51b or the RAM 33b, and requests the encoding part 32b to encode the authentication information B. The encoding part 32b encodes the authentication information B into the code image 61, and stores the code image 61 in the RAM 33a or the like (S22). Then, the encoding part 32b notifies the information provision control part 72b of the completion of the encoding operation.

The information provision control part 72b requests the screen creation part 73b to display a code display screen by designating the code image 61 stored in the RAM 33 or the like. Then, the screen creation part 73b creates the code display screen and displays the code display screen on the monitor display part 22b (S23).

Figure 20B:
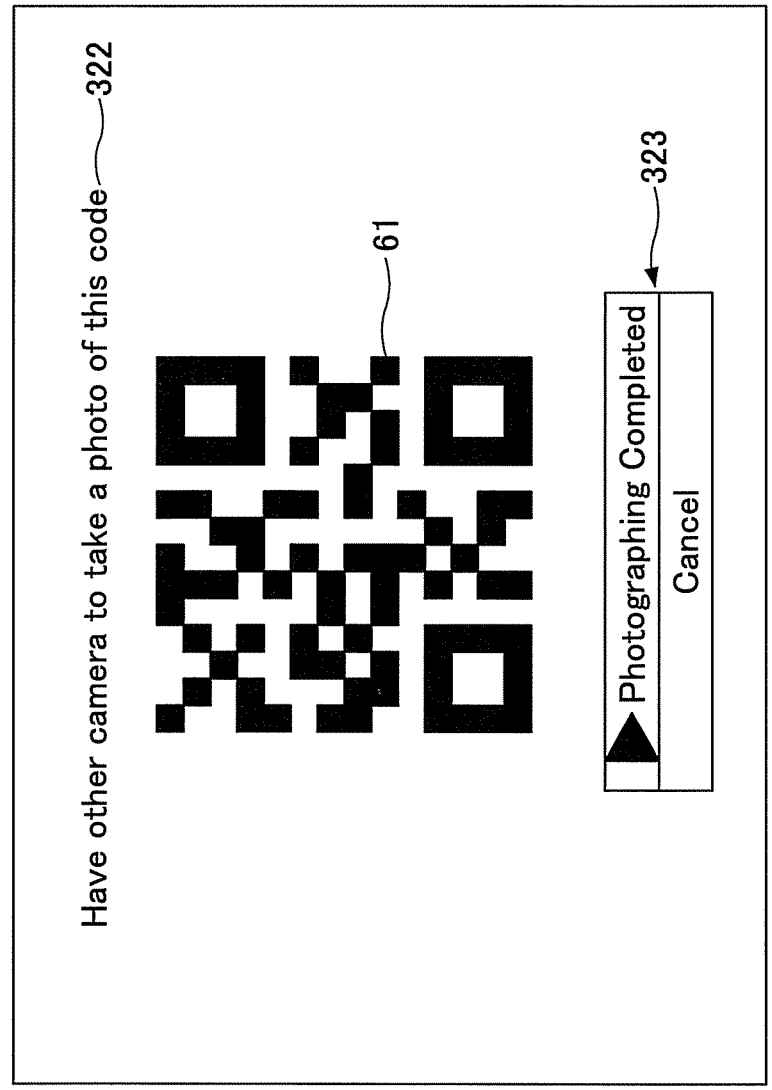
FIG. 20B is an illustration of a code display screen.

FIG. 20B illustrates an example of the code display screen. The code display screen displays the code image 61 in the center of the screen. A message 322 indicating "Please take a photo of this code" is displayed above the code image 61. A menu 323 is displayed under the code image 61. The screen creation part 73b creates a screen by arranging the code image 61 and component parts previously determined as parts of the code display screen. The user B views the message 322 "Please take a photo of this code", and recognizes that the user B should present the code image 61 on the screen to the user A. After the user A takes a photo of the code image 61 by the camera A, the user B selects "Photographing Completed". If the user B causes the code display mode to end, the user B selects "Cancel" from the menu 323.

Returning to FIG. 18, the user A operates the operation part 48a of the camera A so that the operation mode of the camera A is changed into the code reading mode. Upon receipt of the operation of the user A, the mode change part 71a changes the operation mode of the camera A into the code reading mode (S11).

FIG. 19A illustrates a service offer menu screen for designating the operation mode of the camera A. When the user A selects one of the items of the menu 301 of the "Service Offer" on the service offer screen menu screen of FIG. 19A, the code reading mode is set in the camera A. Here, it is assumed that the user A selects the "Image Share" of the "Service Use". Thus, the mode change part 71a notifies the information provision control part 72a of the mode change.

Upon receipt of the notification of the change to the code reading mode, the information provision control part 72a requests the image creation part 73a to display a code photographing screen. Then, the image creation part 73a creates the code photographing screen and displays the code photographing screen on the monitor display part 22a.

FIG. 19B is an example of the code photographing screen. The code photographing screen illustrated in FIG. 19B displays a cursor 303 in the center of the screen. A message 302 indicating "Please take a photo of code of the other camera" is displayed above the cursor 303. A message 304 indicating "Press Back Button to end" is displayed under the cursor 303. The screen creation part 73a creates a screen by arranging screen component parts previously determined as parts of the code photographing screen. The user A views the message 302 indicating "Please take a photo of code of the other camera", and recognizes that the user A should take a photo of the monitor display part 22b of the camera B. It should be noted that if the user A presses the Back Button, the mode change part 71a of the camera A causes the code photographing mode to end.

If the user A adjusts the position of the camera A so that the monitor display part 22b of the camera B enters the photographing range of the camera A, the code image 61 as a photographing subject is displayed on the monitor display part 22a of the camera A. Then, the user A adjusts the position and angle of the camera A so that the code image 61 is located inside the cursor 303. Then, the user A may press the release switch SW11. Alternatively, before the user A presses the release switch SW11, the image processing part 35a may sequentially recognize the code image 61.

Returning to FIG. 18, the camera A takes a photo of the photographing subject irrespective of pressing the release switch SW11 (S12). The image processing part 35a recognizes the code image 61 from the photographic subject image (S13). When the code image 61 is recognized from the photographic subject image, the decoding part 31a decodes the code image (S14). The image processing part 35a notifies the information provision control part 72a of the fact that the code image 61 has been recognized. The information provision control part 72a requests the screen creation part 73a to create a code image recognition screen. The screen creation part 73a creates the code image recognition screen, and displays it on the monitor display part 22a.

FIG. 19C is an illustration of an example of the code image recognition screen. The code image recognition screen illustrated in FIG. 19C includes the code image 61 within the cursor 303 located in the center of the screen. A message 305 indicating "Code has been recognized" is displayed above the cursor 303. A message 306 indicating "Display authentication information" is displayed under the cursor 303. The screen creation part 73a creates the screen by arranging the code image 61 and screen component parts previously determined as parts of the code image recognition screen. The user A views the message 305 indicating "Code has been recognized", and recognizes that the code image 61 has been recognized.

Subsequently, the information provision control part 72a acquires a decoding result from the decoding part 31a. The decoding result contains the authentication information B. Therefore, the information provision control part 72a is able to acquire the authentication information B (S15).

The encryption-decryption part 78a reads communication setup information of the camera A from the ROM 51a or the RAM 33a, and enciphers the communication setup information according to the authentication information B (S16). Then, the information provision control part 72a sends the enciphered communication setup information to the encoding part 32a. The encoding part 32a changes the enciphered communication setup information of the camera A into the code image 61, and stores the code image 61 in the RAM 33a or the like. Then, the encoding part 32a notifies the information provision control part 72a of completion of the encoding.

The information provision control part 72a requests the screen creation part 73a to display a second code display screen by designating the code image 61 stored in the RAM 33a or the like. The screen creation part 73a creates the second code display screen and displays it on the monitor display part 22a (S17).

FIG. 19D is an illustration of an example of the second code display screen. The second code display screen illustrated in FIG. 19D includes the code image 61 in the center of the screen. A message 307 indicating "Have this code photographed" is displayed above the code image 61. A message 308 indicating "Press Back Button to refuse connection" is displayed under the code image 61. The screen creation part 73a creates the screen by arranging the code image 61 and screen component parts previously determined as parts of the second code display screen. The user A views the message 307 indicating "Have this code photographed", and recognizes that the code image 61 should be presented to the user B. It should be noted that if the user A refuses the connection from the user B, the user A presses the "Back" button.

Returning to FIG. 18, the user B operates the operation part 48b of the camera B so that the operation mode of the camera B is changed into the code reading mode. Upon receipt of the operation of the user B, the mode change part 71b changes the operation mode of the camera B into the code reading mode (S24). The user B selects "IMAGE SHARE" from the service offer menu screen of FIG. 19A. The mode change part 71b notifies the information provision control part 72b of the mode change.

Upon receipt of the notification of the change to the code reading mode, the information provision control part 72b requests the image creation part 73b to display a second code photographing screen. Then, the image creation part 73b creates the second code photographing screen and displays the second code photographing screen on the monitor display part 22b.

Figure 20C:
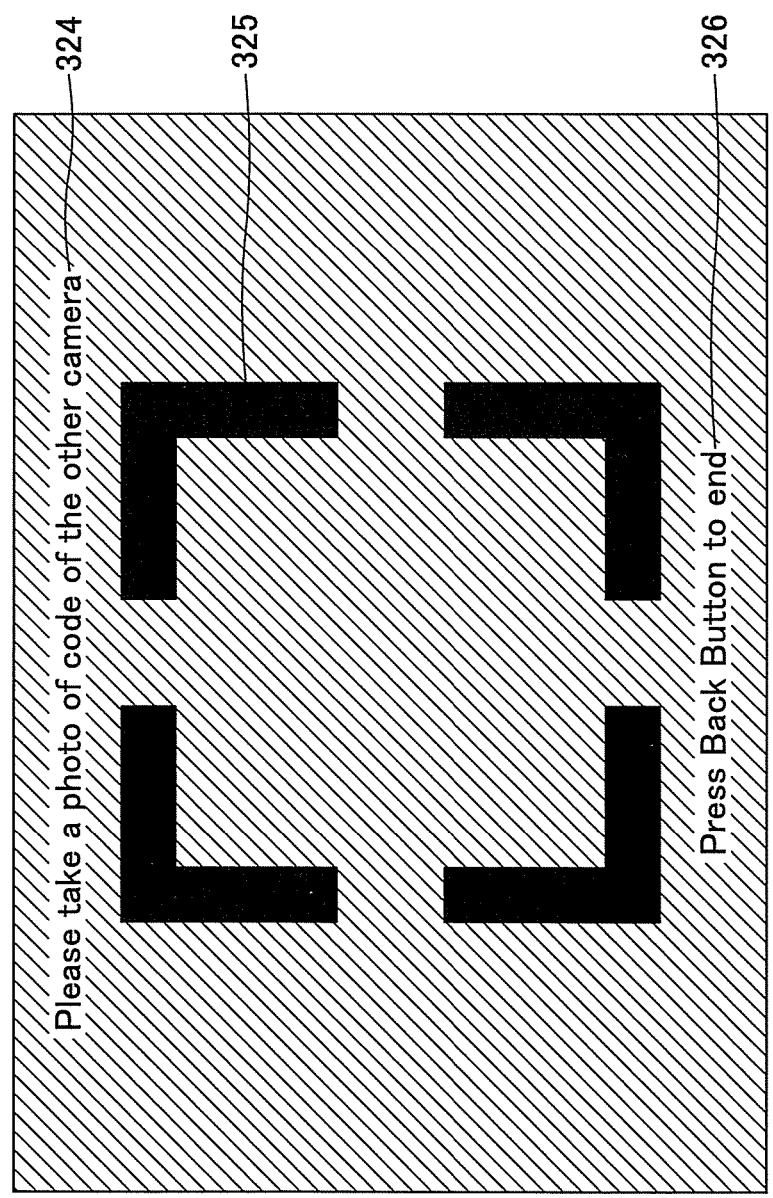
FIG. 20C is an illustration of a second code photographing screen.

FIG. 20C is an illustration of an example of the second code photographing screen. The second code photographing screen illustrated in FIG. 20C displays a cursor 325 in the center of the screen. A message 324 indicating "Please take a photo of code of the other camera" is displayed above the cursor 325. A message 326 indicating "Press Back Button to end" is displayed under the cursor 325. The screen creation part 73b creates a screen by arranging screen component parts previously determined as parts of the second code photographing screen. The user B views the message 324 indicating "Please take a photo of code of the other camera", and recognizes that the user B should take a photo of the monitor display part 22a of the camera A. It should be noted that if the user A presses the Back Button, the mode change part 71b of the camera B causes the code photographing mode to end.

If the user B adjusts the position of the camera B so that the monitor display part 22a of the camera A enters the photographing range of the camera B, the code image 61 as a photographing subject is displayed on the monitor display part 22b of the camera B. Then, the user B adjusts the position and angle of the camera B so that the code image 61 is located inside the cursor 325. Then, the user B may press the release switch SW11. Alternatively, before the user B presses the release switch SW11, the image processing part 35b may sequentially recognize the code image 61.

Returning to FIG. 18, the camera B takes a photo of the photographic subject irrespective of pressing the release switch SW11 (S25). The image processing part 35b recognizes the code image 61 from the photographic subject image (S26). When the code image 61 is recognized from the photographic subject image, the decoding part 31b decodes the code image (S27). The image processing part 35b notifies the information provision control part 72b of the fact that the code image 61 has been recognized. The information provision control part 72b requests the screen creation part 73b to create a second code image recognition screen. The screen creation part 73b creates the second code image recognition screen, and displays it on the monitor display part 22b.

Figure 20D:
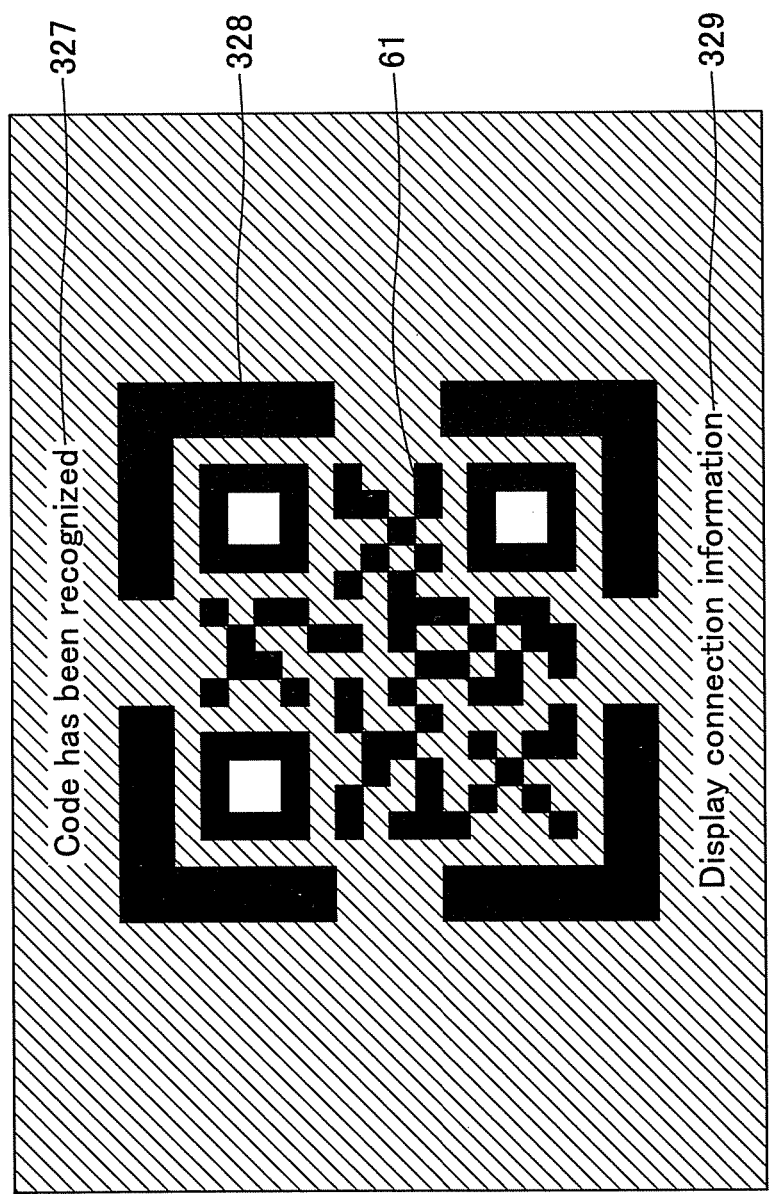
FIG. 20D is an illustration of a second code image recognition screen.

FIG. 20D is an illustration of an example of the second code image recognition screen. The code image recognition screen illustrated in FIG. 20D includes the code image 61 within the cursor 328 located in the center of the screen. A message 327 indicating "Code has been recognized" is displayed above the cursor 328. A message 329 indicating "Display connection information" is displayed under the cursor 328. The screen creation part 73b creates the screen by arranging the code image 61 and screen component parts previously determined as parts of the second code image recognition screen. The user B views the message 327 indicating "Code has been recognized", and recognizes that the code image 61 has been recognized.

Subsequently, the information provision control part 72b acquires a decoding result from the decoding part 31b. The decoding result is the communication setup information encrypted according to the authentication information B. Thus, the information provision control part 72b reads the authentication information B from the ROM 51a, and decodes the enciphered communication setup information using the authentication information B (S28). Accordingly, the information provision control part 72b acquires the communication setup information of the camera A (S29). Upon acquisition of the communication setup information of the camera A, the information provision control part 72b requests the screen creation part 73b to create a connection information display screen. The screen creation part 73b creates the connection information display screen and displays it on the monitor display part 22b.

Figure 20E:
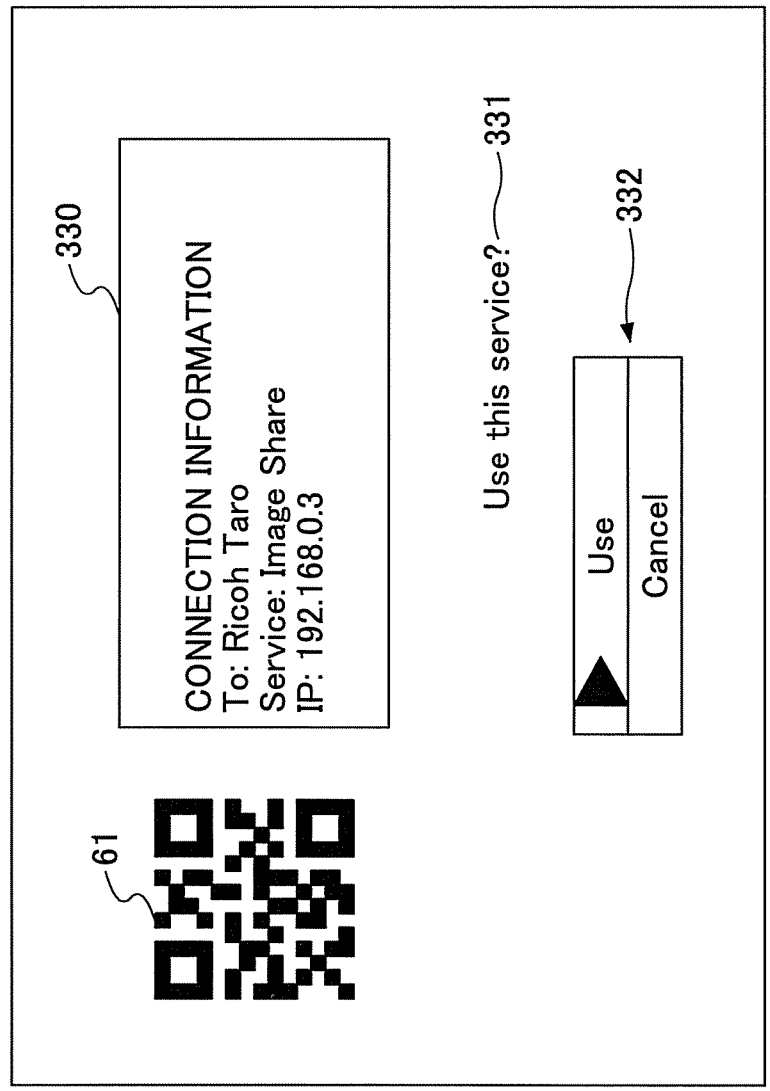
FIG. 20E is an illustration of a connection information display screen.

FIG. 20E is an illustration of an example of the connection information display screen. The connection information display screen displays the code image 61, connection information (communication setup information) 330, a message 331 indicating "Use this service?", and a menu 332. The screen creation part 73b creates the screen by arranging the connection information (communication setup information) 330 and screen component parts previously determined as parts of the connection information display screen. The user B views the message 331 indicating "Use this service?", and determines an item of the menu 332 to be operated. When the user B selects "Use" from the menu 332, the camera B starts the connecting operation. On the other hand, if the user B does not wish to connect to the camera A, the user B selects "Cancel" from the menu 332.

If the user B selects the "Use" from the menu 332, the information provision control part 72b receives the operation, and sets the communication setup information to the radio communication part 49b (S30). Then, the radio communication part 49b connects to the camera A (S31). Additionally, upon receipt of the operation, the information provision control part 72b requests the screen creation part 73b to display a connecting screen. The screen creation part 73b creates the connecting screen and displays it on the monitor display part 22b.

FIG. 20F is an illustration of an example of the connecting screen. The connecting screen displays the code image 61, connection information (communication setup information) 333, a message 334 indicating "Connect by changing network setup", and a message 335 indicating "Press Back Button to end". The "network setup" corresponds to the communication setup. The screen creation part 73b creates the screen by arranging the code image 61, the connection information (communication setup information) 333 and screen component parts previously determined as parts of the connecting screen. The user B views the message 334 indicating "Connecting by changing network setup", and recognizes that the connecting operation is being performed.

When the camera B starts a connecting operation to the camera A, the information provision control part 72a of the camera A is notified by the radio communication part 49a that the camera B tried to make a connection. Upon receipt of the notification, the information provision control part 72a requests the screen creation part 73a to display authenticating screen. The screen creation part 73a creates the authenticating screen and displays it on the monitor display part 22a.

Figure 19E:
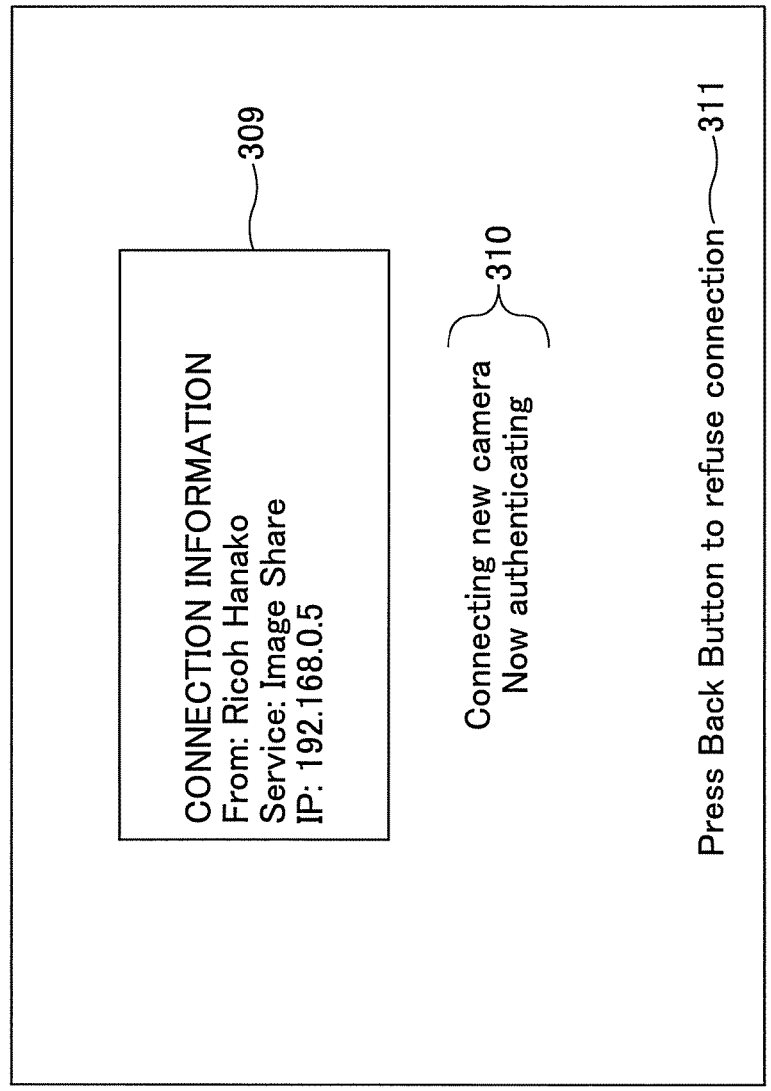
FIG. 19E is an illustration of an authenticating screen.

FIG. 19E is an illustration of an example of the authenticating screen. The authenticating screen displays the connection information (communication setup information) 309 of the camera B, a message 310 indicating "Connecting new camera authenticating . . . ", and a message 311 indicating "Press Back Button to refuse connection". The screen creation part 73a creates the screen by arranging the communication setup information of the camera B trying to connect thereto as connection information 309 and screen component parts previously determined as parts of the authenticating screen. The user A views the message 310 indicating "Connecting new camera authenticating . . . ", and recognizes that the authenticating operation is being performed.

When the radio communication part 49a detects that the communication with the camera B has been established, the radio communication part 49a notifies the information provision control part 72a of the establishment of the communication. The information provision control part 72a requests the screen creation part 73a to display a connection completion screen. The screen creation part 73a creates the connection completion screen and displays it on the monitor display part 22a.

FIG. 19F is an illustration of an example of the connection completion screen. The connection completion screen displays the connection information (communication setup information) 312 of the camera B and a message 313 indicating "Connection of new camera completed!". The screen creation part 73a creates the screen by arranging the connection information (communication setup information) 312 of the camera B and screen component parts previously determined as parts of the connection completion screen. The user A views the message 313 indicating "Connection of new camera completed!", and recognizes that the camera B has been connected.

When the radio communication part 49b detects that the communication with the camera A has been established at the same time as the detection of the radio communication part 49a, the radio communication part 49b notifies the information provision control part 72b of the establishment of the communication. The information provision control part 72b requests the screen creation part 73b to display a second connection completion screen. The screen creation part 73b creates the second connection completion screen and displays it on the monitor display part 22b.

FIG. 20G is an illustration of an example of the second connection completion screen. The second connection completion screen displays the connection information (communication setup information) 336 for connecting to the camera A and a message 337 indicating "Connection is completed!". The screen creation part 73b creates the screen by arranging the connection information (communication setup information) 336 and screen component parts previously determined as parts of the second connection completion screen. The user B views the message 337 indicating "Connection is completed!", and recognizes that the camera B has been connected to the camera A.

As explained with reference to the flowchart of FIG. 18, because two photos, that are the photo 1 by the camera A (S12) and the photo 2 by the camera B (S25), are necessary, equipment connectable to the camera A can be limited, thereby improving confidentiality. Additionally, there is no need to display the authentication information A and the authentication information B on the monitor display parts 22a and 22b.

Figure 22:
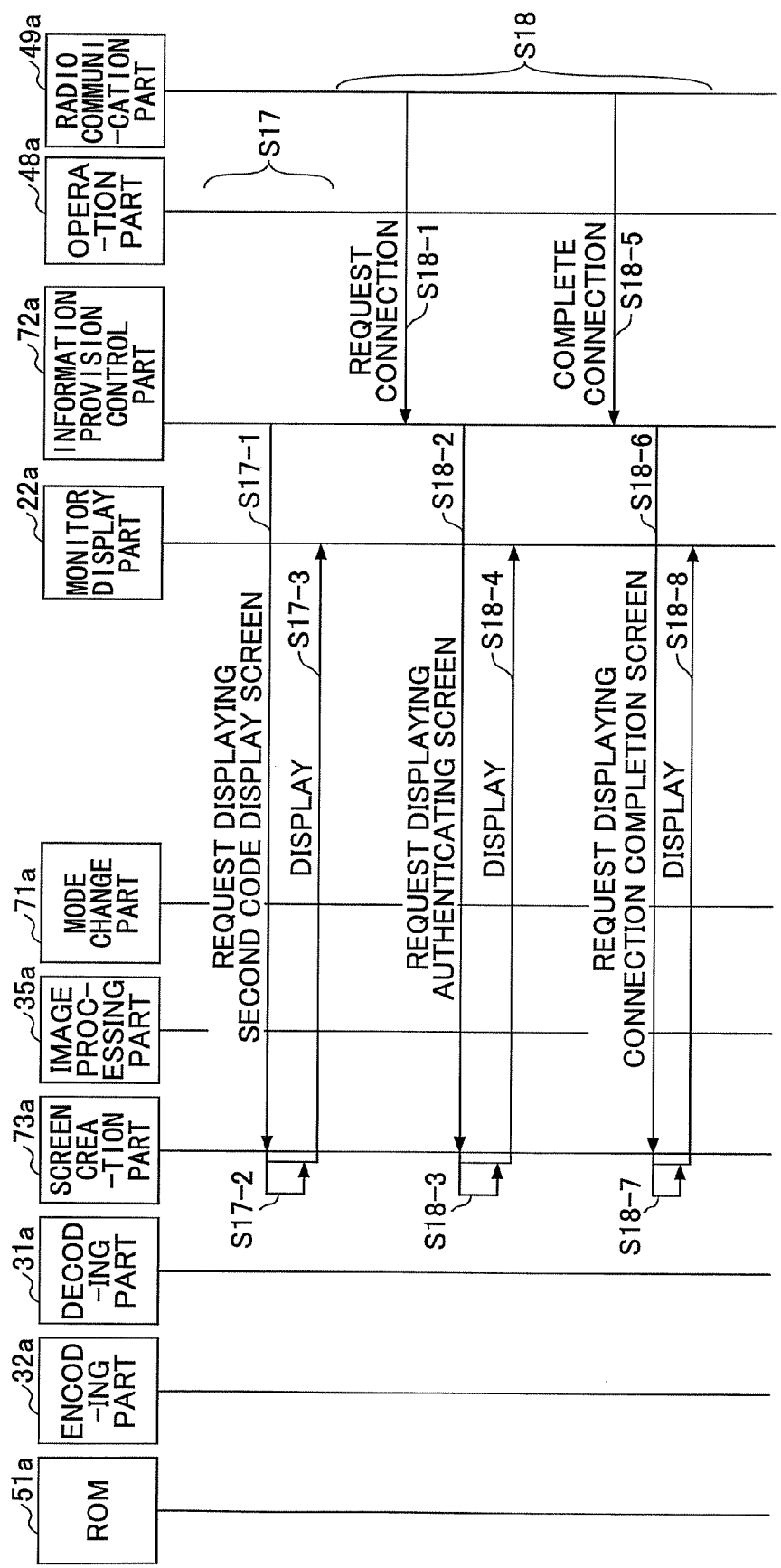
FIG. 22 is a flowchart of a process from step S17 through step S18 performed in the camera A.
Figure 23:
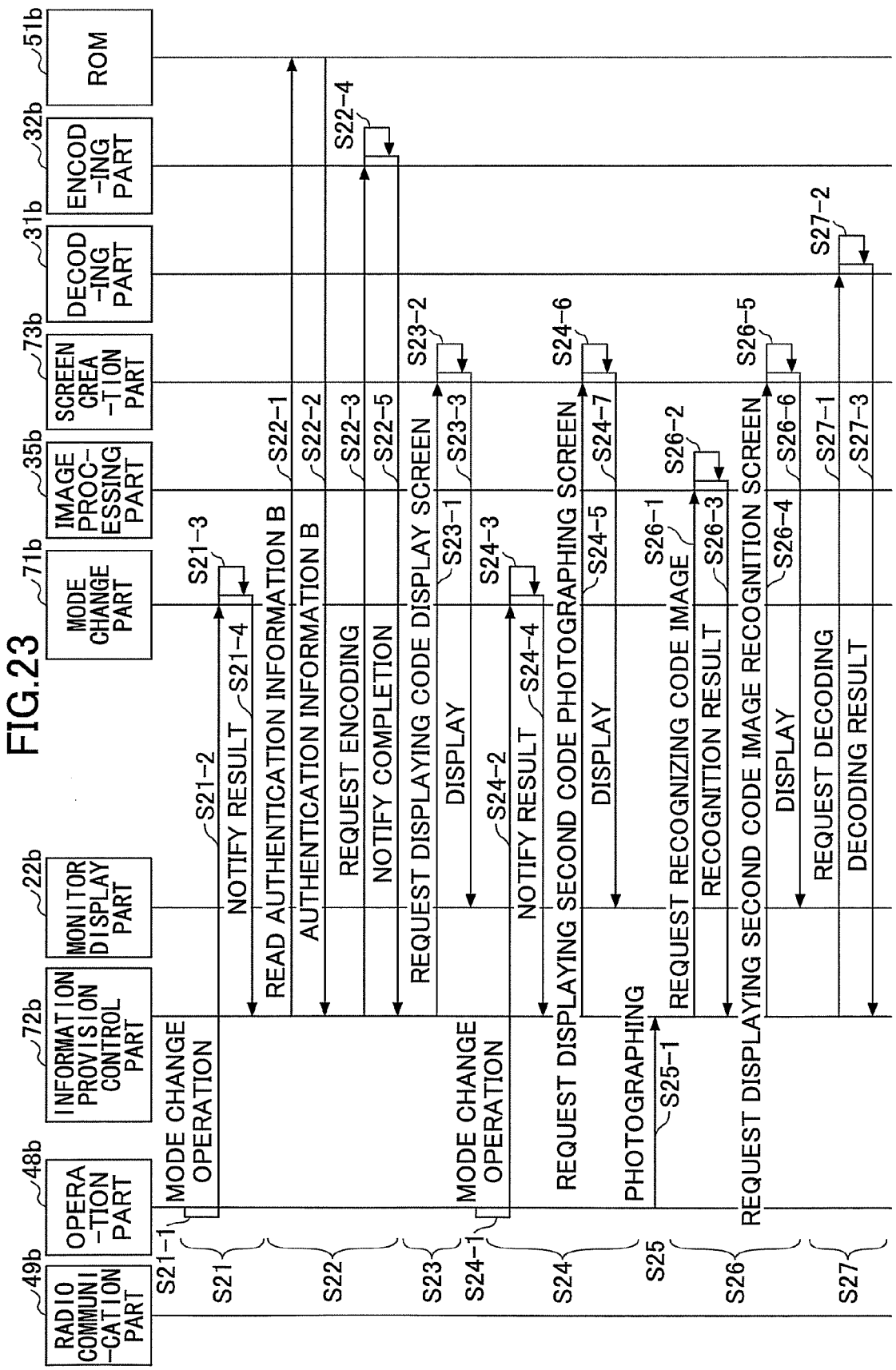
FIG. 23 is a flowchart of a process from step S21 through S27 performed in the camera B.
Figure 24:
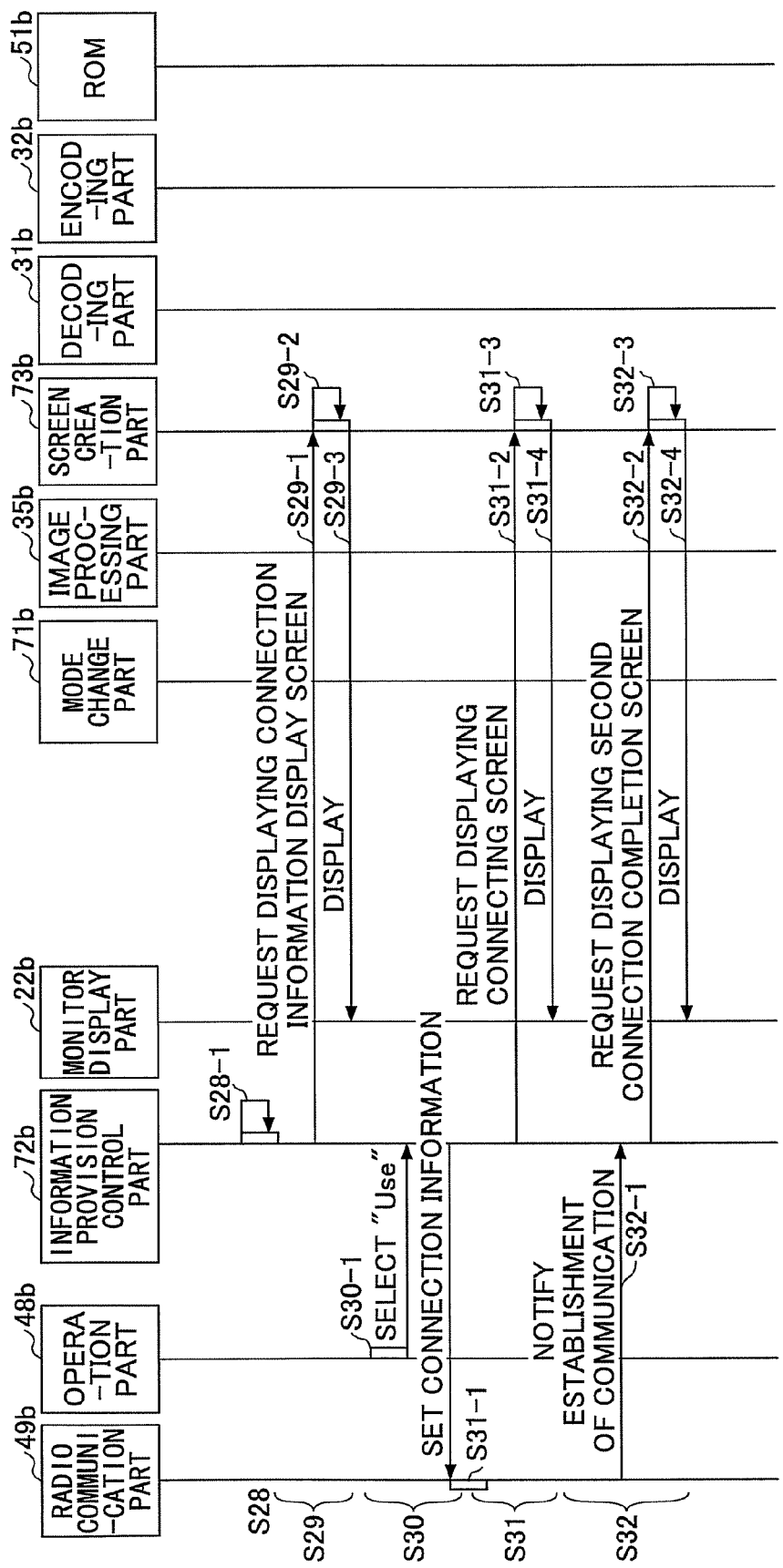
FIG. 24 is a flowchart of a process from step S28 through step S32 performed in the camera B.

A description will be given, with reference to FIGS. 21 through 24, of the procedure of FIG. 18. In order to indicate correspondence with FIG. 18, a description will be given of each step number of FIG. 18. FIG. 21 is a flowchart of the process from step S11 to step S16 performed in the camera A. FIG. 22 is a flowchart of the process from step S17 to step S18 performed in the camera A. FIG. 23 is a flowchart of the process from step S21 to S27 performed in the camera B. FIG. 24 is a flowchart of the process from step S28 to step S32 performed in the camera B.

1) Step S21:

First, the user B operates the operation part 48b of the camera B (S21-1). The operation part 48b notifies the mode change part 71b of the contents of the operation (a mode change to the code display mode) (S21-2). The mode change part 71b changes the operation mode of the camera B to the code display mode (S21-3). The mode change part 71b notifies the information provision control part 72b of a result of the change (S21-4).

2) Step S22:

Upon receipt of the notification of the change to the code display mode, the information provision control part 72b reads the authentication information B from the ROM 51b (S22-1, S22-2). Then, the information provision control part 72b sends the authentication information B to the encoding part 32b to request encoding the authentication information B (S22-3). The encoding part 32b encodes the authentication information B into the code image 61, and stores the code image 61 in the RAM 33 or the like (S22-4). The encoding part 32b notifies the information provision control part 72b of a completion of the encoding (S22-5).

3) Step S23:

The information provision control part 72b designates the code image 61 stored in the RAM 33 or the like to request the screen creation part 73b to create the code display screen (S23-1). The screen creation part 73b creates the code display screen (S23-2), and displays the code display screen on the monitor display part 22b (S23-3). The code display screen illustrated in FIG. 19B is displayed according to the process of step S23.

4) Step S11:

The user A operates the operation part 48a of the camera A so that the operation mode of the camera A is changed into the code reading mode (S11-1). The operation part 48a notifies the mode change part 71a of the contents of the operation (a mode change to the code reading mode) (S11-2). The mode change part 71a receives the operation of the user A and changes the operation mode of the camera A to the code reading mode (S11-3). The mode change part 71a notifies the information provision control part 72a of a result of the change (S11-4).

Upon receipt of the notification of the change to the code reading mode, the information provision control part 72a requests the screen creation part 73a to display the code photographing screen (S11-5). The screen creation part 73a creates the code photographing screen (S11-6), and displays the code photographing screen on the monitor display part 22a (S11-7). Thereby, the code photographing screen illustrated in FIG. 20B is displayed.

5) Step S12:

The user A operates the camera A to take a photo of the photographing subject (S12). As mentioned above, the user A may press the release switch SW11 of the camera A or may not press the release switch SW11.

6) Step S13:

The image provision control part 72a requests the image processing part 35a to recognize the code image 61 in a state where the release switch SW11 can be pressed or a photo of the photographing subject can be taken (S13-1). The image processing part 35a recognizes the code image 61 from the photographing subject image (S13-2). The image processing part 35a notifies the information provision control part 72 of a result of the recognition (S13-3).

Upon receipt of the result of the recognition that the code image 61 has been recognized, the information provision control part 72a requests the screen creation part 73a to create the code image recognition screen (S13-4). The screen creation part 73a creates the code image recognition screen (S13-5), and displays the code image recognition screen on the monitor display part 22a (S13-6). Thereby, the code image recognition screen illustrated in FIG. 20C is displayed.

7) Step S14:

When the code image 61 is recognized from the photographing subject image, the information provision control part 72a requests the decoding part 31a to decode the code image 61 (S14-1). The decoding part 31a decodes the code image 61 (S14-2). The decoding part 31a notifies the information provision control part 72a of a decoding result (S14-3).

8) Step S15:

The information provision control part 72a acquires the decoding result acquired from the decoding part 31a (S15-1). The authentication information B is included in the decoding result. Therefore, the information provision control part 72a can acquire the authentication information B.

9) Step S16:

The information provision control part 72a reads the communication setup information of the camera A from the ROM 51a or the RAM 33a (S16-1, S16-2). Then, the encryption-decryption part 78a enciphers the communication setup information according to the acquired authentication information B (S16-3).

The information provision control part 72a sends the enciphered communication setup information to the encoding part 32a together with an encode request (S16-4). The encoding part 32a converts (encodes) the enciphered communication setup information of the camera A into the code image 61, and stores the code image 61 in the RAM 33a or the like (S16-5). The encoding part 32 notifies the information provision control part 72a of a completion of encoding (S16-6).

10) Step S17:

The information provision control part 72a designates the code image 61 stored in the RAM 33a or the like, and requests the screen creation part 73a to display the second code display screen (S17-1). The screen creation part 73a creates the second code display screen (S17-2), and displays the second code display screen on the monitor display part 22a (S17-3). Thereby, the second code display screen illustrated in FIG. 20D is displayed.

11) Step S24:

The user B operates the operation part 48b of the camera B so that the operation mode of the camera B is changed into the code reading mode (S24-1). The operation part 48b notifies the mode change part 71b of the contents of the operation (a mode change to the code reading display mode) (S24-2). Upon receipt of the operation of the user B, the mode change part 71b changes the operation mode of the camera B into the code reading mode (S24-3). The mode change part 71b notifies the information provision control part 72b of a result of the change (S24-4).

Upon receipt of the notification of the change to the code reading mode, the information provision control part 72b requests the screen creation part 73b to display the second code photographing screen (S24-5). The screen creation part 73b creates the second code photographing screen (S24-6), and displays the second code photographing screen on the monitor display part 22b (S24-7). Thereby, the second photographing screen illustrated in FIG. 19C is displayed.

12) Step S25:

The user A operates the camera A to take a photo of the photographing subject (S25). As mentioned above, the user A may press the release switch SW11 or may not press the release switch SW11.

13) Step S26:

The image provision control part 72b requests the image processing part 35b to recognize the code image 61 in a state where the release switch SW11 can be pressed or a photo of the photographing subject can be taken (S26-1). The image processing part 35b recognizes the code image 61 from the photographing subject image (S26-2). The image processing part 35b notifies the information provision control part 72b of a result of the recognition (S26-3).

The information provision control part 72b requests the screen creation part 73b to create the second code image recognition screen (S26-4). The screen creation part 73b creates the second code image recognition screen (S26-5), and displays the second code image recognition screen on the monitor display part 22b (S26-6). Thereby, the second code image recognition screen illustrated in FIG. 19D is displayed.

14) Step S27:

When the code image 61 is recognized from the photographing subject image, the information provision control part 72b requests the decoding part 31b to decode the code image 61 (S27-1). The decoding part 31b decodes the code image 61 (S27-2). The decoding part 31b notifies the information provision control part 72b of a decoding result (S27-3).

15) Step S28:

The encryption-decryption part 78b reads the authentication information B from the ROM 51b, and decodes the enciphered communication setup information (S28-1). Thus, the information provision control part 72 is able to acquire the communication setup information of the camera A.

16) Step S29:

Upon acquisition of the communication setup information of the camera A, the information provision control part 72b requests the screen creation part 73 to create the connection information display screen (S29-1). The screen creation part 73b creates the connection information display screen (S29-2), and displays the connection information display screen on the monitor display part 22b (S29-3). Thereby the connection information display screen illustrated in FIG. 19E is displayed.

17) Step S30:

The user B operates the operation part 48b and selects "Use" from the menu (S30-1). The operation part 48b notifies the information provision control part 72b of a result of the operation (S30-2). Upon receipt of the operation, the information provision control part 72b sets the communication setup to the radio communication part 49b (S30-3).

18) Step S31:

The radio communication part 49b connects to the camera A (S31-1). Additionally, upon receipt of the selection "Use", the information provision control part 72b requests the screen creation part 73b to display the connecting screen (S31-2). The screen creation part 73b creates the connecting screen (S31-3), and displays the connecting screen on the monitor 22b (S3104). Thereby, the connecting screen illustrated in FIG. 19F is displayed.

19) Step S32:

Upon detection of the establishment of the communication between the radio communication part 49b and the camera A, the radio communication part 49b notifies the information provision control part 72b of the fact that the communication has been established (S32-1). Then, the information provision control part 72b requests the screen creation part 73b to display the second connection completion screen (S32-2). The screen creation part 73b creates the second connection completion screen (S32-3), and displays the second connection completion screen on the monitor display part 22b. Thereby, the second connection completion screen illustrated in FIG. 19G is displayed.

20) Step S18:

When the camera B initiates a connecting operation to the camera A, the information provision control part 72a of the camera A is notified by the radio communication part 49 of the fact that the camera B is connecting thereto (S18-1). Upon receipt of the notification, the information provision control part 72a requests the screen creation part 73a to display the authenticating screen (S18-2). The screen creation part 73a creates the authenticating screen (S18-3), and displays the authenticating screen on the monitor display part 22a (S18-4). Thereby, the authenticating screen illustrated in FIG. 20E is displayed.

When the radio communication part 49a detects that the communication with the camera B has been established, a notification is sent to the information provision control part 72a (S18-5). The information control part 72a requests the screen creation part 73a to display the connection completion screen (S18-7), and displays the connection completion screen on the monitor display part 22a (S18-8). Thereby, the connection completion screen illustrated in FIG. 20F is displayed.

A description will be given below of variations of the communication establishing method according to the present embodiment, which method uses a photo of the code image 61.

Figure 25:
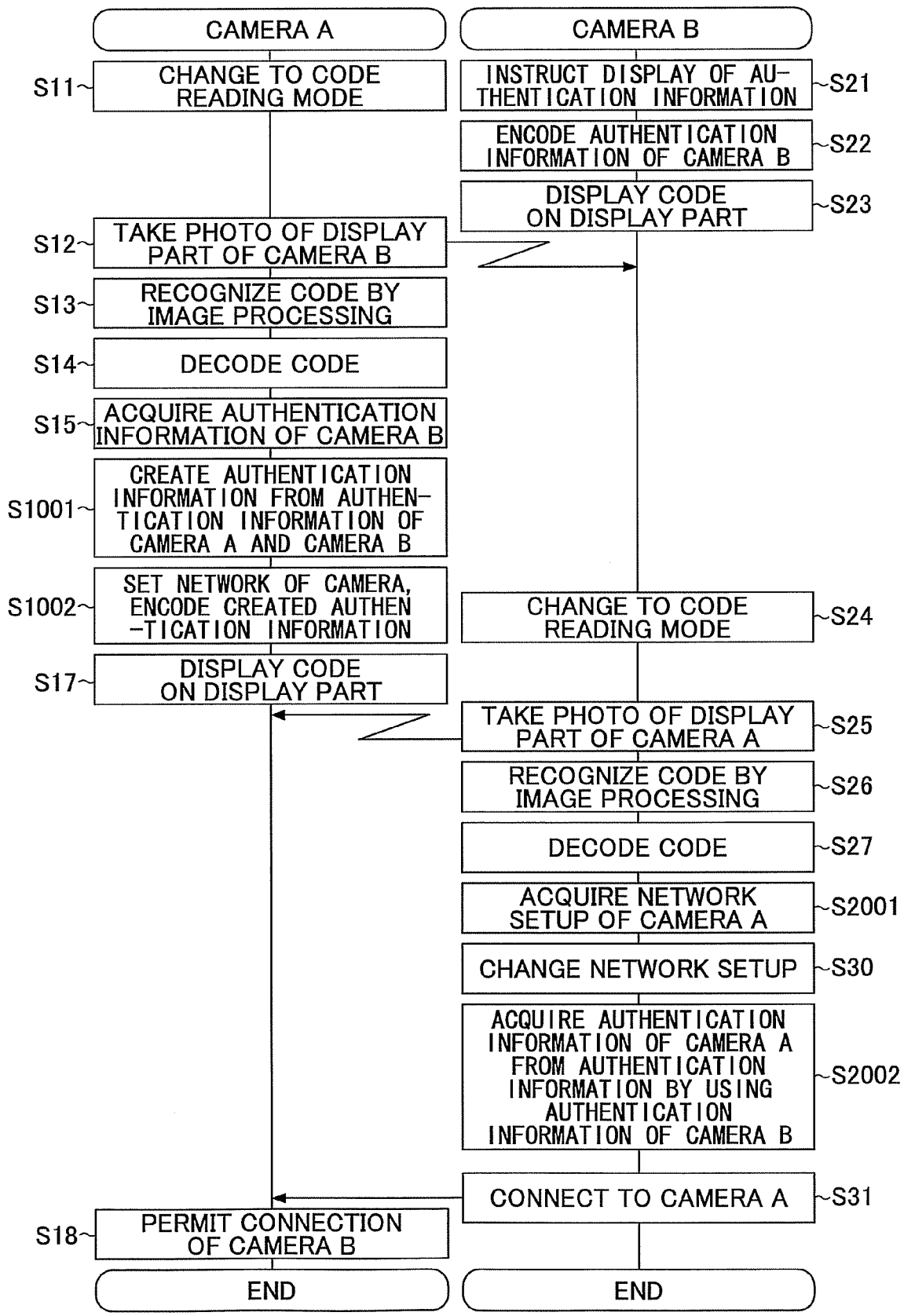
FIG. 25 is a flowchart of a variation of the process procedure of the camera A and the camera B.

FIG. 25 is a flowchart of a variation of the process procedure of the cameras A and B. In FIG. 25, steps the same as the steps illustrated in FIG. 18 are given the same step numbers.

The method illustrated in FIG. 25 differs from the method illustrated in FIG. 18 in that the method of sending the communication setup information from the camera A to the camera B is different. The process of step S11 through step S15 of the camera A is the same as that of FIG. 18, and the camera A acquires the authentication information B of the camera B. In FIG. 25, it is assumed that the prime number of the authentication information B is "249973". The prime number may be randomly selected from a plurality of prime numbers stored in the ROM 51b of the camera B, or may be acquired by the camera B by downloading from a server.

If the decoding part 31a of the camera A acquires the authentication information B of the camera B, which is "249973", the information provision control part 72a acquires new authentication information N by using the authentication information A of the camera A. It is assumed that the authentication information A of the camera A is, for example, "249989". There may be various methods to create new authentication information N from the authentication information A and the authentication information B. In the present embodiment, the new authentication information is obtained by multiplying the authentication information A and the authentication information B by each other. That is, the authentication information extraction part 79a operates the following equation (S1001).

Authentication Information $N$=Authentication Information $A$×Authentication Information $B$="62490500297"

The information provision control part 72a requests the encoding part 32a to encode the authentication information N with the communication setup information of the camera A (S1002). Because the camera A displays the code image 61 on the monitor display part 22a, the camera B takes a photo of the code image 61 (S17, S25).

When the decoding part 31b of the camera B decodes the code image 61, the information provision control part 72b can acquire the authentication information of the camera A and the communication setup information of the camera A (S2001). First, the information provision control part 72b changes the communication setup of the radio communication part 49b of the camera B (S30).

Then, the authentication extraction part 79b divides the authentication information N "6249050297" by own authentication information B of the camera B to acquire the authentication information A of the camera A (S2002). By acquiring the authentication information A of the camera A, the connection to the camera can be achieved. The information provision control part 72b of the camera B connects to the radio communication port 49a of the camera A by using the authentication information A "249989" of the camera A (S2003).

As well-known in the art, because a lot of operations are necessary to perform decomposition of an integer number into prime numbers, if a third person takes a photo of the monitor display part 22a of the camera A, it is difficult to acquire the authentication information A of the camera A. Thus, it is difficult for a third person to acquire the authentication information A of the camera A by merely taking a photo of the monitor part 22a of the camera A, which improves confidentiality when establishing communication.

It should be noted that, as another example, the number "62490500297" created by the authentication information A and the authentication information B of both the cameras A and B may be used when connecting the camera B to the camera A. In such a case, when the camera A authenticates the camera B, the number "249989", which is the authentication information of the camera A, is acquired by using the previously acquired number "249973", which is the authentication information B of the camera B. If the thus-acquired authentication information A matches the previously stored authentication information A, the camera B can authenticate the camera B that the camera B is a correct apparatus to communicate with.

Moreover, in step S17, when the camera A displays the code image 61 on the monitor display part 22a, the authentication information B of the camera B may be used to encipher the authentication information N. By doing so, if a third camera takes a photo of the code image 61, the authentication information N cannot be decoded without the authentication information B of the camera B, which provided the same effect.

Moreover, there are known many methods of creating a code, such as AES or the like, other than the multiplication of prime numbers, and other encoding methods may be used in the present embodiment.

Figure 26:
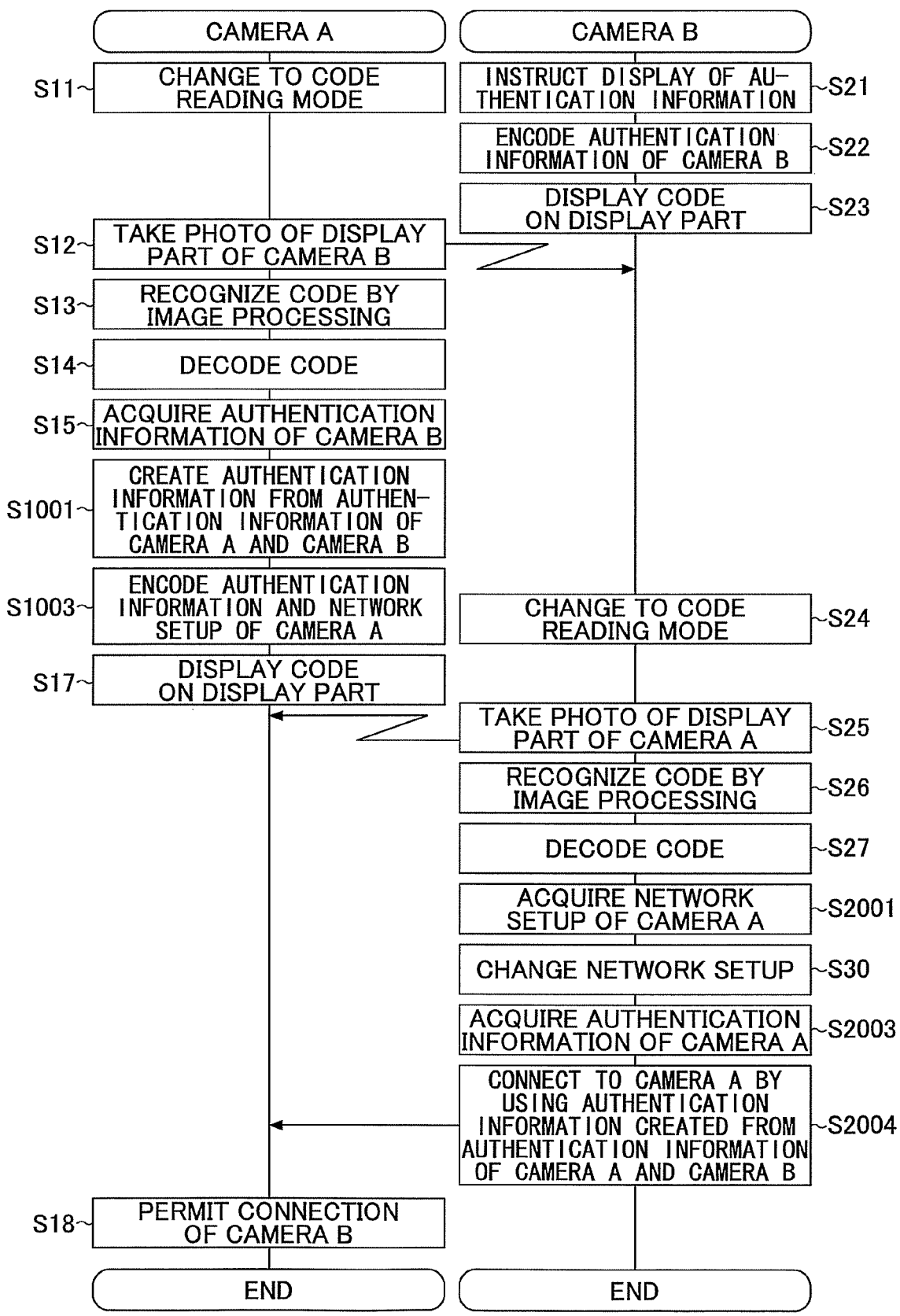
FIG. 26 is a flowchart of another variation of the process procedure of the camera A and the camera B.

FIG. 26 is a flowchart of another variation of the process procedures of the cameras A and B. In FIG. 26, steps that are the same as the steps of FIG. 25 are given the same step numbers.

The procedure illustrated in FIG. 26 differs from that illustrated in FIG. 25 in that the camera A causes the camera B to take a photo of the authentication information A. It is assumed that the authentication information B is, for example, the prime number "249973". When the decoding part 31a acquires the prime number "249973" as the authentication information B of the camera B, the information provision control part 72a creates the new authentication information N by using the authentication information A of the camera A, and stores the authentication information N in a memory (S1001). It is assumed that the authentication information A of the camera A is, for example, "249989". A method of creating the authentication information N may be the same as that used in the procedure of FIG. 25.

The information provision control part 72a of the camera A requests the encoding part 32a to encode the authentication information A and the communication setup information of the camera A (S1003). That is, the authentication information A is the code image 61. Because the camera A displays the code image 61 on the monitor display part 22a, the camera B takes a photo of the camera B (S17, S25).

When the decoding part 31b of the camera B decodes the code image 61, the information provision control part 72b can obtain the communication setup information of the camera A (S2001). First, the information provision control part 72b changes the communication setup of the radio communication part 49b of the camera B (S30).

Moreover, the information provision control part 72b acquires the authentication information A by decoding (S2002). The information provision control part 72b creates the authentication information N from the attestation information A and the attestation information B. The method of creating the authentication information N may be the same as that used in the procedure illustrated in FIG. 25.

The radio communication part 49b of the information provision control part 72b connects to the radio communication part 49a of the camera A by using the created authentication information N (S2004).

Information provision control part 72a of the camera A authenticates the camera B by determining whether the stored authentication information N matches the authentication information N sent from the camera B.

Also according to the procedure illustrated in FIG. 26, it is difficult to obtain the authentication information B by a third camera, which merely takes a photo of the monitor display part 22a of the camera A. Thus, it is difficult to create the authentication information N, which improves confidentiality when establishing communication.

Figure 27:
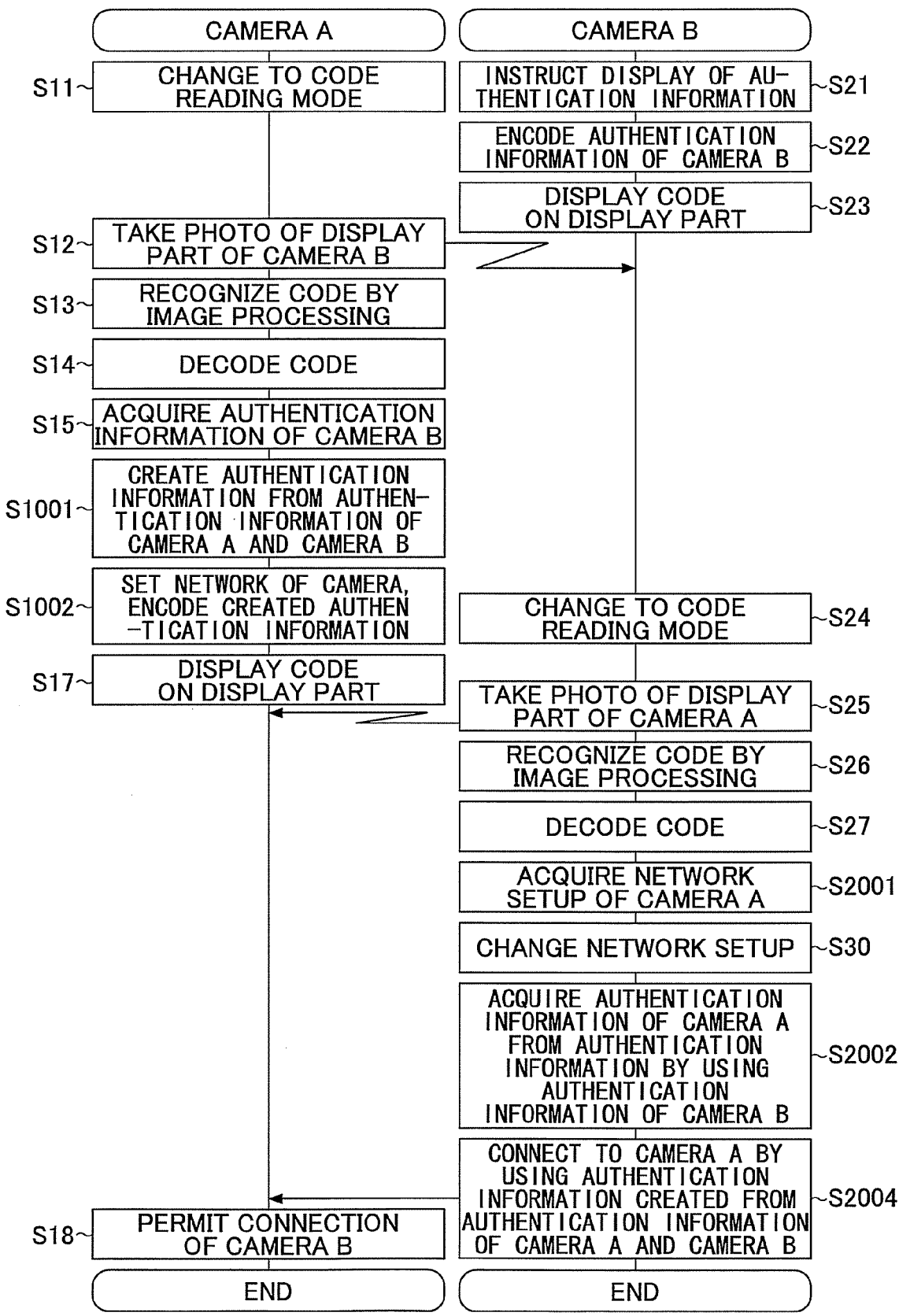
FIG. 27 is a flowchart of a further variation of the process procedure of the camera A and the camera B.

FIG. 27 is a flow chart of a further variation of the process procedure of the cameras A and B. In FIG. 27, steps which are the same as the steps of FIG. 26 are given the same step numbers.

In FIG. 27, the encoding part 32a of the camera A encodes, in step S1002, the authentication information N, which is created from the authentication information A and the authentication information B, and the communication setup information. The camera B acquires the authentication information N and the communication setup information of the camera A by taking a photo of the monitor display part 22a of the camera A.

Subsequently, the information provision control part 72b of the camera B acquires the authentication information A from the authentication information N by using the authentication information B (S2002). Then, the information provision control part 72b newly creates the authentication information N not from the authentication information N acquired by decoding but from the authentication information A and the attestation information B. That is, both the camera A and the camera B create the authentication information N. Then, the information provision control part 72b connects to the camera A using the authentication information N, which the camera B itself created (S2004).

The camera A acquires the authentication information A from the previously acquired authentication information B of the camera and the authentication information A. Then, the camera A authenticates whether the camera B is a legitimate apparatus to communicate with by determining whether the authentication information A stored in the ROM 51a of the camera A itself matches the authentication information A acquired from the camera B.

Because a third camera cannot acquire the authentication information B of the camera B by merely taking a photo of the monitor display part 22a of the camera A, it is difficult for the third camera to acquire the authentication information A, which improves confidentiality when establishing communication.

Figure 28:
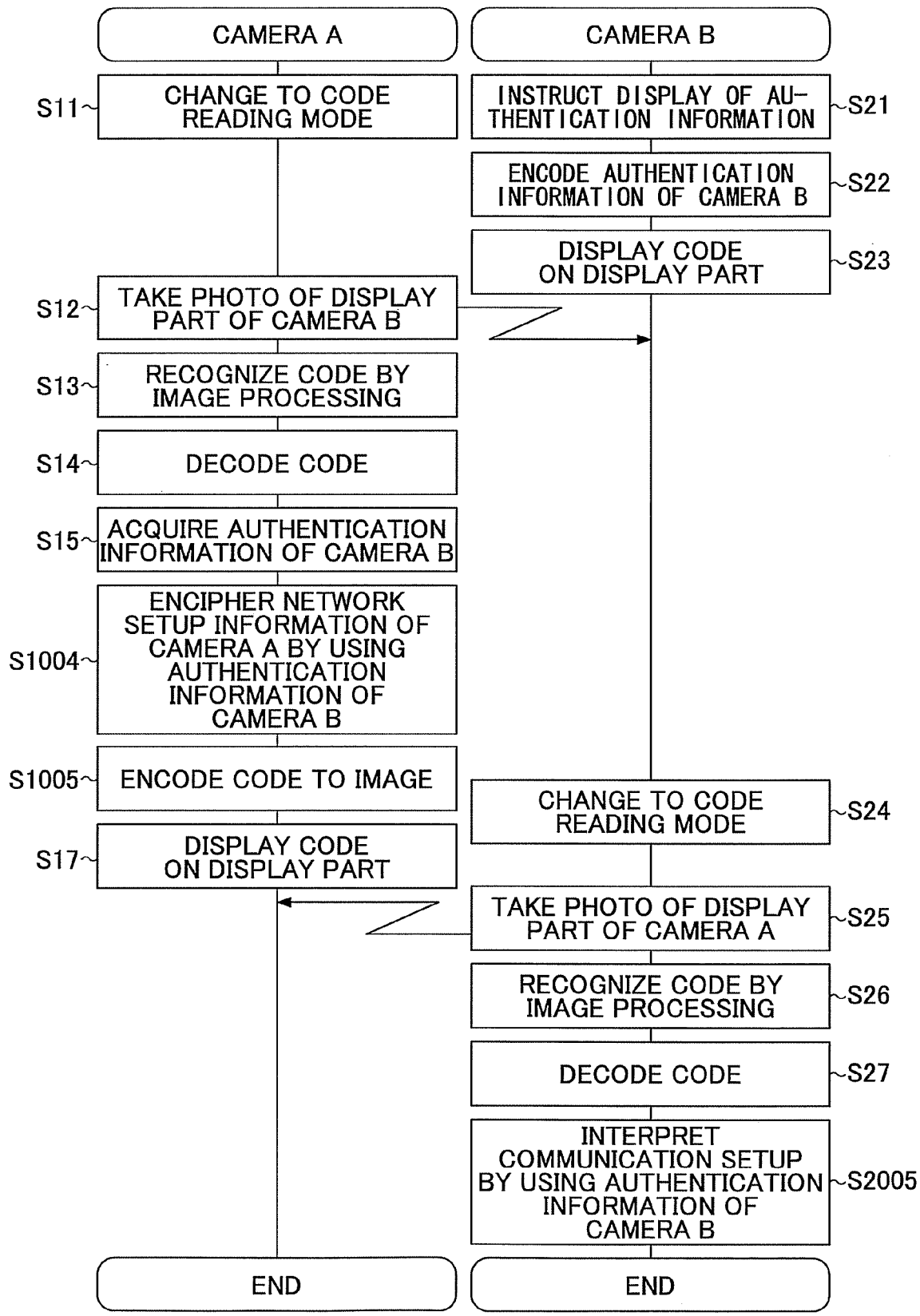
FIG. 28 is a flowchart of yet another variation of the process procedure of the camera A and the camera B.

FIG. 28 is a flowchart of yet another variation of the process procedure of the camera A and the camera B. In FIG. 28, steps that are the same as the steps of FIG. 27 are given the same step numbers.

In step S15, when the decoding part 31a of the camera A acquires the authentication information B of the camera B, which is "249973", the encryption-decryption part 78a enciphers the communication setup information of the camera A according to the authentication information B of the camera B (S1004).

The information provision control part 72a of the camera A requests the encoding part 32a to encode the enciphered communication setup information (S1005). That is, in this case, the enciphered communication setup information is the code image 61. Because the camera A displays the code image 61 on the monitor display part 22a, the camera B takes a photo of the code image 61 (S17, S25).

When the decoding part 31 of the camera B decodes the code image 61, information provision control part 72b can obtain the enciphered communication setup information of the camera A (S27). The encryption-decryption part 78b decodes the enciphered communication setup information by using the authentication information B (S2005). Thereby, it becomes possible for the camera B to communicate with the camera A. Because the camera B has the communication setup information, the camera A permits the connection of the camera B as if the camera B has been authenticated.

Because a third person cannot acquire the authentication information B of the camera B by merely taking a photo of the monitor display part 22a of the camera A, the third person cannot decode the communication setup information, thereby improving confidentiality when establishing communication.

A description will be given below of an application using a communication established under a highly-confidential condition as mentioned above. The code image 61 may be displayed on the monitor display part 22a or 22b during a replay mode.

Figure 29:
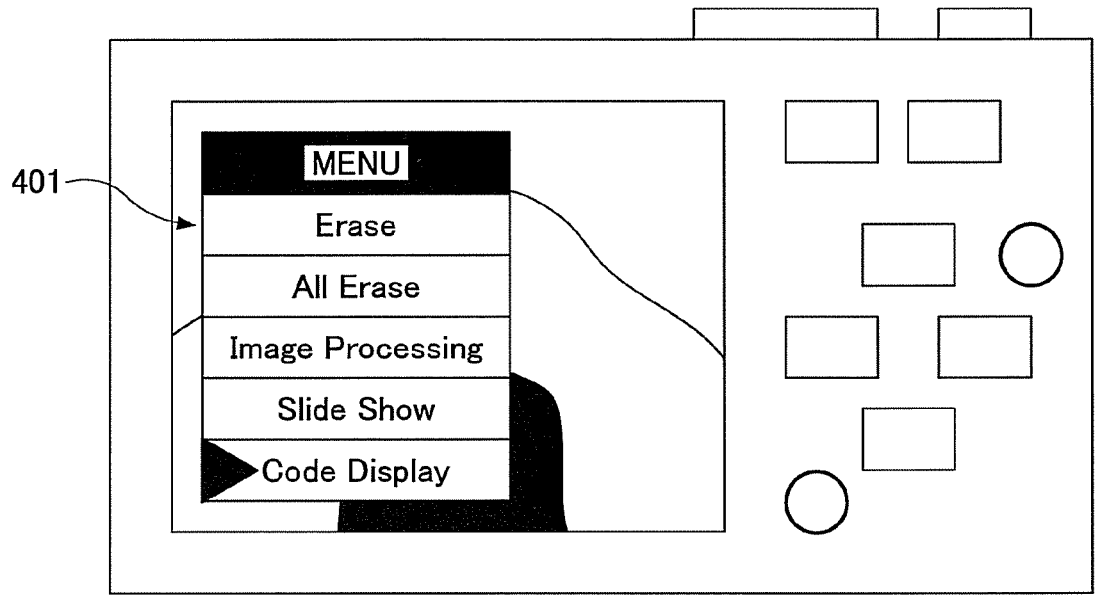
FIG. 29 is an illustration of an example of an operation menu displayed on a monitor display part of a camera during a replay mode.

FIG. 29 is an illustration of an example of an operation menu during a replay mode. The replay mode is an operation mode to display image data, which has been stored in the camera by taking a photo of a photographing subject on the monitor 22a or 22b. In FIG. 29, displayed as a menu are "Erase", "All Erase", "Image Processing", "Slide Show" and "Code Display".

For example, the following are the communication setup specifications of the camera A.

A wireless LAN communication interface of IEEE802.11b
Use third channel in ad hoc mode
Present IP address is "165.254.0.1"

Additionally, the camera A is provided with an HTTP server function so that an HTTP client can download data such as image data.

If the user A of the camera A selects the "Code Display" from an operation menu, a URL of a photograph currently displayed on the monitor display part 22a and a means for accessing the URL are displayed on the monitor display 22a as a code image 61 together with the photograph currently displayed on the monitor display part 22a.

Figure 30:
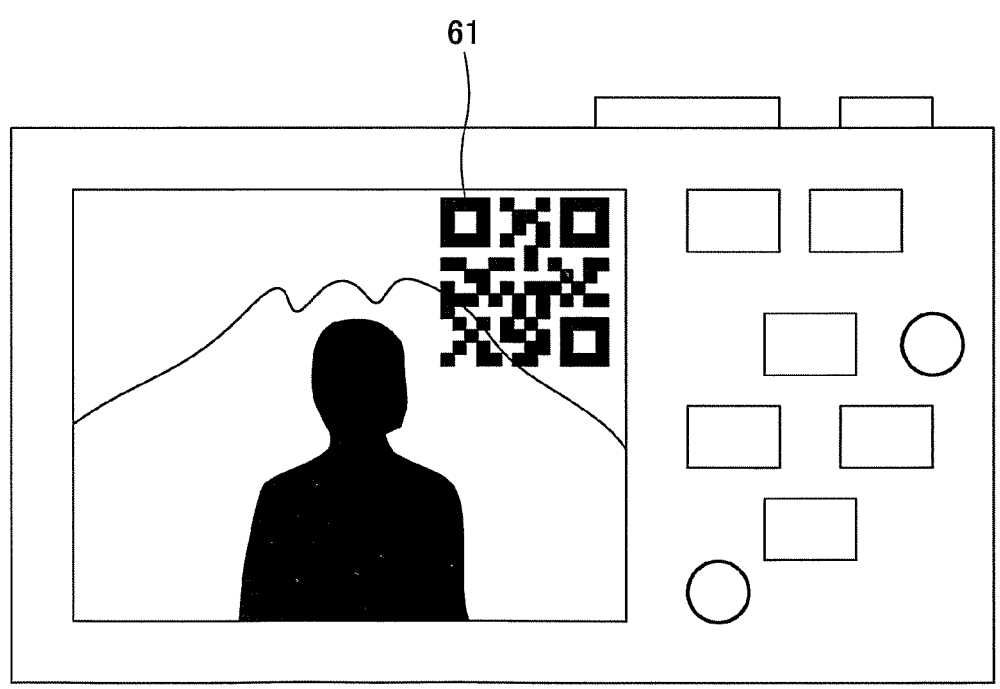
FIG. 30 is an illustration of an example of a display including a replay image and a code image displayed on the monitor display part of the camera.

FIG. 30 is an illustration of an example of a display including a replay image and the code image 61 displayed on the monitor display part 22a of the camera A. For example, the communication setup information encoded into the code image 61 is as follows.

Communication interface: IEEE802.11b
Mode: ad hoc mode
Channel: 3
Image URL: http://165.254.0.1/IMAGES/00001.jpg.

In addition, as already explained, the code image alone can be displayed on the monitor display part 22a.

Figure 31:
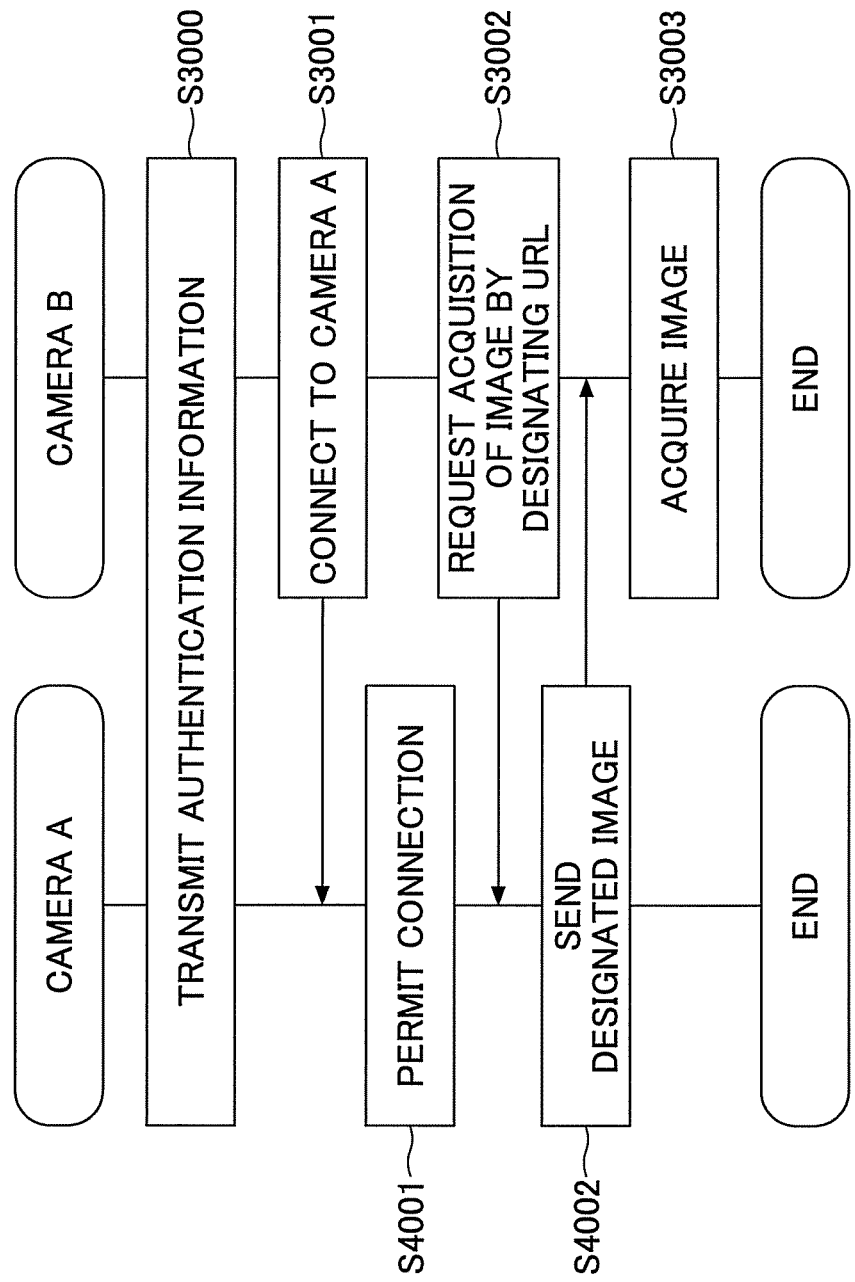
FIG. 31 is a flowchart of a procedure of communication between the camera A and the camera B.

FIG. 31 is a flowchart of a procedure of communication between the camera A and the camera B. A communication establishing method may be any one of the methods indicated in FIG. 18 and FIGS. 25 through 28.

When displaying the code image 61 by the camera A, the user A sets the camera A in the replay mode. Then, the user A displays an image of the image data to be sent to the camera B of the user B on the monitor display part 22a. Then, the user A causes the operation menu 401 to be displayed in the replay mode, and selects "Code Display" from the operation menu 401. Thereby, the code image 61 is displayed on the monitor display part 22a as illustrated in FIG. 30. The code image 61 includes the communication setup information of the camera A. The code image 61 has been enciphered according to the authentication information B prior to be encoded.

When the user B of the camera B takes a photo of the code image 61 and acquires the communication setup information, URL of the image displayed, and necessary authentication information A by decoding the code image 61, the camera B connects to the camera A (S3001). That is, the camera B changes the radio communication setup, and accesses the URL of the image by the HTTP client function using the authentication information A. The camera A permits the camera B to connect thereto if the authentication information A acquired from the camera A matches the authentication information that has been stored in the camera A (S4001).

The camera B sends "HTTP GET" to the camera A using an HTTP client function (S3002). An HTTP server function has been activated in the camera A, and the camera A sends data in accordance with the received "HTTP GET" (S4002). The data sent from the camera A is image data of the image where the camera A is displaying the code image 61 and is designated by a name "0001.jpg".

The camera B receives and acquires the image data concerned (S3003). In addition, the camera B may receive video image data or audio data in addition to the image data.

Figure 32:
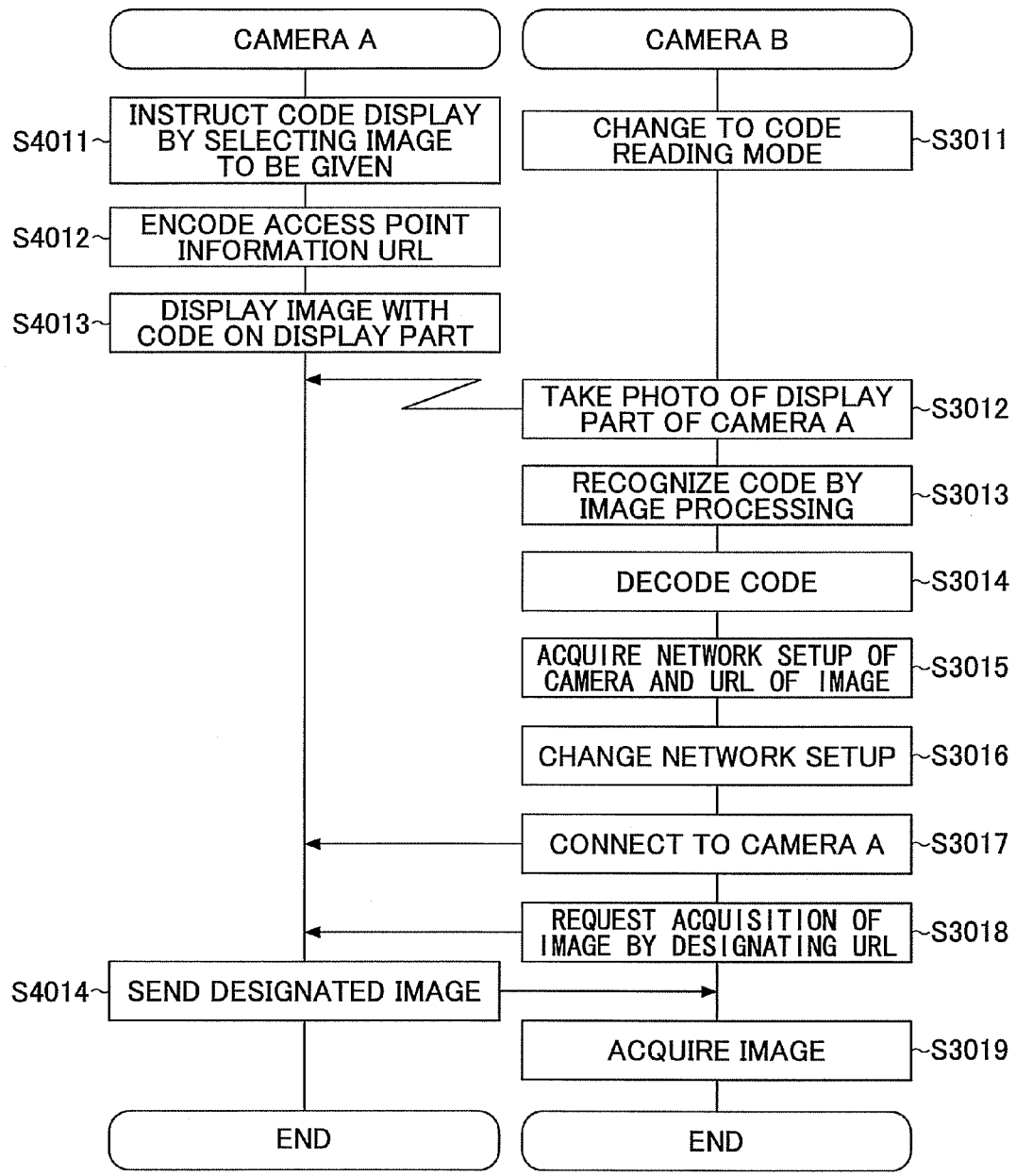
FIG. 32 is a flowchart of the process illustrated in FIG. 31 in detail.

FIG. 32 is a flowchart of the process illustrated in FIG. 31 in detail. Although the image data sent when the camera A encodes and displays the authentication information A is selected in the above-mentioned example, the user A may select the image data of the camera A after the communication has been established. This selecting method may be applied to the following examples.

Figure 33:
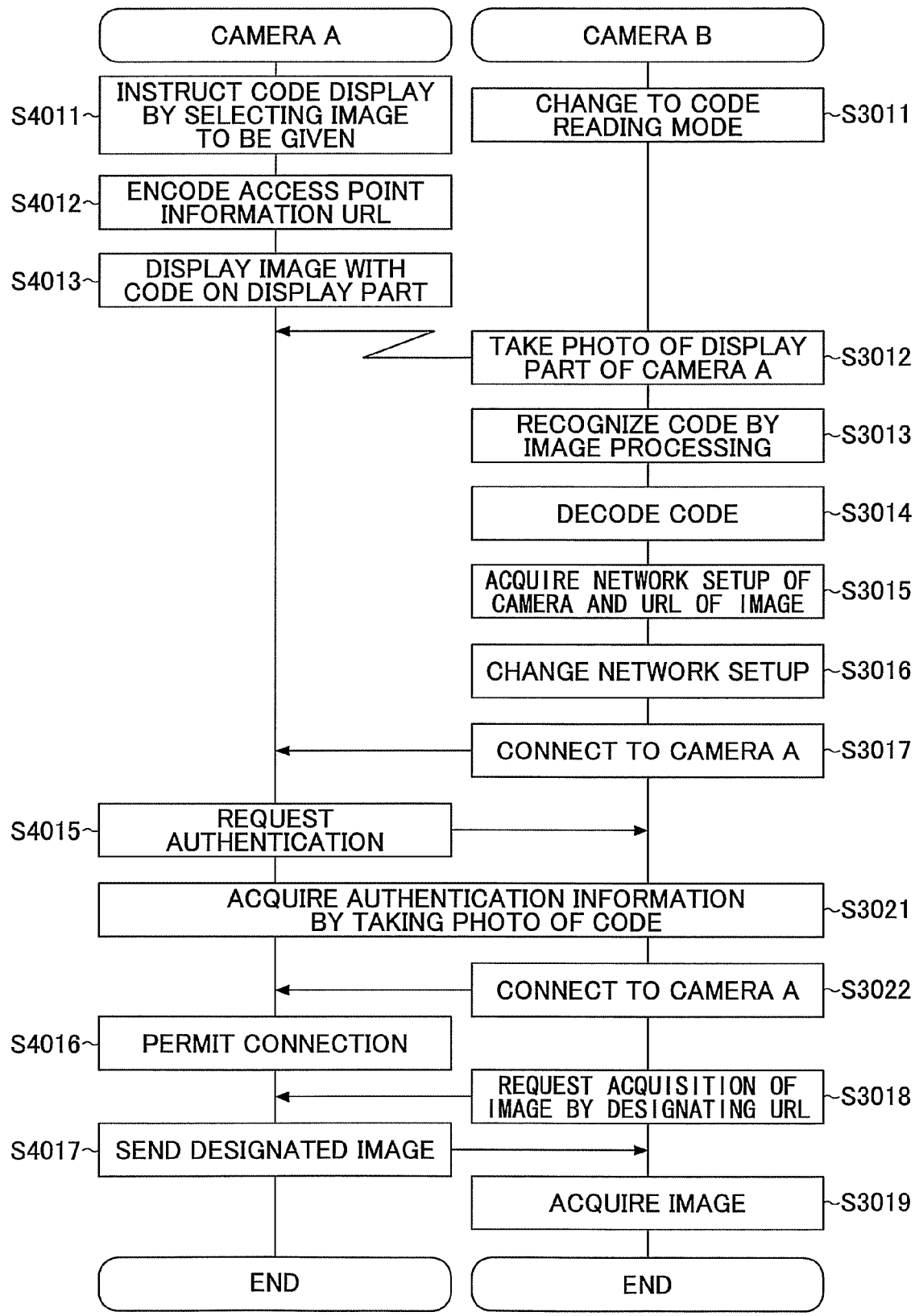
FIG. 33 is a flowchart of a process in which the camera A requests authentication and the camera B acquires authentication information.

FIG. 33 is a flowchart of a process in which the camera A requests authentication and the camera B acquires the authentication information A to share the image data.

The process of step S3011 through step S3017 is the same as that of FIG. 32. That is, the camera B takes a photo of the monitor display part 22a of the camera A, and acquires the communication setup information of the camera A. The camera B connects to the camera A (S3107), but the camera B has not acquired the authentication information A of the camera A. Thus, the camera A requests authentication of the camera B (S4014). The camera B establishes communication with the camera A according to one of the methods of FIG. 18 and FIGS. 25 through 28.

Then, the camera B retries connection to the camera A (S3022). The camera A permits the connection of the camera B (S4016). Then, the camera B requests acquisition of the image data by designating the URL acquired in the step S3015 (S3023). The camera A sends the designated image data to the camera B (S4107). The camera B acquires the image data (S3019).

As mentioned above, the connection of the camera B is permitted and the camera B can share the image by retrying the connection after acquiring the authentication information A later. This connecting method is applicable to the following examples.

In the above-mentioned embodiments and variations, camera A sends image data to the camera B. Data other than image data may be provided from the camera A to the camera B. Some of the recent digital cameras are provided with a face recognition function to recognize a face registered in the digital cameras. Face feature information is obtained by making a feature of a face into data. If the camera A sends the face feature information to the camera B, the camera B can authenticate that the user A is a legitimate user whose face feature information has been registered. Accordingly, the user A is permitted to use the camera B.

Figure 34:
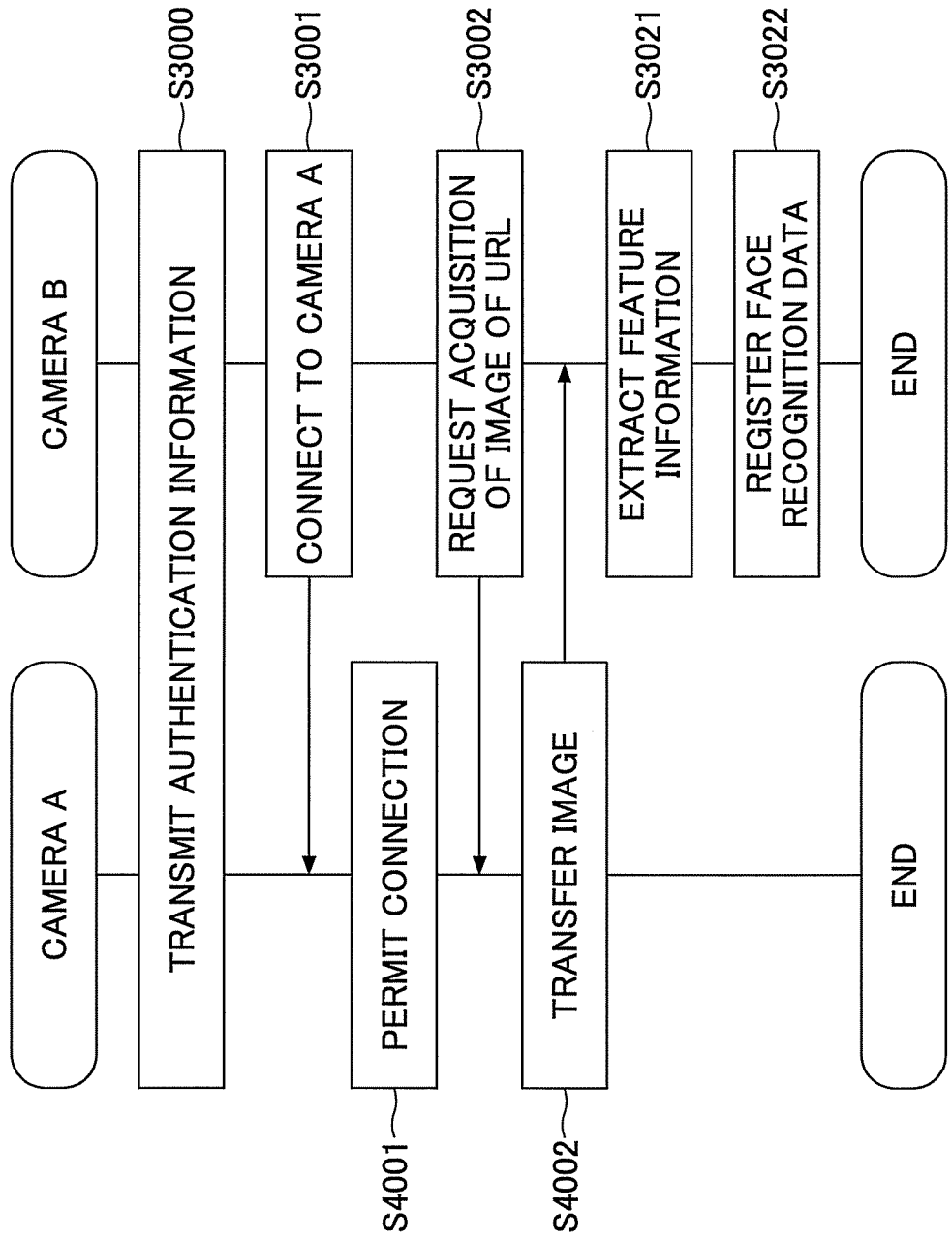
FIG. 34 is a flowchart of a procedure of sending face image data for face recognition from the camera A to the camera B.

FIG. 34 is a flowchart of a procedure of sending face image data for face recognition from the camera A to the camera B. Similar to the procedure illustrated in FIG. 33, when the camera A displays the authentication information A on the monitor display part 22a, face image data registered in the camera A is designated as an object to be encoded. Thereafter, when the user A selects "Encode" from the operation menu, the camera A encodes the URL of the face image data, the communication setup information, and the authentication information A of the camera A, and displays the encoded data as the code image 61. The camera B takes a photo of the code image 61. The camera B changes setting according to the communication setup acquired by decoding the code image 61, and connects to the camera A (S3001).

Because the camera B has acquired the authentication information A of the camera A, the camera A permits connection of the camera B (S4001). The camera acquires face image data from the URL of the face image data, for example, "http://165.254.0.1/IMAGES/0001.jpg", by using the HTTP client function (S3002). The HTTP server function of the camera A sends the face image data to the camera B (S4002).

Upon acquisition of the face image data registered in the camera A, the feature point extraction part 75b of the camera B extracts feature points (S3021). There are several extracting methods. The feature points are, for example, information regarding positions and intervals of parts of a face, such as eyes, lips, nostrils, eye brows, etc. Upon extraction of the feature points, the camera B registers (stores) the feature points in the camera A (for example, in a nonvolatile memory) as data for face recognition of the user A together with the face image data (S3022).

Thus, when the user A takes a photo of his or her own face using the camera B, the feature information of the face of the user A matches the feature information of the registered face. Thereby, the camera B becomes available.

Figure 35:
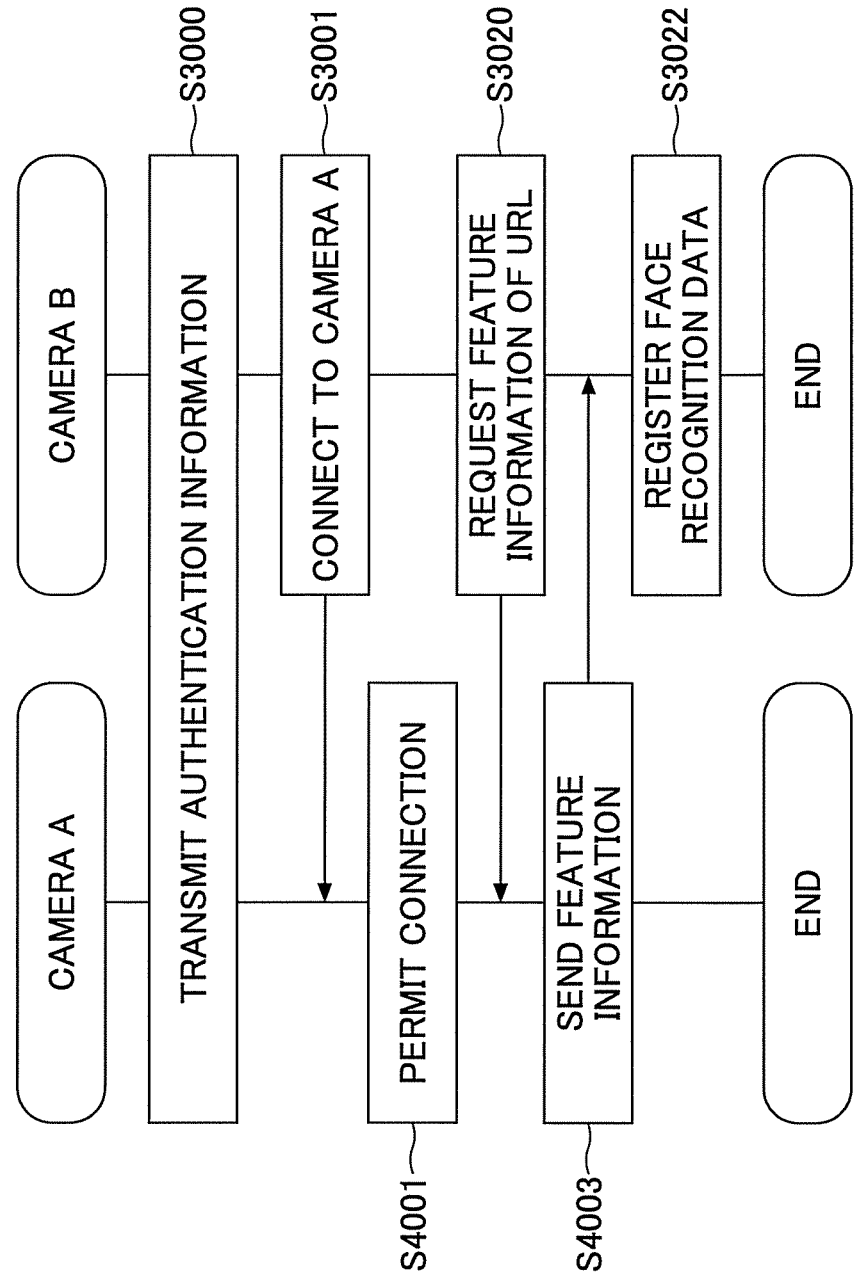
FIG. 35 is a flowchart of a procedure of sending face feature information for face recognition to the camera B.

Although the camera A sends the face image data to the camera B in the example of FIG. 34, the camera A may send feature information of a face itself to the camera B. FIG. 35 is a flowchart of a procedure of sending the face feature information for face recognition to the camera B.

When the camera B connects to the camera A in step S3001, the camera A permits connection (S4001). The camera A previously stores the face feature information so that the face feature information can be designated by URL such as "http://165.254.0.1/facedata/0001.dat". Thus, when displaying the authentication information A of the camera A by the code image 61 in step S3000, the URL of the face feature information, the communication setup information, and the authentication information of the camera A are encoded into one code image 61.

Therefore, the camera B changes the setup according to the communication setup information acquired by decoding the code image 61. Then, the camera B performs radio communication with the camera A by using the acquired authentication information of the camera A, and acquires the face feature information by designating the URL using the HTTP client function (S3020). The camera B registers the face feature information of the user A in the camera B as face recognition data (S3022).

Figure 36:
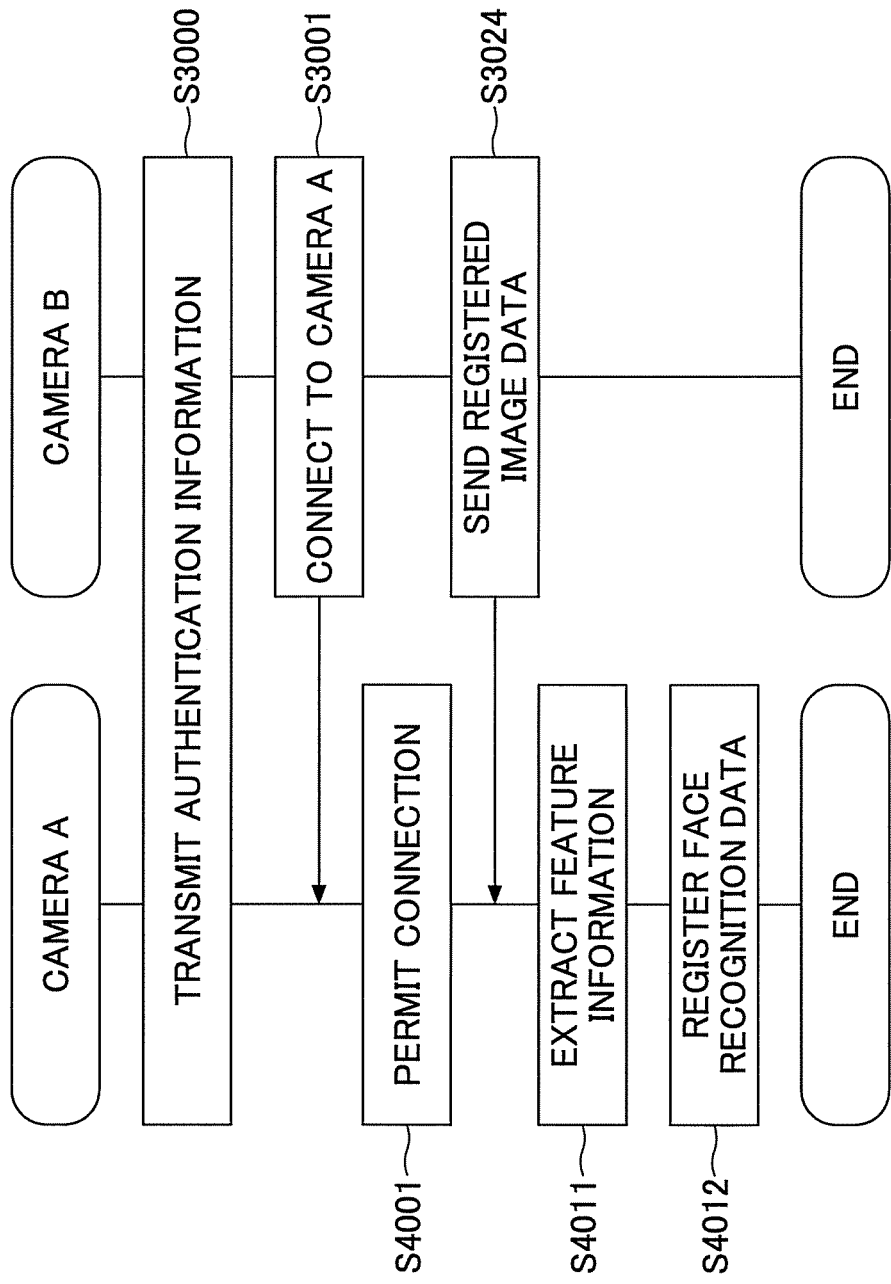
FIG. 36 is a flowchart of a procedure of the camera A acquiring face image data from the camera B.

Although the camera B acquires the face feature information from the camera A in the examples of FIGS. 34 and 35, the camera A may acquire face image data from the camera B. FIG. 36 is a flowchart of a procedure of the camera A acquiring face image data from the camera B.

The camera A is provided with an FTP (File Transfer Protocol) server function so that the camera A can acquire face image data from an FTP client by file transfer according to FTP. When displaying the code image 61 of the authentication information A, the user A operates the camera A to display the code image 61 to request image recognition data. The monitor display part 22*a* of the camera A displays the code image 61 into which the communication setup information of the camera A, URL of FTP for receiving the face image data, and the setting information to request the face image data have been encoded. For example, the communication setup information indicates that a radio LAN communication interface of IEEE802.11g is provided and a fifth channel in the ad hoc mode is used, and a current IP address is 165.254.0.1. The URL of FTP is, for example, "ftp://165.254.0.1/receiveimage/".

The user B operates the camera B to take a photo of the code image 61 displayed on the monitor display part 22*a* of the camera A. The camera B decodes the code image 61 to acquire the authentication information A of the camera A, and recognizes that the code image 61 contains the request of face image data.

The camera B changes the communication setup for radio communication according to the communication setup information acquired by decoding, and connects to the camera A by using the authentication information A by activating the FTP client (S3001). The camera B sends the face image data, which the camera B stores therein, to the decoded URL (that is, for example, ftp://165.254.0.1/receiveimage/) according to FTP (S3023).

Upon receipt of the face image data, the camera A extracts feature information of the face (S4011). Then, the camera A stores the feature information therein as face recognition data together with the image data (S4012).

Figure 37:
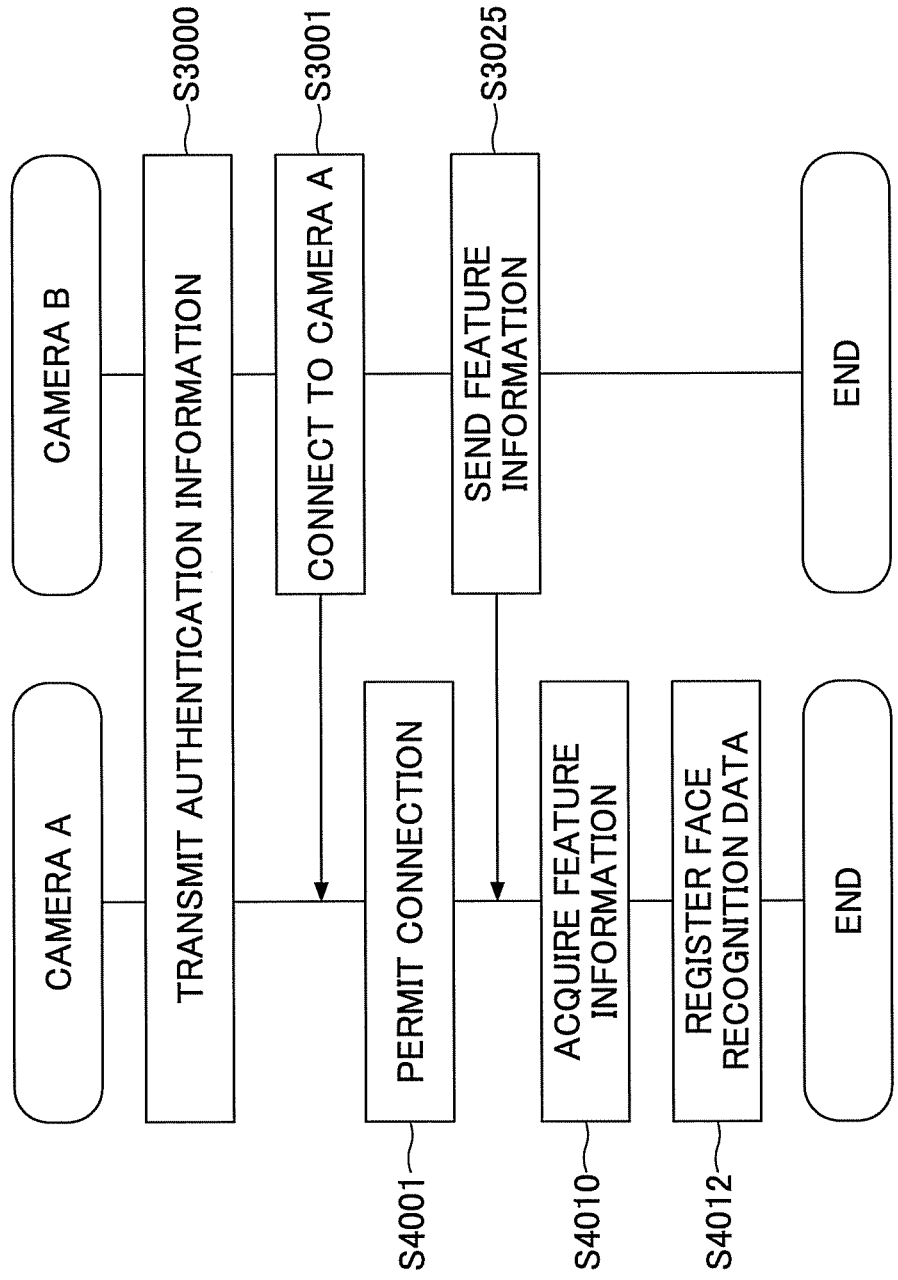
FIG. 37 is a flowchart of a procedure of the camera A acquiring face feature information from the camera B.

Although the camera A acquires the face image data from the camera B in the example of FIG. 36, the camera A may acquire face feature information from the camera B. FIG. 37 is a flowchart of a procedure of the camera A acquiring the face feature information from the camera B.

The camera A is provided with an FTP server function so that the camera A can acquire face feature information from an FTP client by file transfer according to the FTP. When displaying the authentication information A of the camera A, the user A operates the camera A to display the code image 61 to request feature information for face recognition. The monitor display part 22*a* of the camera A displays the code image 61 into which the communication setup information of the camera A, the URL of the FTP for receiving the face recognition data, the authentication information A of the camera A, and the setting information to request the face feature information. For example, the communication setup information indicates that a radio LAN communication interface of IEEE802.11g is provided and a fifth channel in the ad hoc mode is used, and a current IP address is 165.254.0.9. The URL of the FTP is, for example, "ftp://165.254.0.9/receivedata/".

The user B operates the camera B to take a photo of the code image 61 displayed on the monitor display part 22*a* of the camera A. The camera B decodes the code image 61 to acquire the authentication information A of the camera A, and recognizes that the code image 61 contains the request of face feature information.

The camera B changes the communication setup for radio communication according to the communication setup information acquired by decoding, and connects to the camera A by using the authentication information A by activating the FTP client (S3001). The camera B sends the face feature information, which the camera B stores therein, to the decoded URL (that is, for example, ftp://165.254.0.9/receivedata/) according to FTP (S3025). The camera A receives the face feature information (S4010), and stores the received face feature information therein as face recognition data (S4012).

When the communication is established between the camera A and the camera B, an image taken by the camera A (or the camera B) can be sent to the camera B (or the camera A) in real time. A description will be given below of an example in which the camera B receives an application service offered by the camera A and the camera B uses the application service of the camera A. A description of establishing the communication is omitted.

Figure 38:
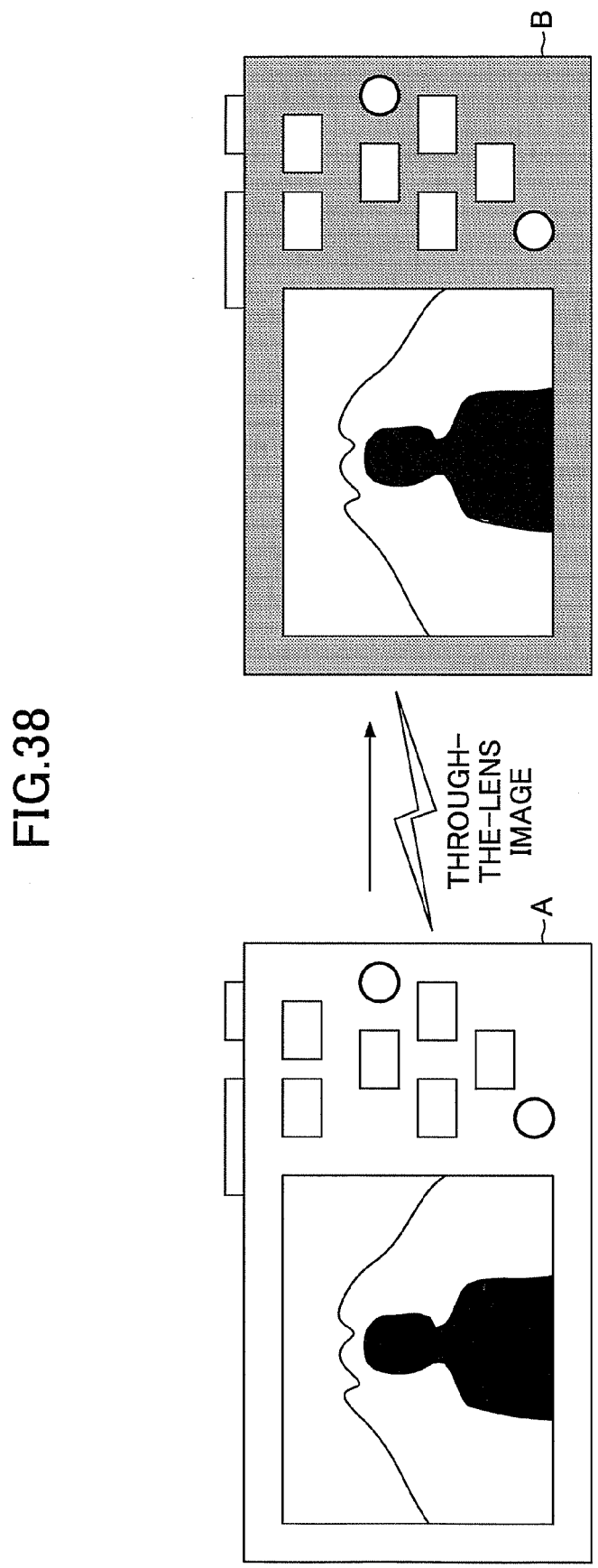
FIG. 38 is an illustration of the monitor display parts of the cameras A and B.

FIG. 38 is an illustration of the monitor display parts 22*a* and 22*b* of the cameras A and B. In FIG. 38, an image of a person and a background (a mountain) taken by the camera A is sent to the camera B. Actually, the photographing part 34*b* of the camera B may be taking a photo of a photographing subject different from the image taken by the camera A, or the photographing part 34*b* is not taking a photo.

Figure 39:
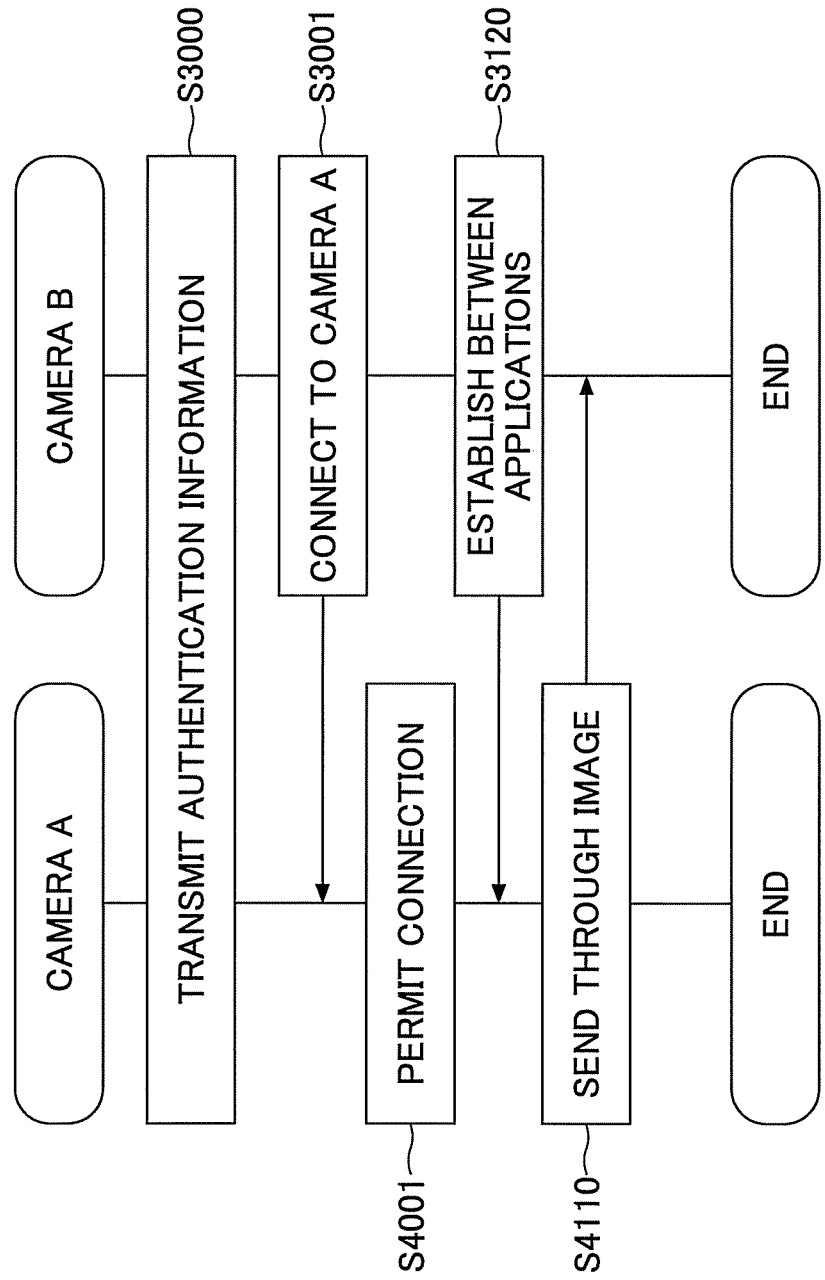
FIG. 39 is a flowchart of a procedure of the camera A sending a through-the-lens image to the camera B.

FIG. 39 is a flowchart of a procedure of the camera A sending a through-the-lens image to the camera B. When displaying the authentication information A of the camera A on the monitor display part 22*a*, the user A operates the camera A to initiate providing an application service. The encoding part 32*a* of the camera A encodes setup information necessary for providing the application service.

For example, when initiating the application service to display a through-the-lens image on the monitor display part 22*b* of the camera B, the camera A encodes the communication setup information of the camera A and the through-the-lens image providing service. For example, the communication setup information indicates that a radio LAN communication interface of IEEE802.11g is provided, a fifth channel in the ad hoc mode is used, a current IP address is 165.254.0.9, and URL of a live video is "rtsp://165.254.0.9/live/".

The camera A activates the application to be provided, and waits for a use of the service of the camera A.

The camera B takes a photo of the code image 61 displayed on the monitor display part 22*a* of the camera A. The camera B decodes the code image 61, and changes the setup of the camera B to the communication setup acquired by decoding. Then, the camera B establishes a radio communication with the camera A using the authentication information A acquired from the code image 61 (S3110). The camera A permits the connection of the camera B (S4001).

Additionally, the camera B activates the application for using a through-the-lens image, and connects to the provider side application, which is in a waiting state, by designating the URL of the live image to establish a communication with the application of the camera B (S3120). The camera A sends the photographed image to the camera B (S4110). Thereby, the through-the-lens image of the camera A is displayed on the monitor display part 22*b* of the camera B.

The application service is not limited to the transfer of the through-the-lens image, and other services such as, for example, a Web service, an image storage service by an FTP server, a remote control service, a voice chat service, an automatic image transfer service, etc., may be used.

A description will be given below of an example in which the code image 61 for using a service is displayed on the monitor display part 22*a* of the camera A so that an application service provided by the camera A can be used by the camera B. As an example different from the example of FIG. 39, a description will be given of a case where the application service is a photographing condition synchronization service. In the photographing condition synchronization service, the photographing condition of a camera, which uses the service, is synchronized with a camera, which provides the service.

That is, if the photographing condition of the camera A, which is a service providing side, is changed, information regarding the new (changed) photographing condition is sent to the camera B, thereby changing the photographing condition of the camera B. In this example, the camera A provides a photographing condition synchronization service, and the camera B uses the photographing condition synchronization service.

Figure 40:
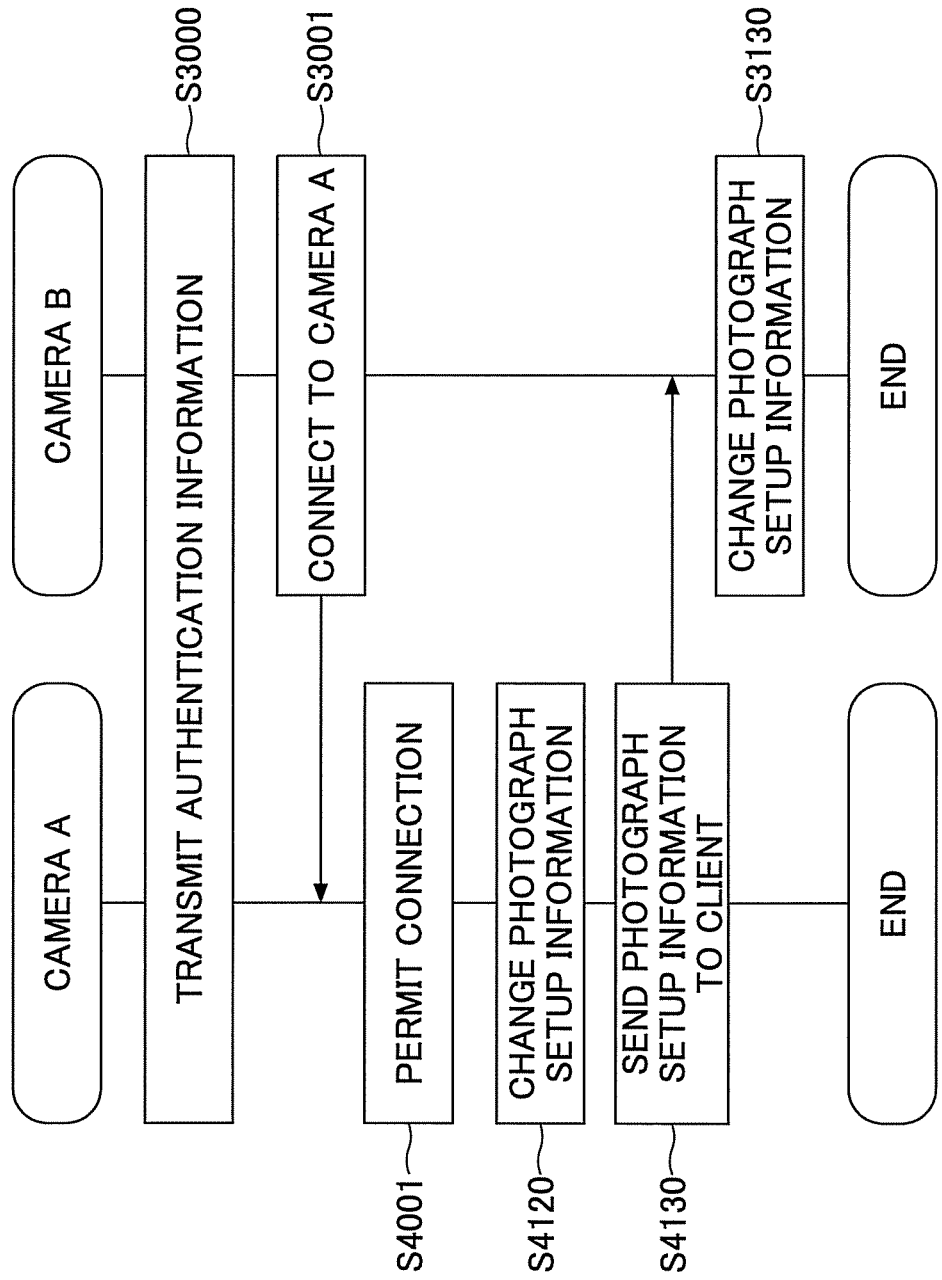
FIG. 40 is a flowchart of a procedure of the camera A providing a photographing condition synchronization setup service to the camera B.

FIG. 40 is a flowchart of a procedure of the camera A providing a photographing condition synchronization setup service to the camera B. When displaying the authentication information A of the camera A on the monitor display part 22a, the user A operates the camera A to instruct the camera A to provide the photographing condition synchronization service. The camera A encodes the setup information to provide the photographing condition synchronization service, the communication setup information necessary for using the service, and the authentication information A of the camera A, and displays the thus-created code on the monitor display part 22a. Then, the camera A initiates the photographing condition synchronization service.

The camera B takes a photo of the code image 61 of the camera A, and decodes the code image 61 to acquire the communication setup information. The camera B changes the communication setup and activates the use application of the photographing condition synchronization service. The camera B connects to the service of the camera A by the use application (S3001). When the camera B connects to the camera A, the camera B uses the authentication information A of the camera A. Then, the camera A permits the connection of the camera B (S4001).

Then, the camera A automatically changes the communication setup when the user registers the communication setup or when the user avoids a communication failure or switches channels (S4120). The camera notifies the camera B, which is a client, of the photographing condition information (S4130). Upon receipt of the new photographing condition information, the camera B changes the communication setup (S3130). Accordingly, the user B of the camera B is not required to operate the camera B to set the photographing condition of the camera A in the camera B.

For example, one or more cameras C other than the camera B may take a photo of the code image 61 displayed on the camera A, and the cameras C may use the photographing condition synchronization service of the camera A. For example, in a digital camera learning school, there is no need to setup the cameras C for students one after another each time a photographing condition is changed, and the cameras C for students can be changed all at once, which improves convenience.

In addition to the photographing condition information, the camera A may send GPS information to the camera B. That is, there is no need to send GPS information from the user A to the user B each time the user A changes a location, which improves convenience.

Figure 41:
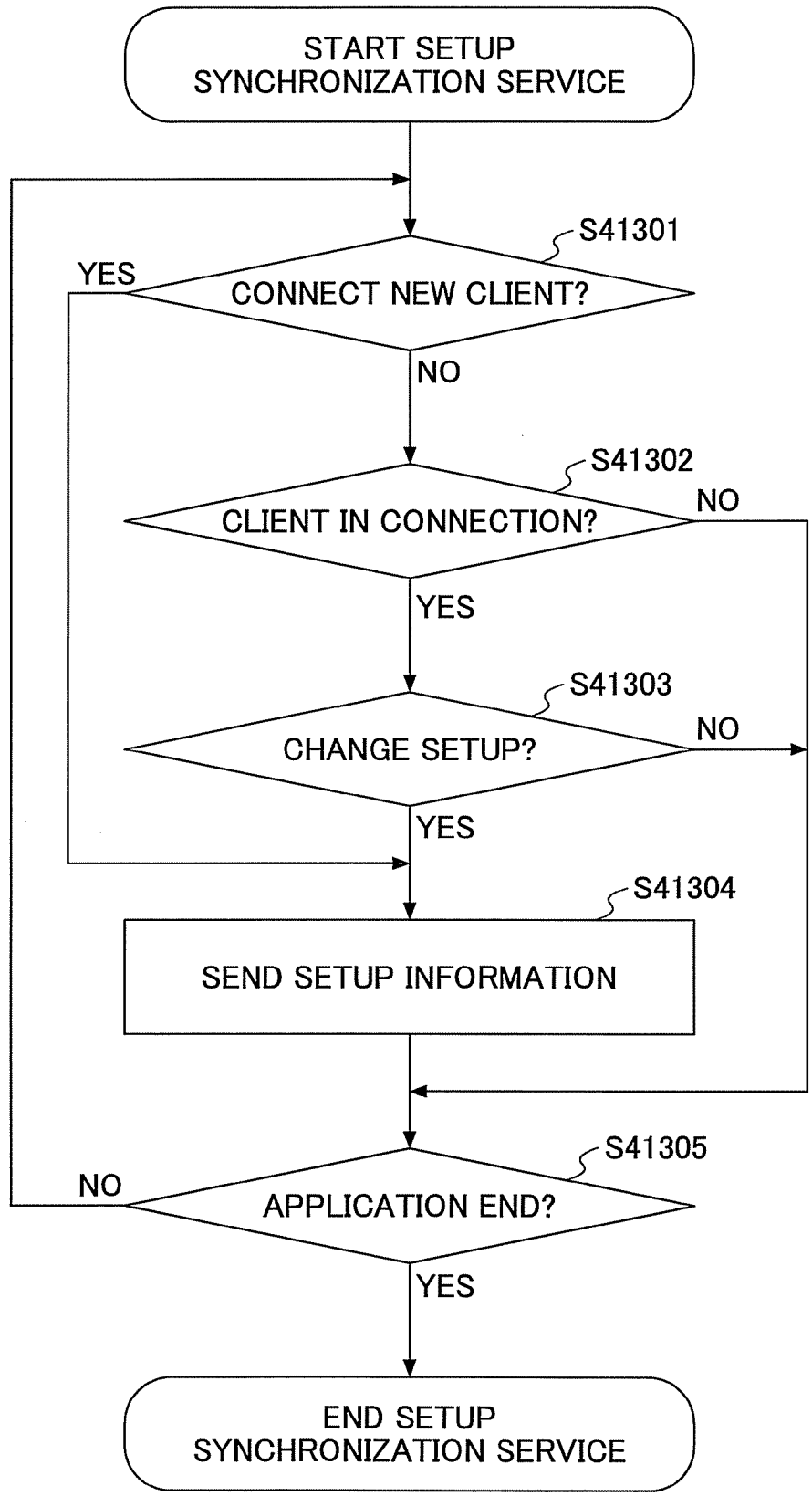
FIG. 41 is a flowchart of a procedure of the camera A providing a photographing condition synchronization service.

FIG. 41 is a flowchart of a procedure of the camera A providing the photographing condition synchronization service. The procedure of FIG. 41 starts when the user A operates the operation part 48a to instruct the camera A to provide the photographing condition synchronization service.

First, the camera A determines whether a new client is connecting to the camera A (S41301). Because, the camera A gives an identifier peculiar to the camera B, the camera A can determine the connection of a new client by checking an identifier of the new client.

If the camera A detects that a new client is connecting thereto (YES of S41301), the camera A sends the present photographing condition information to the camera B (S41304).

If a new client is not connecting to the camera A (NO of S31301), the camera A determines whether other clients are being connected to the camera A (S41302). If any other clients are not being connected (NO of S41302), this means that no client is being connected. Thus, the camera A determines whether the application should be ended (S41305).

On the other hand, if one of other clients is being connected to the camera A (YES of S41302), the camera A determines whether the photographing condition has been changed (S41303). If one of the clients is being connected and if the photographing condition has been changed (YES of S41303), the camera A sends the photographing condition information to one of the clients, which is currently being connected to the camera A (S41303).

If there is no change in the photographing condition (NO of S41303), the camera A determines whether to end the application (S41305). If an end command of the application of setup synchronization service is made by an operation to the camera A, the camera A ends providing the service (YES of S41305).

A description will be given below of an example in which the code image 61 for using a service is displayed on the monitor display part 22a of the camera A so that the camera B can use the application service provided by the camera A. The camera A has a function to access the Internet by using a cellular phone network other than the radio LAN communication function. This function is indicated as the routing part 76 in FIG. 17. On the other hand, the camera B has only the radio LAN communication function, and has the routing service request part 80 for using a routing service.

In such a case, in the camera system 200 of the present embodiment, a routing service is provided that the routing part 76 of the camera A routes the radio LAN communication from the camera B to a cellular phone network so that the camera B can access the Internet.

Figure 42:
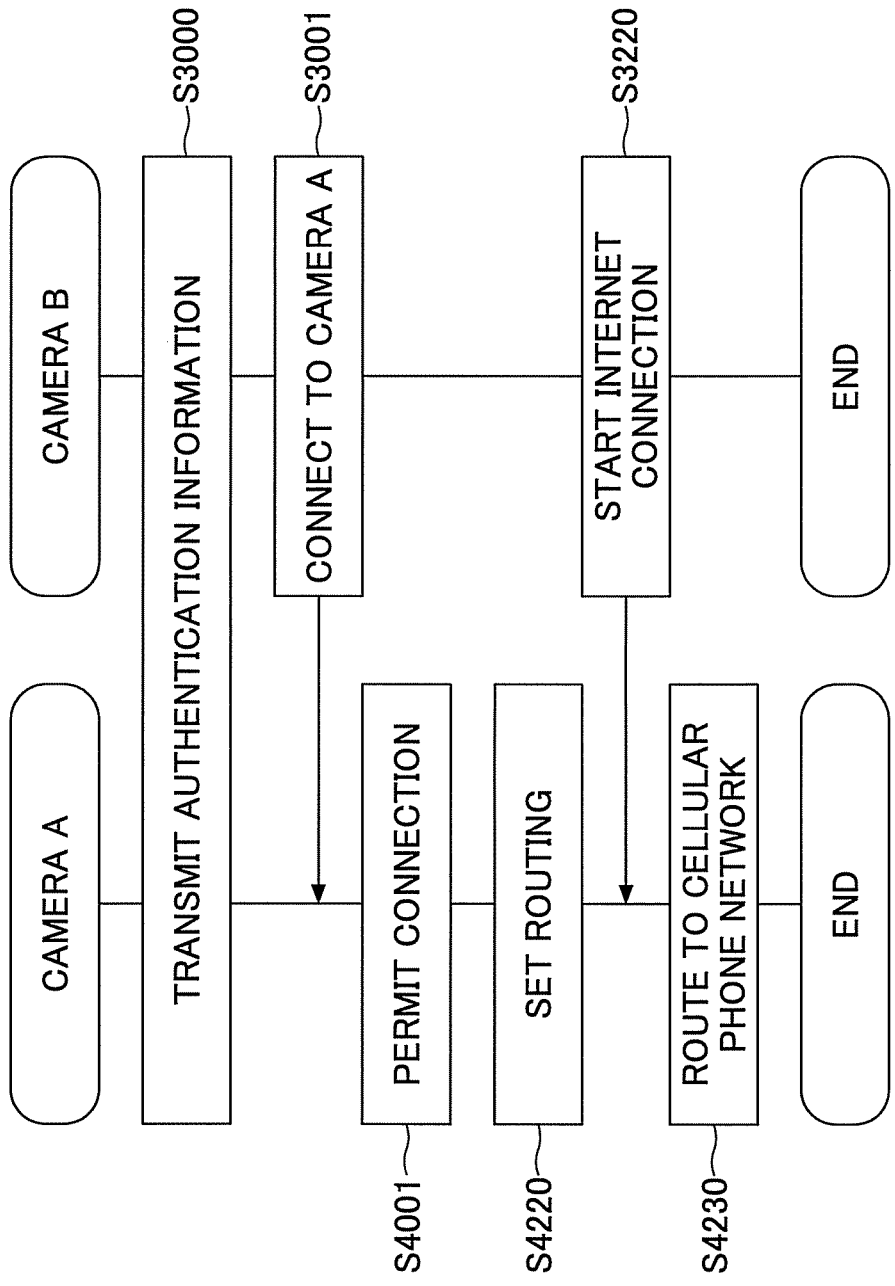
FIG. 42 is a flowchart of a procedure of the camera A providing an Internet connecting service.

FIG. 42 is a flowchart of a procedure of the camera A providing an Internet connecting service. When the camera displays the authentication information A on the monitor display part 22a, the user A operates the camera A to encode the setup information to cause a routing service to be used, a present radio LAN setup (IP address) and the authentication information A of the camera A, and to display the code on the monitor display part 22a. The camera A starts waiting for the routing service.

The camera B takes a photo of the code image 61 displayed on the monitor display part 22a of the camera A, and decodes the code image 61 to acquire the authentication information A of the camera A and the radio LAN setup information (IP address). The camera B changes the radio LAN communication setup of the camera B so that the camera B can communicate with the camera B through the radio LAN communication. Then, the camera B establishes a connection by using the authentication information A of the camera A, and connects to the routing service application of the camera A (S3001). Thus, the camera A permits the connection of the camera B (S4001). Because the routing applications (the routing part 76 and the routing service request part 80) of the camera A and the camera B are connected with each other, the camera B is given the permission of routing from the camera A.

The routing part 76 of the camera A sets up the routing (S4220). The routing is performed by, for example, a protocol of a second layer (data link layer), which is a lower order protocol of IP. The camera B acquires a routing table from a server (not illustrated) and stores the routing table therein by referring to a correspondence between the IP address of the camera B and the IP address of a host server to which the camera B is connected.

Thereafter, the camera B starts to connect to the Internet (S3220). An IP packet according to the radio LAN communication from the camera B is routed to a cellular phone network in the camera A, and, thereby, the camera B can access the Internet (S4230).

When the camera A and the camera B are communicating with each other, the camera B can remotely control the operation of the camera A. Here, the remote control or remote operation means that, when the user B operates the camera B, not the camera B but the camera A performs an operation corresponding to the operation to the camera A. As illustrated in FIG. 17, the camera A has the remote operation reception part 74, and the camera B has the remote operation request part 77.

The camera A performs an application to provide a remote control service. The camera B performs an application to use the remote control service provided by the camera A. It is assumed that the camera A and the camera B are the same type or made by the same manufacturer and each has the operation part 48 common to each other. Alternatively, the camera A may send an operation program to the camera B so that the camera B performs the operation program in order to control the operation of the camera A through a touch panel.

Figure 43:
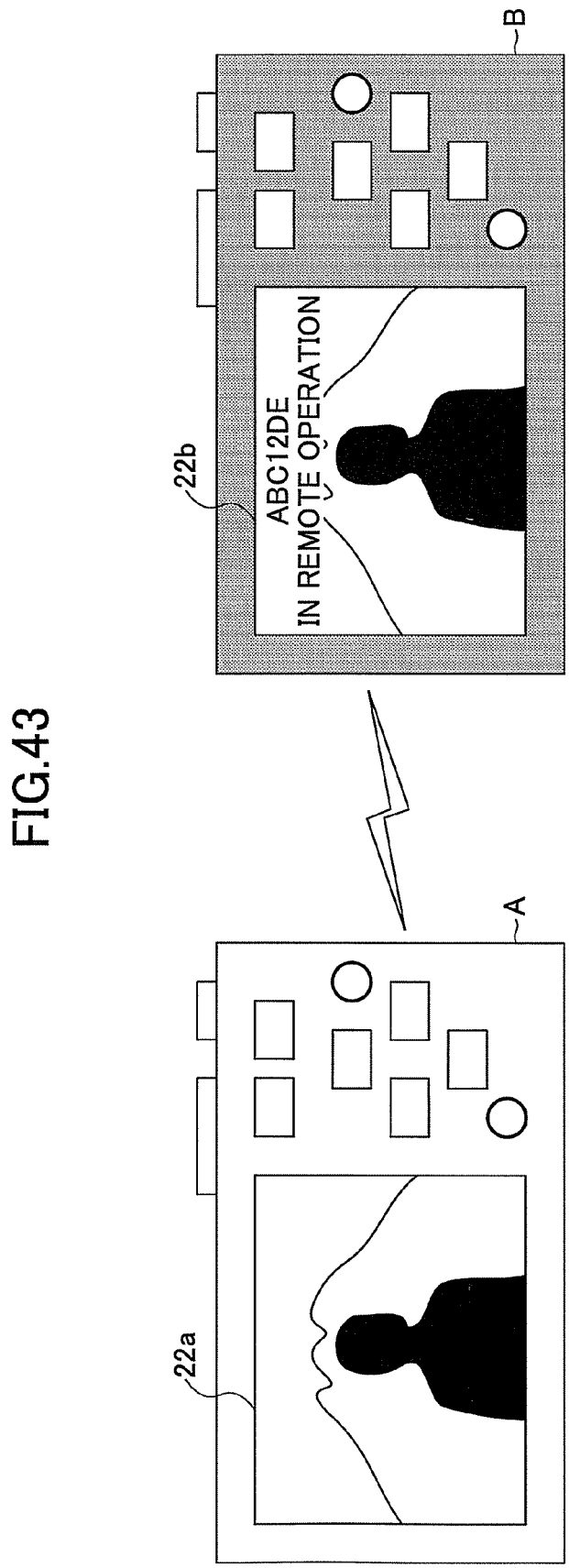
FIG. 43 is an illustration of the monitor display parts of the cameras A and B, which are in a remote control operation.

FIG. 43 is an illustration of the monitor display parts 22a and 22b of the cameras A and B, which are in a remotely controlled operation. When, the camera B connects to the camera A and both perform the application for a remote control service, the remote operation reception part 74 becomes effective in the camera A and the remote operation request part 77 becomes effective in the camera B. Thereby, the camera B can remotely control the operation of the camera A. The remote operation reception part 74 sends a through-the-lens image of the camera A, which is the remote control service providing side, to the camera B. The remote control request part 77 of the camera B displays the received through-the-lens image on the monitor display part 22b.

On the other hand, in a case where the camera B is in a remote control mode, an operation event from the operation part 48b is not executed by the camera B but sent to the camera A through a radio communication except for a case where the camera B cancels the remote control mode or turns off. The remote control service of the camera A interprets the operation event received from the camera B, and is executed to control the camera A.

For example, when the user B operates the camera B to set a count value of a timer to 10 seconds and pushes a shutter button, this operation event is sent to the camera A. Thus, the camera A starts a timer photographing of 10 seconds. Accordingly, if there are two cameras, one can perform self-photographing by easily performing a remote operation, which improves convenience of the camera B. Additionally, it is possible to take a photo simultaneously from a plurality of angles, which provides an effect of spreading a form of use of cameras.

A description will be given below of an error display under a remote control operation. There may be a case where an operation performed in the camera B during a remote control operation is not supported in the camera A. In such a case, the user B can grasp the situation by a notification sent from the camera B.

Figure 44:
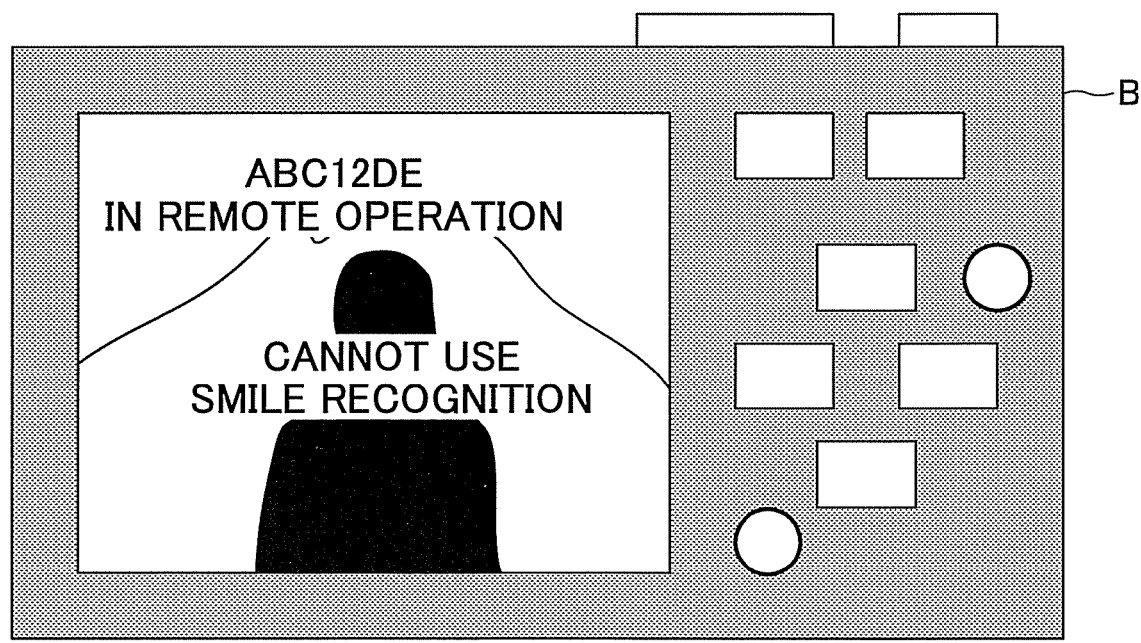
FIG. 44 is an illustration of the monitor display part of the camera B in a remote control operation.

FIG. 44 is an illustration of the monitor display part 22b of the camera B in a remote control operation. It is assumed that the camera B has a smile recognition mode but the camera A does not have such a function of the smile recognition mode. In the smile recognition mode of the camera B, a photo is automatically taken at a time when the camera B recognizes a smile of a person who is a photographing subject. The camera B can be set in the smile recognition mode by pressing a smile recognition button of the camera B. If the smile recognition button is pressed, the remote operation reception part 74 sends an error message "CANNOT USE SMILE RECOGNITION". Then, the camera B displays the message on the monitor display part 22 as illustrated in FIG. 44. Because the image displayed on the monitor display part 22a of the camera A during a remote control operation is sent to the camera B as a through-the-lens image, an error message may be displayed on the monitor display part 22a of the camera A.

A description will be given of an example in which the remote control operation is performed between the cameras A and B of different models.

FIG. 45 is an illustration of the monitor display part of the camera B under a remote control operation. A through-the-lens image and a menu 501 operable by the camera A are displayed on the monitor display part 22b of the camera B, which is a using side, so that the camera B can remotely control the camera A even if the cameras A and B are different models. For example, the menu 501 is sent from the camera A to the camera B. The camera B can remotely control the camera A by operating according to the menu 501 even if the camera A is a different model from the camera B.

As mentioned above, in the present embodiment, the camera A and the camera B cannot communicate with each other unless the camera A takes a photo of the monitor display part 22b of the camera B and the camera B takes a photo of the monitor display part 22a of the camera A, thereby greatly improving confidentiality. Thus, upon improvement of confidentiality, the communication establishing method according to the present embodiment can be applied to various applications requiring high confidentiality such as, for example, a communication to exchange face feature information.

The present invention is not limited to the specifically disclosed embodiments, and variations and modifications may be made without departing from the scope of the present invention.

The present application is based on Japanese priority application No. 2009-200620 filed on Aug. 31, 2009, the entire contents of which are hereby incorporated herein by reference.

What is claimed is:

1. A photographing apparatus comprising:
   an encoding part configured to create a code image from first authentication information of said photographing apparatus;
   a display part configured to display at least one of an image of a photographing subject, an operation menu and said code image;
   a photographing part configured to take a photograph of a connection code image displayed on a display part of another apparatus different from said photographing apparatus;
   a decoding part configured to decode said connection code image contained in the photograph taken by said photographing part to decode encoded connection information containing communication setup information, which is used in establishing a radio communication and has been encoded according to said authentication information of said photographing apparatus;

a restoration part configured to restore said communication setup information from said encoded connection information, which has been decoded by said decoding part, by using the first authentication information of said photographing apparatus; and a radio communication part configured to communicate with said another apparatus by using the communication setup information restored by said restoration part, wherein the photographing apparatus further comprises a code image presenting part configured to present said code image to said another apparatus by causing the display part to display said code image so that said another apparatus acquires the first authentication information of said photographing apparatus by taking a photograph of said code image displayed on said display part of said photographing apparatus and decoding said code image from the photograph of said code image, and wherein the decoding part decodes a code image presented by said another apparatus in order to acquire communication setup information of said another apparatus and second authentication information of said another apparatus, the second authentication information being acquired from new authentication information, which is created by said another apparatus based on the first authentication information and the second authentication information, and wherein said radio communication part establishes a communication with said another apparatus using the acquired communication setup information of said another apparatus and the acquired second authentication information of said another apparatus.

2. The photographing apparatus as claimed in claim 1, wherein said encoded connection information includes said communication setup information, which has been enciphered according to said first authentication information of said photographing apparatus, and said restoration part decrypts said communication setup information, which has been enciphered, by using said first authentication information of said photographing apparatus.

3. The photographing apparatus as claimed in claim 1, wherein:

said encoded connection information is created by applying a first operation using said first authentication information of said photographing apparatus to the second authentication information used by said another photographing apparatus to authenticate said photographing apparatus;

said restoration part restores said second authentication information by applying a reverse operation of said first operation to said encoded connection information; and said radio communication part communicates with said another apparatus by using said communication setup information when the authentication by said another apparatus using said second authentication information is established.

4. The photographing apparatus as claimed in claim 1, wherein:

said decoding part decodes second authentication information used by said another apparatus to authenticate said photographing apparatus;

said restoration part creates the new authentication information by applying an operation using said first authentication information of said photographing apparatus to said second authentication information; and said radio communication part communicates with said another apparatus by using said communication setup information when the authentication by said another apparatus according to said new authentication information is established.

5. The photographing apparatus as claimed in claim 1, further comprising a remote operation request part configured to send operation information, which is received by said operation part, to said another apparatus through said radio communication part so that said another apparatus operates based on said operation information.

6. A communication establishing method to establish a communication between a first photographing apparatus and a second photographing apparatus, the communication establishing method comprising:

a first encoding part of said first photographing apparatus creating a first code image containing first authentication information;

displaying said first code image on a first display part of said first photographing apparatus;

taking a photograph of said first code image displayed on said first display part by a second photographing part of said second photographing apparatus;

decoding said first authentication information from said first code image by a second decoding part of said second photographing apparatus;

creating new authentication information from the first authentication information acquired by said second decoding part and second authentication information of said second photographing apparatus:

creating, by a second encoding part of said second photographing apparatus, encoded connection information by encoding communication setup information of said second photographing apparatus;

displaying a second code image on a second display part of said second photographing apparatus, said second code image containing said new authentication information and said encoded connection information of said second photographing apparatus;

taking a photograph of said second code image displayed on said second display part by a first photographing part of said first photographing apparatus;

decoding said encoded connection information from the photograph of said second code image by a first decoding part of said first photographing apparatus;

restoring said communication setup information from said encoded connection information by using said first authentication information by a restoration part of said first photographing apparatus;

acquiring, by said first photographing apparatus, the second authentication information from the new authentication information contained in said code image; and causing a first radio communication part of said first photographing apparatus to communicate with said second photographing apparatus by using said communication setup information, which is restored by said restoration part of said first photographing apparatus, and said second authentication information acquired from the new authentication information.

7. A non-transitory computer readable recording medium storing a computer readable program for causing a first photographing apparatus to perform a communication establishing method to establish a communication between the first photographing apparatus and a second photographing apparatus, said communication establishing method comprising:

a first encoding part of said first photographing apparatus creating a first code image containing first authentication information;

displaying said first code image on a first display part of said first photographing apparatus;

taking a photograph of said first code image displayed on said first display part by a second photographing part of said second photographing apparatus;

decoding said first authentication information from said first code image by a second decoding part of said second photographing apparatus;

creating new authentication information from the first authentication information acquired by said second decoding part and second authentication information of said second photographing apparatus:

creating, by a second encoding part of said second photographing apparatus, encoded connection information by encoding communication setup information of said second photographing apparatus;

displaying a second code image on a second display part of said second photographing apparatus, said second code image containing said new authentication information and said encoded connection information of said second photographing apparatus;

taking a photograph of said second code image displayed on said second display part by a first photographing part of said first photographing apparatus;

decoding said encoded connection information from the photograph of said second code image by a first decoding part of said first photographing apparatus;

restoring said communication setup information from said encoded connection information by using said first authentication information by a restoration part of said first photographing apparatus;

acquiring, by said first photographing apparatus, the second authentication information from the new authentication information contained in said code image; and causing a first radio communication part of said first photographing apparatus to communicate with said second photographing apparatus by using said communication setup information, which is restored by said restoration part of said first photographing apparatus, and said second authentication information acquired from the new authentication information.

* * * * *